(12) United States Patent
Dragusin

(10) Patent No.: US 7,322,653 B2
(45) Date of Patent: Jan. 29, 2008

(54) INTEGRATED VIDEOGAMING AND COMPUTER WORKSTATION

(76) Inventor: Vlad Dragusin, 3168 33rd St., Long Island City, NY (US) 11106

( * ) Notice: Subject to any disclaimer, the term of this patent is extended or adjusted under 35 U.S.C. 154(b) by 781 days.

(21) Appl. No.: 10/461,661

(22) Filed: Jun. 13, 2003

(65) Prior Publication Data
US 2004/0254020 A1  Dec. 16, 2004

(51) Int. Cl.
*A47C 1/038* (2006.01)
*A47C 1/024* (2006.01)

(52) U.S. Cl. ............... 297/300.3; 297/300.2; 297/301.2; 297/317

(58) Field of Classification Search ............ 297/300.3, 297/300.2, 300.1, 301.1, 301.2, 217.3, 317, 297/342, 316, 320, 321, 322
See application file for complete search history.

(56) References Cited

U.S. PATENT DOCUMENTS

| | | | |
|---|---|---|---|
| 4,765,679 A * | 8/1988 | Lanuzzi et al. .......... 297/300.3 |
| 4,779,922 A | 10/1988 | Cooper | |
| 4,880,270 A | 11/1989 | Cooper | |
| 5,044,284 A | 9/1991 | Gross | |
| 5,354,120 A * | 10/1994 | Volkle ..................... 297/300.1 |
| 5,680,820 A | 10/1997 | Randolph | |
| 5,685,231 A | 11/1997 | Eyre | |
| 5,779,305 A | 7/1998 | Hocking | |
| 5,807,177 A | 9/1998 | Takemoto et al. | |
| 5,909,934 A | 6/1999 | McGraw | |
| 5,975,634 A * | 11/1999 | Knoblock et al. ........ 297/300.4 |
| 6,089,663 A | 7/2000 | Hill | |
| 6,092,867 A | 7/2000 | Miller | |
| 6,092,868 A | 7/2000 | Wynn | |
| 6,098,936 A | 8/2000 | Birrell | |
| 6,102,476 A | 8/2000 | May et al. | |
| 6,145,926 A * | 11/2000 | Lin ......................... 297/217.3 |
| 6,210,286 B1 | 4/2001 | Ohara et al. | |
| 6,237,997 B1 | 5/2001 | Olson | |
| 6,257,665 B1 | 7/2001 | Nagamitsu et al. | |
| 6,269,753 B1 | 8/2001 | Roddan | |
| 6,332,407 B1 | 12/2001 | Vardaro | |
| 6,337,793 B1 | 1/2002 | Vier et al. | |
| 6,374,547 B1 | 4/2002 | Baloga et al. | |
| 6,374,752 B1 | 4/2002 | Walser | |
| 6,386,634 B1 | 5/2002 | Stumpf et al. | |
| 6,394,402 B2 | 5/2002 | Coonan et al. | |
| 6,425,631 B1 | 7/2002 | Lin | |
| 6,439,661 B1 * | 8/2002 | Brauning ................. 297/300.2 |
| 6,449,909 B1 | 9/2002 | Baloga et al. | |
| 6,669,294 B2 * | 12/2003 | Kinoshita et al. ........ 297/354.1 |
| 2002/0125801 A1 | 9/2002 | Rauls | |

* cited by examiner

*Primary Examiner*—David Dunn
*Assistant Examiner*—Tania Abraham
(74) *Attorney, Agent, or Firm*—Lucas & Mercanti, LLP

(57) ABSTRACT

Disclosed is a videogaming and computer workstation unit, preferably integrated with an ergonomic chair, which permits ease of entry and exit to the chair for users of various sizes, and which permits users to use peripheral devices for operating video games and computers comfortably from a chair integrated with a gaming console.

1 Claim, 38 Drawing Sheets

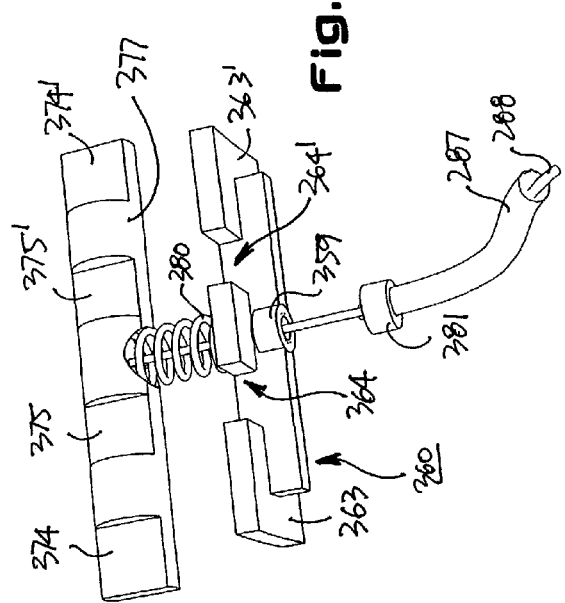
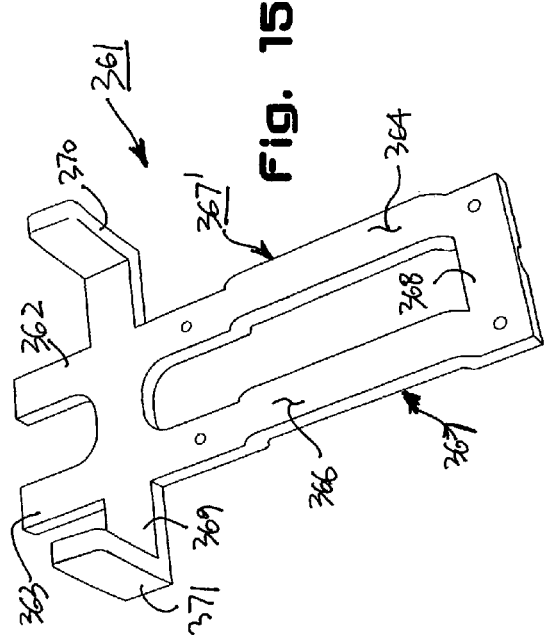

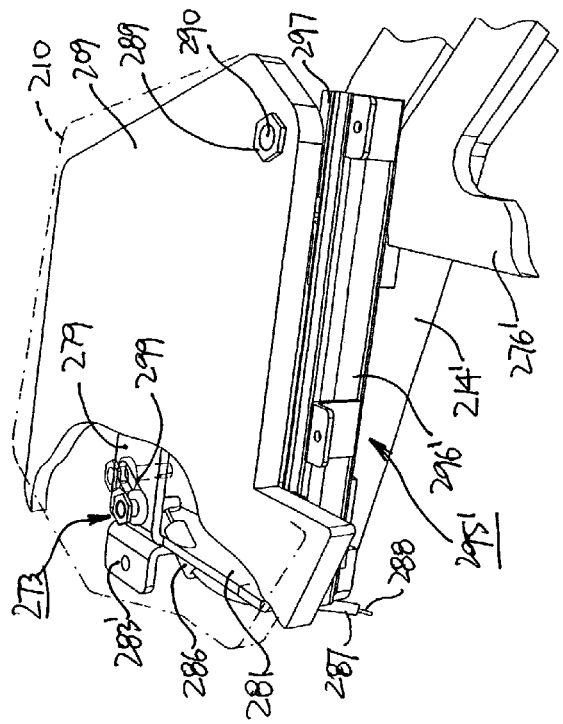
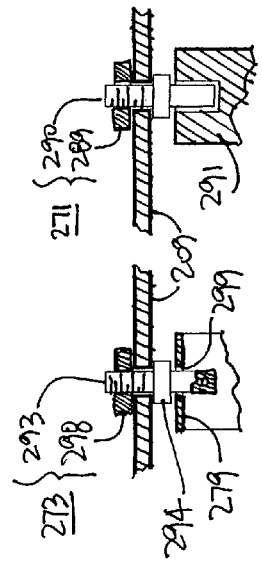
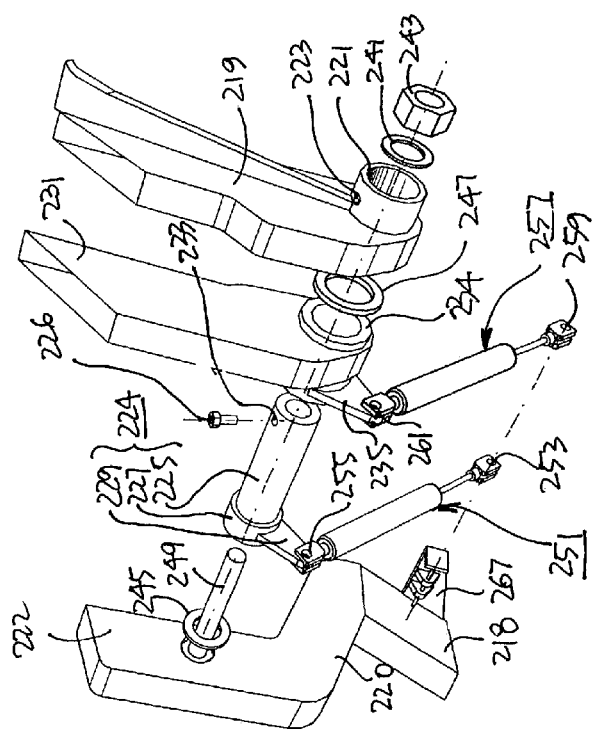
Fig. 27
Fig. 28
Fig. 26

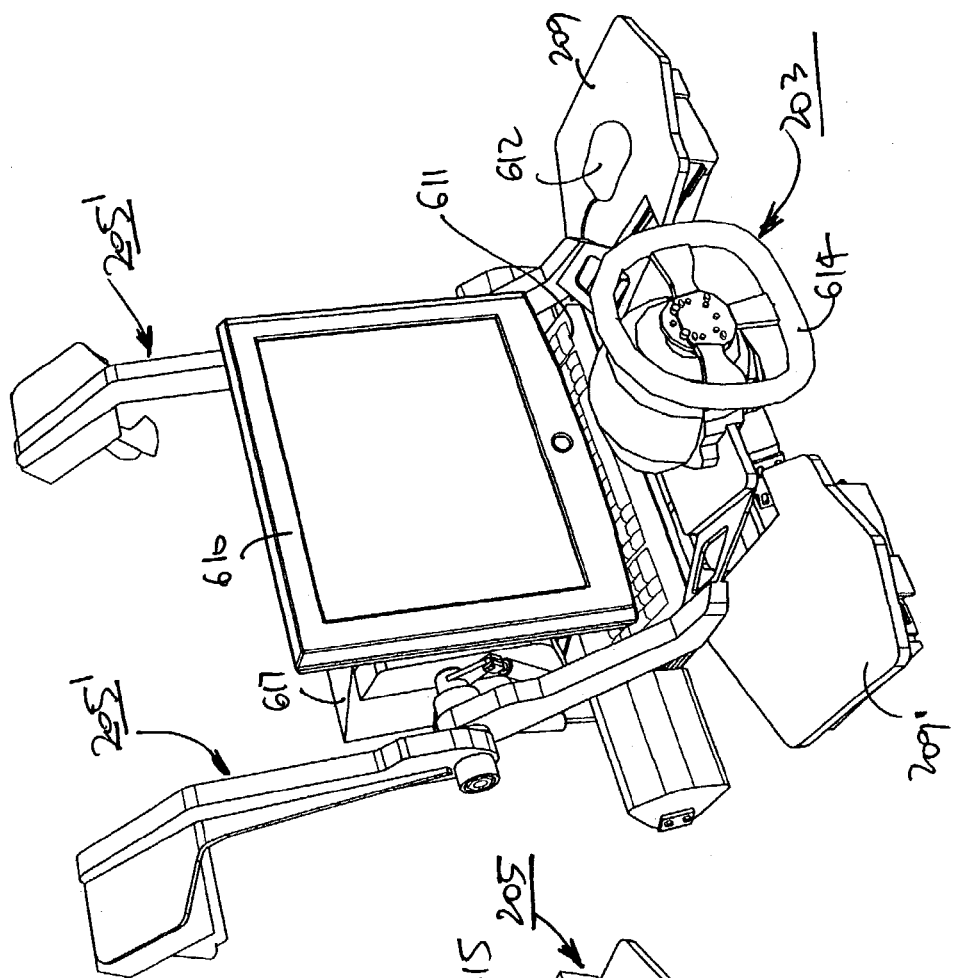
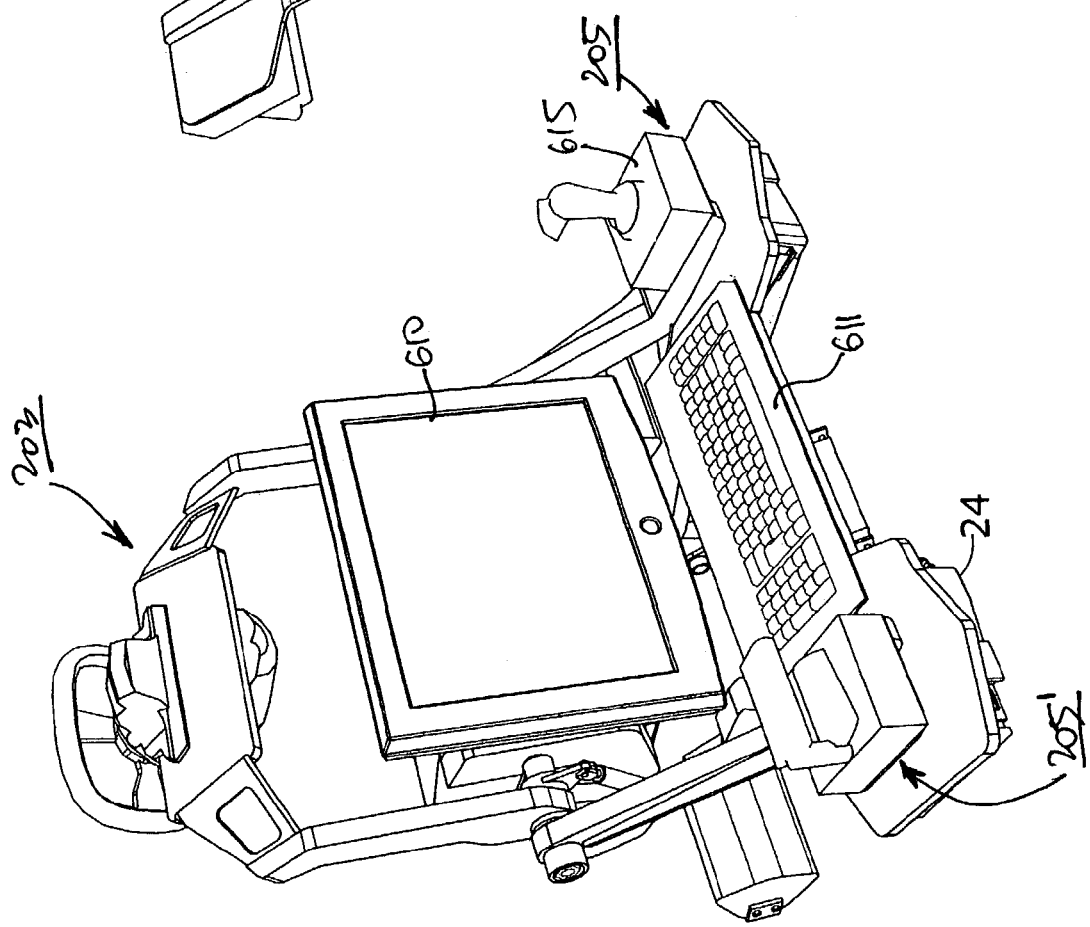
Fig. 30B
Fig. 30A

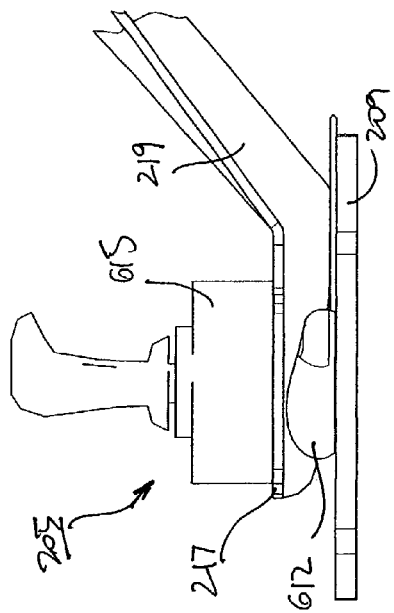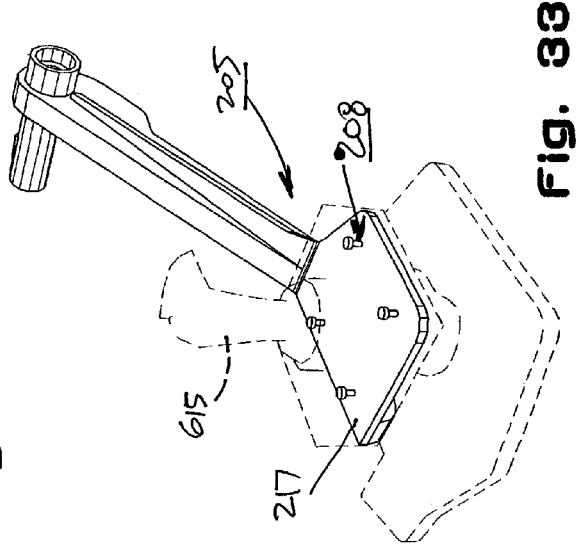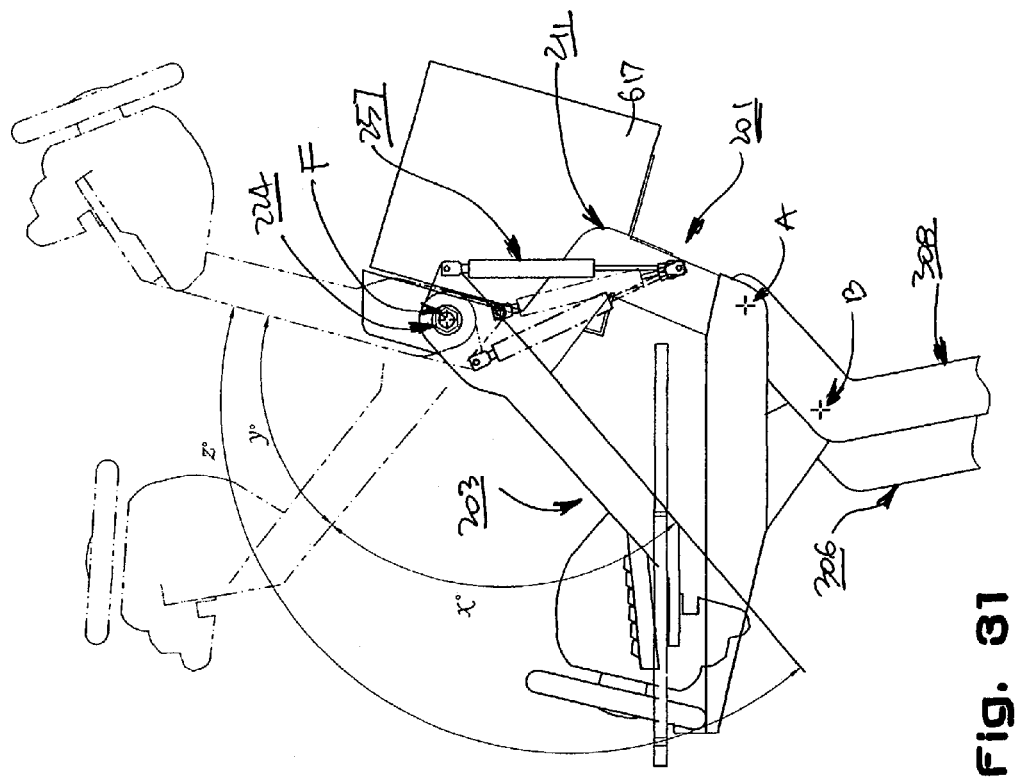

INTEGRATED VIDEOGAMING AND COMPUTER WORKSTATION

FIELD OF THE INVENTION

This invention relates to an integrated videogaming and computer workstation. More particularly, this invention relates to an integrated, ergonomic videogaming and computer workstation and chair that is easy to enter and exit, can accommodate people of different sizes, and can accommodate a variety of interchangeable videogame and computer peripheral devices.

BACKGROUND OF THE INVENTION

Presently in gaming arcades, a traditional hardware and software machine setup caters to an extremely simplified gaming experience designed mainly to eliminate any learning curve with a particular game, with the intent of enticing potential players to participate readily.

It is apparent, though, that in the last few years the videogaming industry has grown tremendously, currently with revenues rivaling major movie production houses, truly becoming a new form of entertainment. In this respect, an immense number of gamers are already exposed to a multitude of games that they can play at home, and complex ones that provide a richer, more rewarding experience. In effect, the offerings at traditional game arcades seem dated by comparison, not managing to capture the attention of many gamers past a few rounds.

The hardware and software constraints designed to provide a lower common denominator, and bring in a broad range of players, are effectively working against generating revenue. A highly repetitive gameplay with no real surprises in the storyline can't keep a player entertained for too long.

Another factor that only adds to the problem is that there is usually a high cost associated with not only developing customized software for a specific type of game machine, but it is also much more difficult to upgrade it, this way missing out on the benefits of a rapidly evolving industry For the home environment, the videogaming market is growing rapidly, and more and more people prefer this form of entertainment to more passive, traditional ones, such as watching TV.

Both computer gamers and console gamers are today using inadequate means to combine a visual display, the entertainment unit itself, whether a console or a computer, and the multitude of peripherals available that are required for a rewarding experience, such as joysticks, steering wheels, etc. This decreases the quality of the gameplay and makes for a complicated setup process, resulting many times in a frustrating and time-consuming procedure and sometimes even damage to cabling or parts and accessories.

Currently, there is no known device or furniture item that would provide an effective way of arranging all the necessary gaming and other peripherals together, while maintaining ease of access to each of them separately or together. For instance, U.S. Pat. No. 6,089,663 to Hill shows a video game apparatus that has a rocking base, with an optional stabilizing system. However, in this patent, there are no means to attach multiple video game peripherals and no option to ergonomically posture the seat.

U.S. Pat. No. 6,102,476 to May et al., U.S. Pat. No. 6,092,868 to Wynn, and U.S. Pat. No. 5,799,305 to Hocking disclose certain ways to integrate a chair with multiple computer peripherals. These patents, however, choose to bring a screen and a set of input devices in front of a user by swinging a cantilevered arm from a side, which poses a number of practical and structural problems.

Thus, while there are many initiatives to either provide separately gaming furniture or accessories to facilitate videogaming, or improve the ergonomic quality of an office workstation, computer desk or office chair, there have been virtually no efforts made to improve the gaming related needs of a computer/workstation user, or integrate a chair, a workstation and multiple gaming accessories into one integrated unit.

Thus, no compact units for either home use or gaming arcade machines exist that provide flexibility to accommodate a rapidly changing technology, provide enhanced gameplay of familiar and popular game titles, or accommodate a broad range of human dimensions and a diversity of ergonomic postures.

SUMMARY OF THE INVENTION

The present invention comprises an integrated videogaming and computer workstation, which brings together the functionality of a gaming machine with the comfort of an ergonomic workstation, all integrated with the computer hardware that allows a user to play virtually any commercially available videogame or operate a computer, at the user's convenience.

The invention allows gaming arcades to use the latest games, offering titles that already have a huge installed fan base. Besides being familiar to users, these games are on par with current trends and technologies. This greatly benefits attendance to gaming arcades.

Also, since the invention accommodates proven, mainstream computer and gaming technology, with readily interchangeable components, fewer specialized technical solutions are required, which eliminates the need for costly custom parts and specifically trained personnel, and the invention provides virtually maintenance-free operation.

For a home user, the invention provides a way to organize computer accessories in a computer system that most people already own, while doing so in an attractive and compact manner. Also, the invention allows the carrying out of tasks unrelated to gaming when not used as such, combining the functionality of an ergonomically adjustable workstation. Furthermore, all of these features can be integrated with a tiltable chair that further enhances the comfort of a user, thus creating a multifunctional compact, integrated pod that serves a number of functions related to either regular computer use or entertainment.

It is an object of the invention to allow the user to be immersed in gameplay with little distraction from lack of comfort, improper position of the peripherals or lengthy set-up procedures.

An additional object of the invention is to provide the opportunity to accommodate a multitude of interchangeable computer and gaming peripherals while being able to select the ones appropriate for a particular videogaming activity.

Yet another object of the invention is to provide an ergonomically integrated workstation and chair that is compact and easy to use, provides a high degree of configurability, and can be fitted with existing consumer computer peripherals.

Still another object of the invention is to provide electrical ports and wires integrated into the workstation to allow users to electrically connect all the components and peripherals of a computer system, whether their own or provided by others, so that the entire unit can function as a whole rather than as a mere sum of parts, and also providing a cable and clutter-free environment and esthetically pleasing workstation.

More particularly, the invention comprises a workstation comprising:

a support assembly;

means for mounting at least one screen and computer keyboard on the support assembly; and means for mounting at least one peripheral device adjacent to the support assembly so as to permit the peripheral device to be pivoted down in front of and below or to a side of the screen when use of the peripheral device is desired, and pivoted up and away from the screen when use of the peripheral device is not desired.

In one embodiment, the means for mounting the peripheral device comprises at least one movable arm assembly attached to the support assembly, the arm assembly including at least one arm swivelable in a vertical plane on either side of the screen, the arm assembly suitable for mounting the peripheral device.

In one embodiment, the support assembly is pivotally attached to a chassis adapted to sit on a floor and is configured to oscillate in a vertical plane between two extreme resting positions so as to allow a user to comfortably enter or exit a chair attached to the chassis, facing the screen, and so as to permit ergonomic use of the keyboard and peripheral device.

Preferably, the support assembly is urged away from the chair into a normally-open, inactive position.

Preferably, the peripheral device is either fixed to the arm assembly or removable. The peripheral device may include one or more of the following devices: joystick, steering wheel, keyboard, mouse, trackball, touch pad, touch screen, button, switch, pedal, speaker, microphone, camera, glove device, disk drive or any other device suitable for use in video game playing or computer operations.

In another embodiment, the invention comprises an ergonomically integrated videogaming and computer workstation and chair unit, comprising:

a rigid chassis adapted for placement on a floor and suitable for mounting a computer adapted to power interactive video games;

an adjustable chair mounted to the chassis;

an inclinable ergonomic backrest, movable independently of the seat, attached to the undercarriage rearwardly of the seat for supporting the upper torso of a user;

a movable assembly of support members pivotally attached to the chassis and comprising first and second links of a four-bar linkage, the support members being biased away from the chair;

a user interfacing console including at least two swivelable arms attached to a console frame, the console frame being attached to the assembly of support members and adapted to act as a third link of the four-bar linkage, the console frame suitable for mounting a display screen, slidable computer keyboard, mouse, disk drive and sound control devices, the arms suitable for mounting at least one videogaming peripheral device, the arms adapted to describe a motion between a starting position oriented approximately vertically and a finishing position oriented approximately horizontally toward the user seated in the chair, allowing for upper ends of the arms to move farther or closer to the user, whereby the arms may be swiveled down by the user to permit operation of the peripheral device and swiveled up when operation of the peripheral device is not required;

a locking and release apparatus associated with the support members for locking the support members in various positions of closeness to the chair so as to keep the console at a distance and so as to allow positioning of the peripheral device and keyboard within arms' reach of the user when so desired; and electrical connection ports and wires associated with the chassis, support members, console frame and arms for connection to the computer, peripheral device and external networks so as to provide electric power and data connections and for permitting computer and video gaming devices to be attached and detached in interchangeable fashion.

In another embodiment, the invention comprises a chair suitable for use with a videogaming and computer workstation, comprising:

a vertically adjustable undercarriage;

a tiltable seat attached to the undercarriage; and a tiltable backrest attached to the undercarriage and movable independently of the seat;

whereby the seat is adapted to be raised and lowered by a user seated in the chair, and whereby the backrest is adapted to be tilted backward and forward by the user independently of the seat, and whereby the undercarriage is adapted to cause the seat to be tilted backward and forward in association with the backrest as the backrest is tilted backward and forward.

In another embodiment, the chair is attached to a chassis adapted for placement on a floor, the chassis being adapted to mount a screen, computer keyboard and peripheral device ahead of the chair, the chair being adapted to provide ergonomic support for the user's posture as the user operates the keyboard and peripheral device while seated in the chair.

In another embodiment, the undercarriage includes a tilting mechanism for tilting the chair frame and the seat, whereby when the backrest is tilted backward, the seat is moved forward, the back end of the seat is tilted downward over a first distance and the front end of the seat is tilted downward over a second distance, and when the backrest is tilted forward, the seat is moved backward, the back end of the seat is tilted upward over the first distance and the front end of the seat is tilted upward over the second distance.

In another embodiment, the tilting mechanism for the chair frame and seat comprises:

a shaft fixedly attached to the undercarriage;

a chair frame pivotally attached to the shaft, the chair frame adapted to mount the backrest;

a bracket fixedly attached to the shaft, the bracket supporting first and second pivot points;

biasing means attached between the first pivot point of the bracket and the chair frame;

a first see-saw link pivotally attached to the shaft and having first and second pivot points at opposite ends thereof;

a second see-saw link pivotally attached to the second pivot point of the bracket and having first and second pivot points at opposite ends thereof, the first pivot point being pivotally attached to the first pivot point of the first see-saw link;

an upright link having first and second pivot points at opposite ends thereof, the first pivot point of the upright link being pivotally attached to the chair frame and slidably attached to the second pivot point of the first see-saw link; and a seat support having front and back pivot points, the back pivot point pivotally attached to the second pivot point of the upright link, and the front pivot point being pivotally attached to the second pivot point of the first see-saw link.

The invention also comprises a method for operating a workstation, comprising the steps of:

mounting a screen and computer on a frame for permitting video game and computer operation;

pivotably mounting at least one peripheral device on the frame for controlling images on the screen;

pivoting the peripheral device into a first position up and away from the screen when use of the peripheral device is not desired; and pivoting the peripheral device into a second position down in front of and below or to a side of the screen when use of the peripheral device is desired.

In another embodiment, the invention comprises a method for operating a videogaming and computer workstation and chair unit, comprising the steps of:

providing a chassis adapted to sit on a floor and suitable for housing a computer;

providing a chair mounted to the chassis;

providing a movable console ahead of the chair, the console attached to a movable support assembly pivotally mounted to the chassis and pivotable over a predetermined range, the support assembly being alternatively biased toward and away from the chair by a biasing force into first and second resting positions, the console including at least one screen and keyboard mounted to a console frame attached to the support assembly, and at least one arm assembly pivotably mounted to the console frame, the arm assembly supporting at least one peripheral device;

entering the chair while the console is resting in its first resting position farthest from the chair;

swiveling the console toward the chair until the support assembly reaches its second resting position so as to position the peripheral device within arms' reach of the user seated in the chair;

operating the computer and peripheral device as desired;

releasing the support assembly, thus allowing the biasing force to swivel the support assembly away from the chair and into the open position when the user no longer wishes to operate the computer or peripheral device; and exiting the chair.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which:

FIG. 14 is a partial view showing various components of the locking mechanism described in FIG. 13

FIG. 15 shows a component of the locking mechanism described in FIG. 13

FIG. 16A is a front right perspective view showing the latching component of the locking mechanism.

FIG. 16B is a right side view of the latching component attached to one of the front pivoting legs of the chassis FIG. 16C is a sectional view taken along the lines 16C-16C' in FIG. 16B

FIG. 26 is a partial exploded view showing one of the symmetrical pivot points of the pivoting arms part of the front console FIG. 27 is a partial view with areas removed for clarity that shows the pivoting left table surface of the front console FIG. 28 is a partial sectional side view of the left pivoting table taken along the line 28-28' in FIG. 25

FIG. 30A is a rear left respective view of the front console shown with its joystick arms lowered in a position ready to use FIG. 30B is a rear left perspective view of the front console shown with its steering wheel arm a lowered in a position ready to use FIG. 31 is a right side view of the front console showing the operation of the steering wheel arm of the front console FIG. 32 is a partial right side view showing the interaction between the joystick arm and its lowered position, a computer mouse and the table it sits on FIG. 33 describes a preferred solution of attaching a joystick peripheral to a flat horizontal end of one of the joystick arms of the front console

DETAILED DESCRIPTION OF THE INVENTION

In the description to follow, references to the terms "front," "rear," "left," "right," "upper" and "lower " are taken from the perspective of a user seated with his or her back against a backrest 401.

Figure 1:
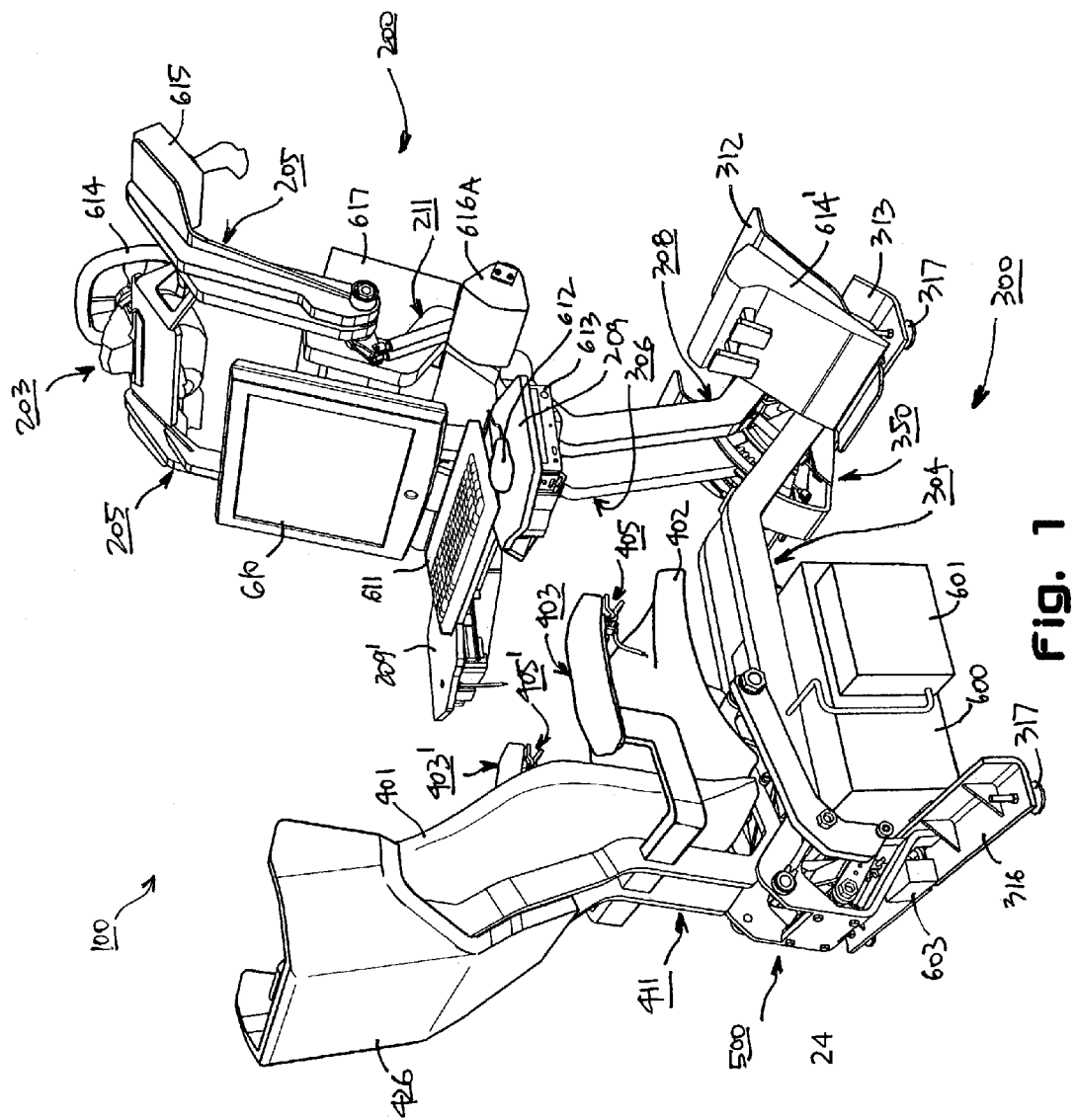
FIG. 1 is a perspective view taken from the rear right of a preferred embodiment of a videogaming and computer workstation having a tiltable chair, a chassis and a front console unit.

Referring now to the drawings, FIG. 1 shows a first embodiment 100 of an ergonomically integrated videogaming and computer workstation according to the invention. As noted earlier, this embodiment includes a floor-engaging rigid base frame structure 300 onto which an adjustable chair 400 is supported by an undercarriage assembly 500. Further supported by the base frame 300 is a console unit 200. An electrical wiring system 600 is also comprised in the workstation 100.

Figure 2:
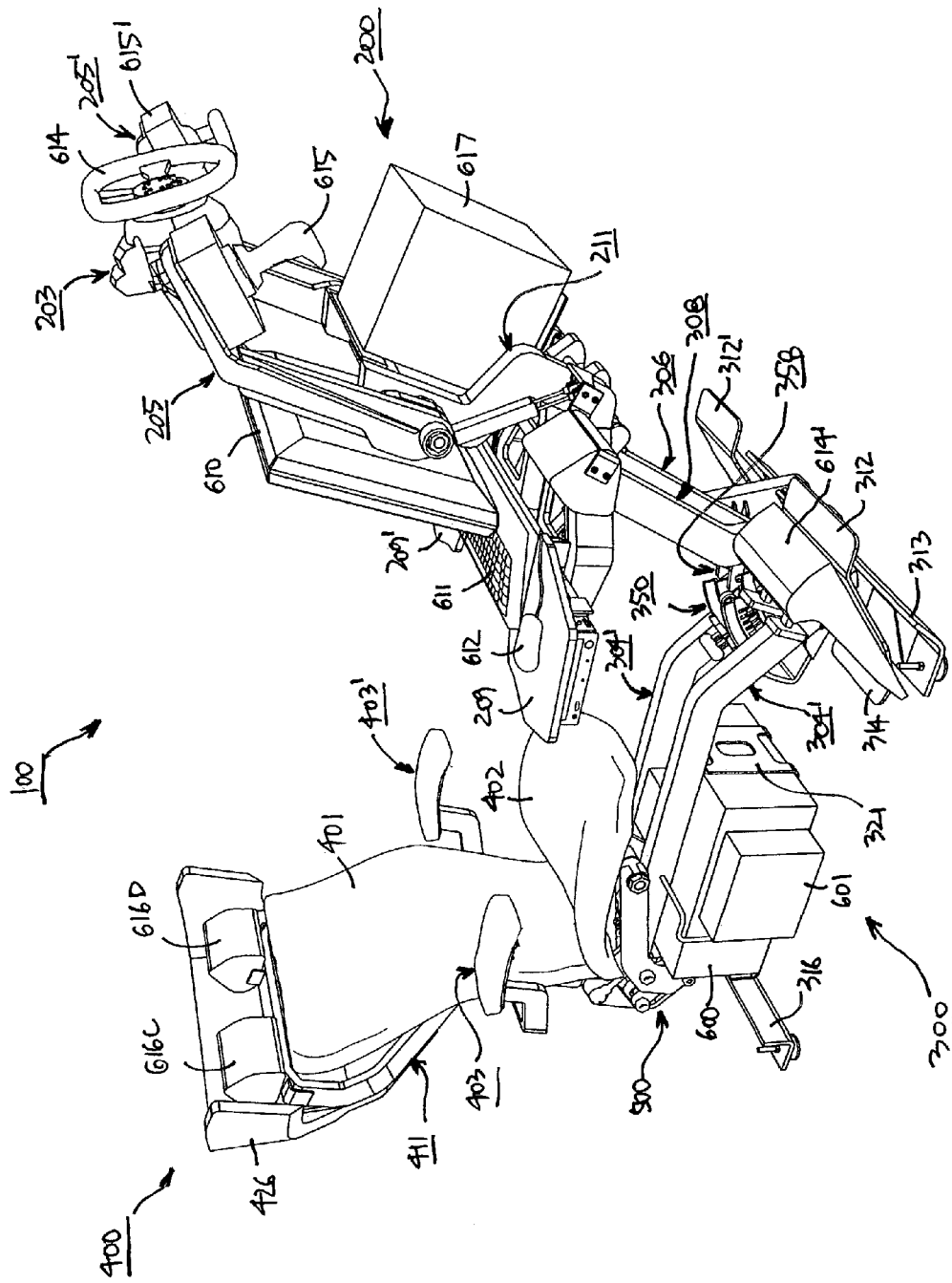
FIG. 2 is a perspective view taken from the front right of the workstation shown in an open position for a user to sit in the chair.
Figure 3:
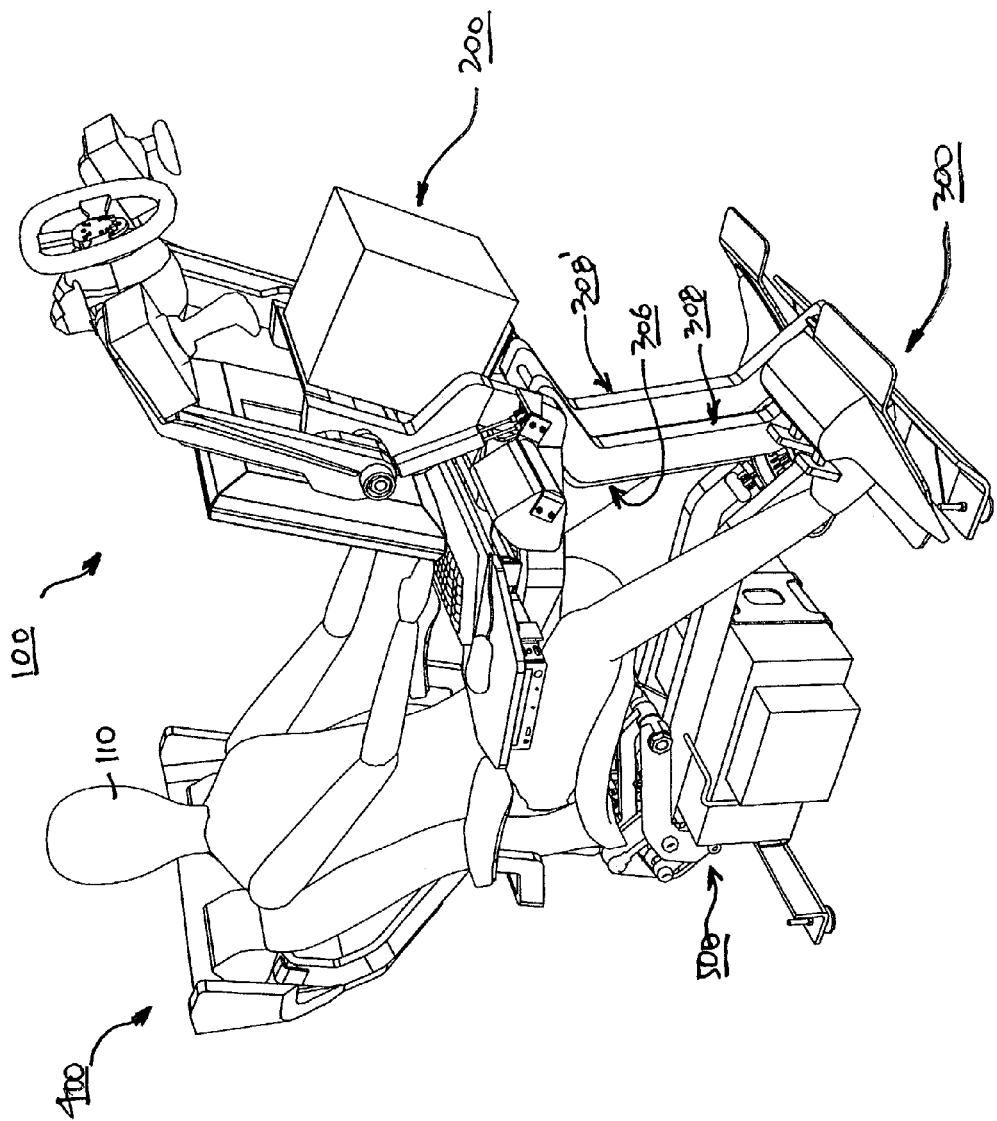
FIG. 3 is a perspective view taken from the front right of the workstation shown in closed position with a user sitting in the chair.
Figure 4:
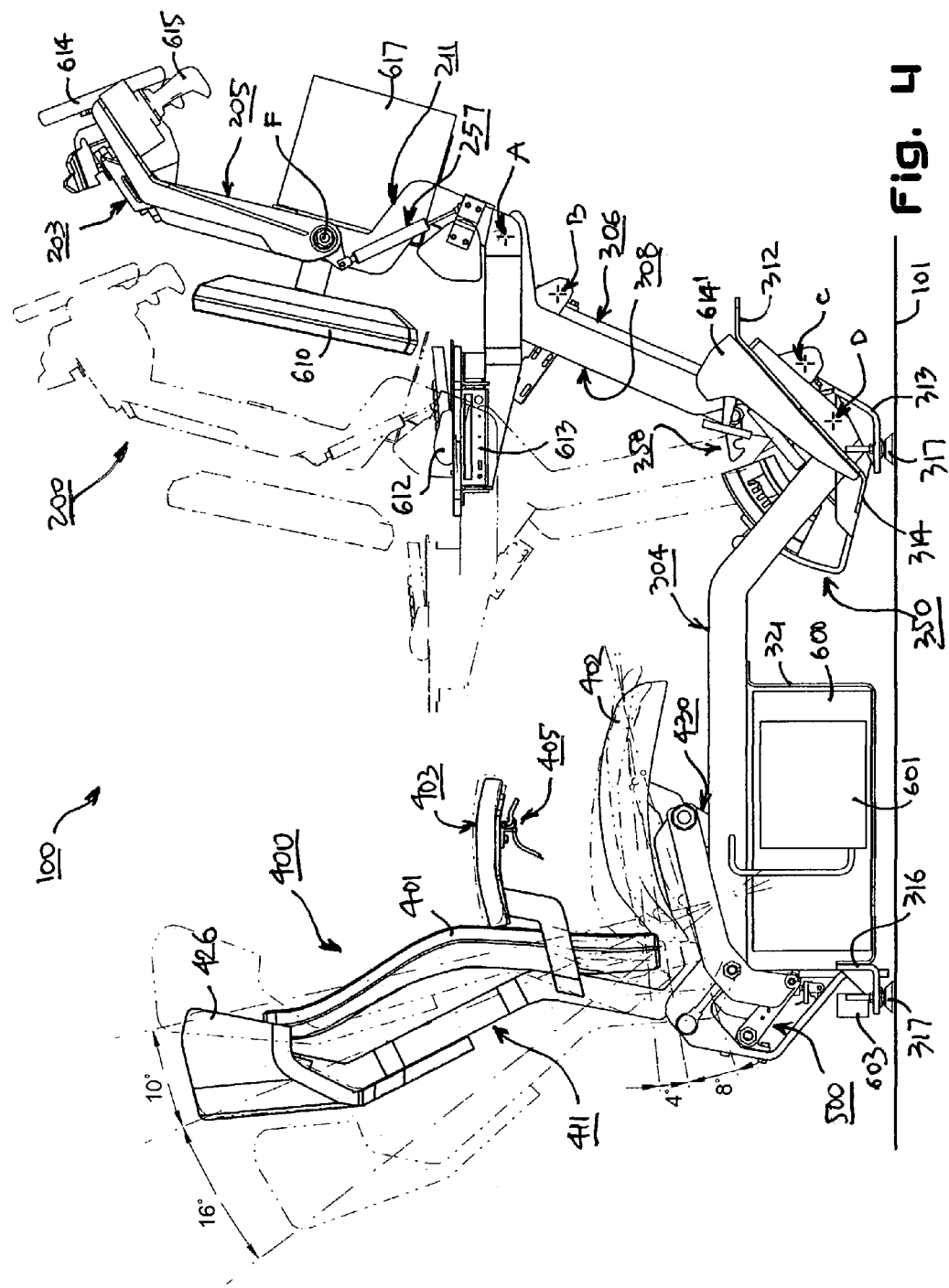
FIG. 4 shows a right side view of the workstation with a chair in preferred reclining forward, middle and reclined tilt positions and a front console in its closed and opened positions.
Figure 5A:
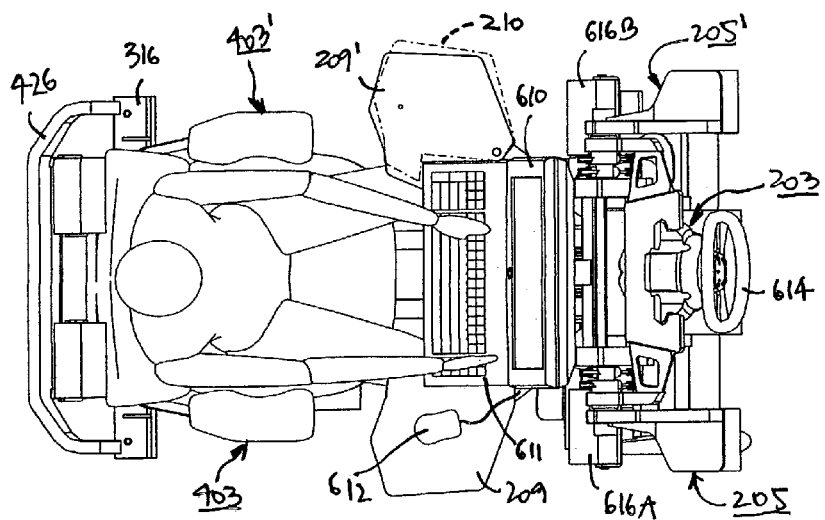
FIG. 5A is a top view of the workstation
Figures 5B, 5C:
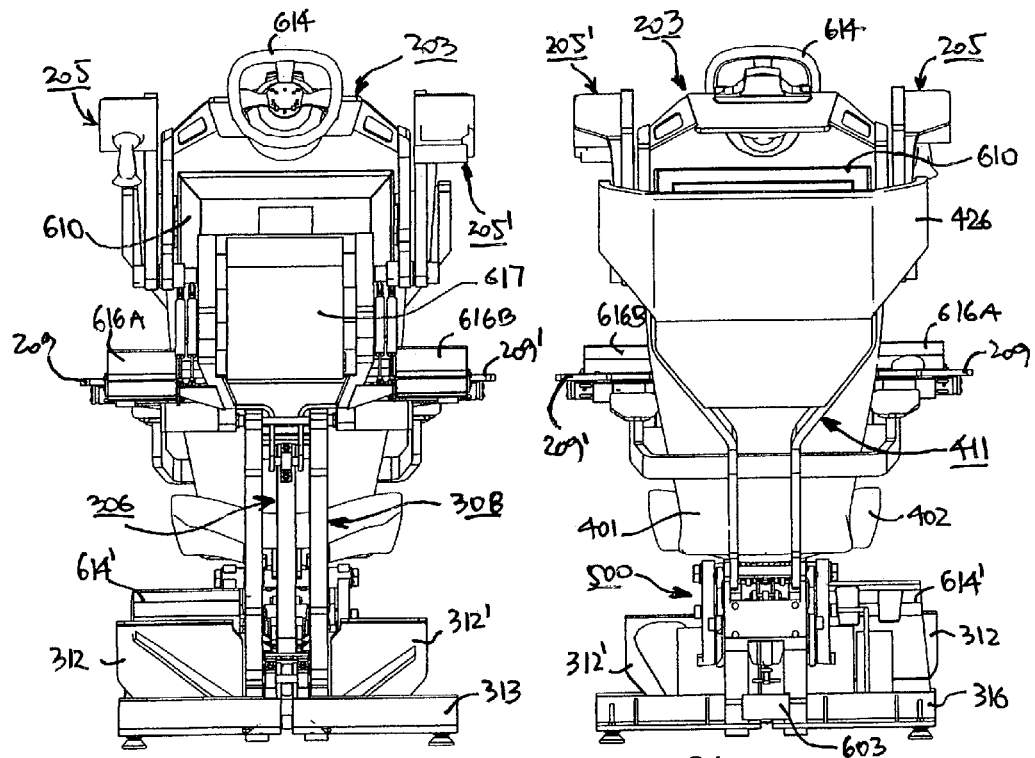
FIG. 5B is a front view of the workstation
FIG. 5C is a rear view of the workstation

FIG. 2 shows a right-front perspective view of an instance of the workstation 100 in an open position allowing a user to step in and sit in the chair. Comparatively, FIG. 3 shows a view taken from the same angle that depicts the workstation in a closed position, with a user represented seated as per intended use. FIG. 4 shows a side elevation of the workstation 100 in an open position and having the closed position figured in phantom lines.

Figure 7:
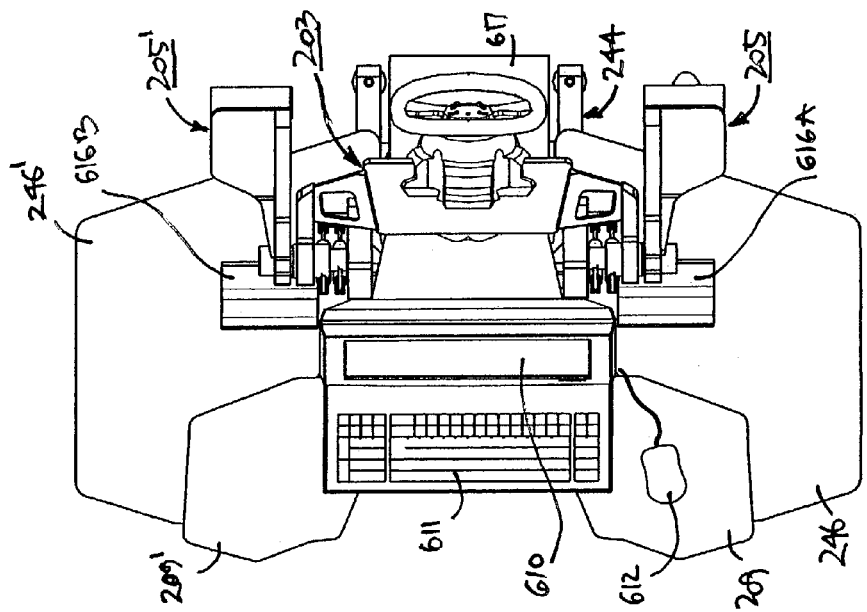
FIG. 7 is a top view of an alternative embodiment of the workstation.
Figure 6:
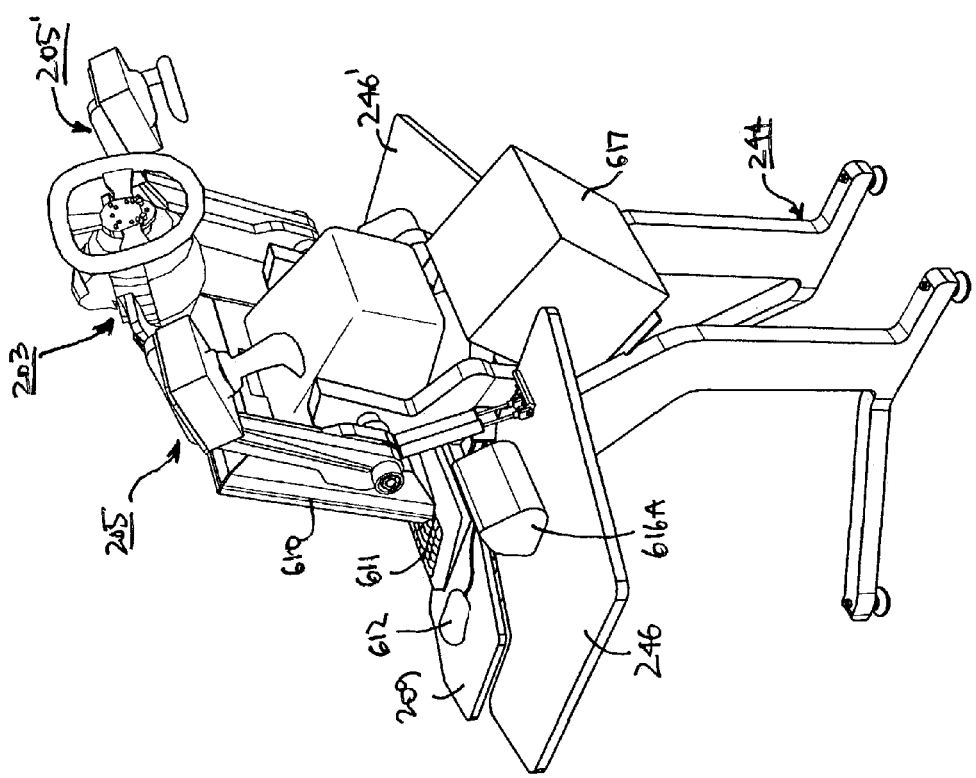
FIG. 6 is a front right perspective view of an alternative embodiment of the workstation.

FIGS. 6 and 7 show an alternate embodiment 102 where the console unit 200 is supported on a set of legs 244 and has a pair of flat surfaces 246 and 246' supported thereto.

Base Frame

Figure 8:
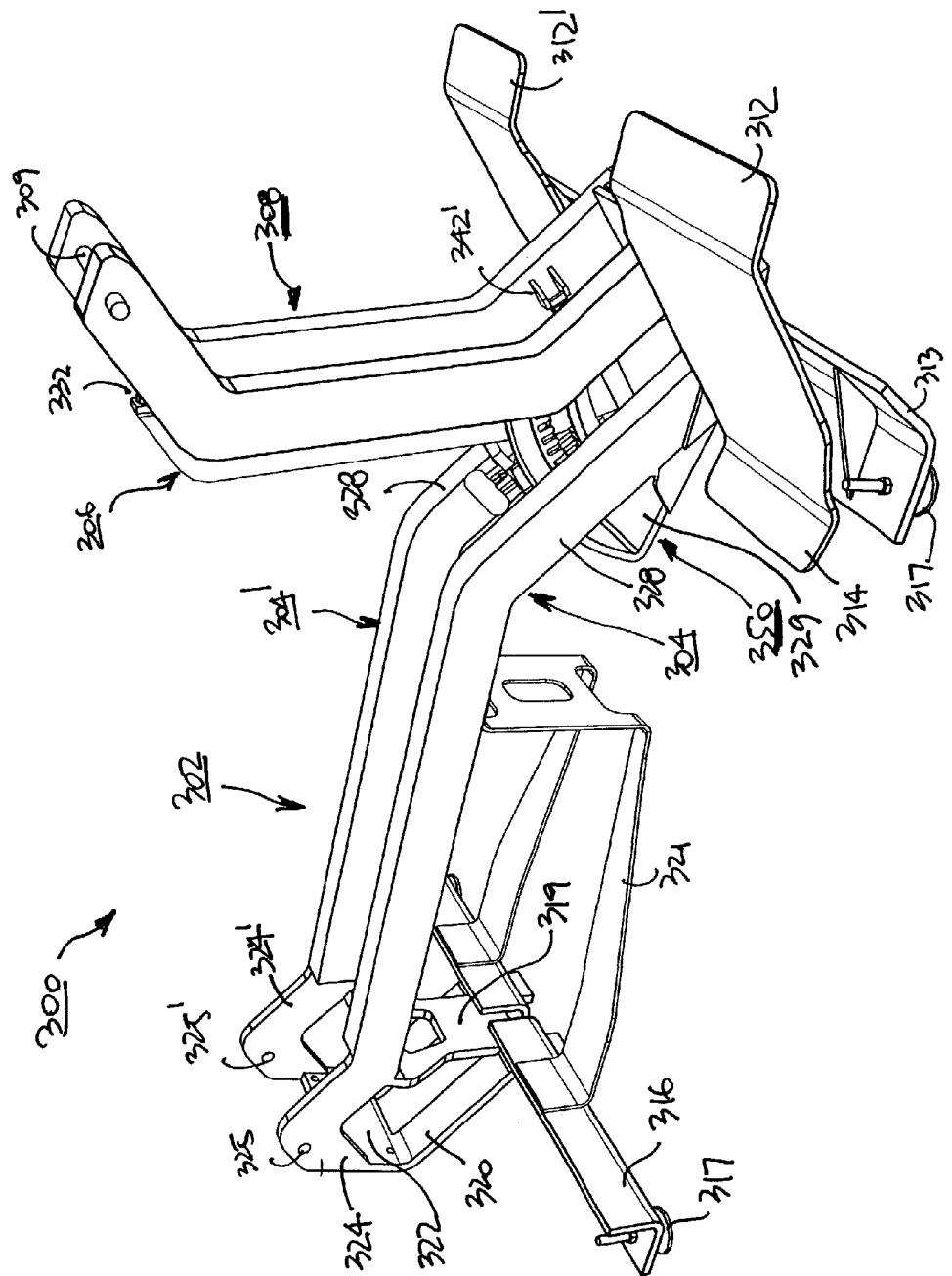
FIG. 8 is a view of only the lower chassis and front pivoting members of the support assembly for the workstation shown in their closed position

As per FIG. 8, the base frame 300 includes a base chassis 302 that is supported by cross members 313, 313' in front and 316, 316' respectively in the rear. The paired cross members 313, 313' and 316, 316' are configured for placement on a floor 101 and have levelers 317 provided at each end thereof, so that if the floor is uneven the entire base chassis 302 can be brought to a substantially level position. Furthermore, a CPU support shelf 321 is attached to the chassis 302.

Chassis

The chassis 302 preferably includes two generally longitudinal members 304 and 304', substantially parallel to each other. Each of them has a generally horizontal portion 326 and 326' respectively continued at their front ends with a member 328 and 328' sloping downwardly. Starting to observe the configuration of the base frame 300 from the rear end progressing to the front as described on FIG. 8, it can be observed that at their rear ends, members 304 and 304' are each attached, such as by welding or bolting, to a flat, angled brace 324 and 324' respectively. Each brace 324 and 324' is further attached to oblong members 320 and 320' respectively, that slope downwardly. A stiffening plate 322 connects angled braces 324, 324' and oblong members 320 and 320', respectively. A vertically placed, Y-shaped flat piece of steel or other strong material 319 connects the lower front ends of the oblong members 320 and 320' with the rear ends of horizontal members 326 and 326' respectively. In this manner described, angled braces 324, 324', with oblong members 320, 320', stiffener plate 322 and vertical piece 319 effectively create a rigid spatial cage-like structure attached to the horizontal members 304 and 304' respectively. This portion of chassis 302 constitutes the base to which the chair undercarriage 500 is attached, as best described in FIG. 1.

Also included in the chassis configuration and serving the role of a stiffener for the front portion is an L-shaped flat piece of steel or other strong material 329 which has a depth equal to the distance between the inside faces of members 328 and 328'. The flat piece 329 is welded or otherwise attached to the inside faces of the aforementioned members generally at both the top and lower ends and loops below the pair 328 and 328' creating a pocket-like configuration. Inside this pocket, mounted toward the edges of the part 329 is a pair of mounting brackets 341 and 341'. Further comprised in the chassis 302 and best described in FIG. 12 it can be observed that the front ends of portions 328 and 328' are connected to a Z-shaped flat piece of steel or other strong material 330 that has the role of stiffening and connecting the front ends of members 304 and 304'.

Figure 9:
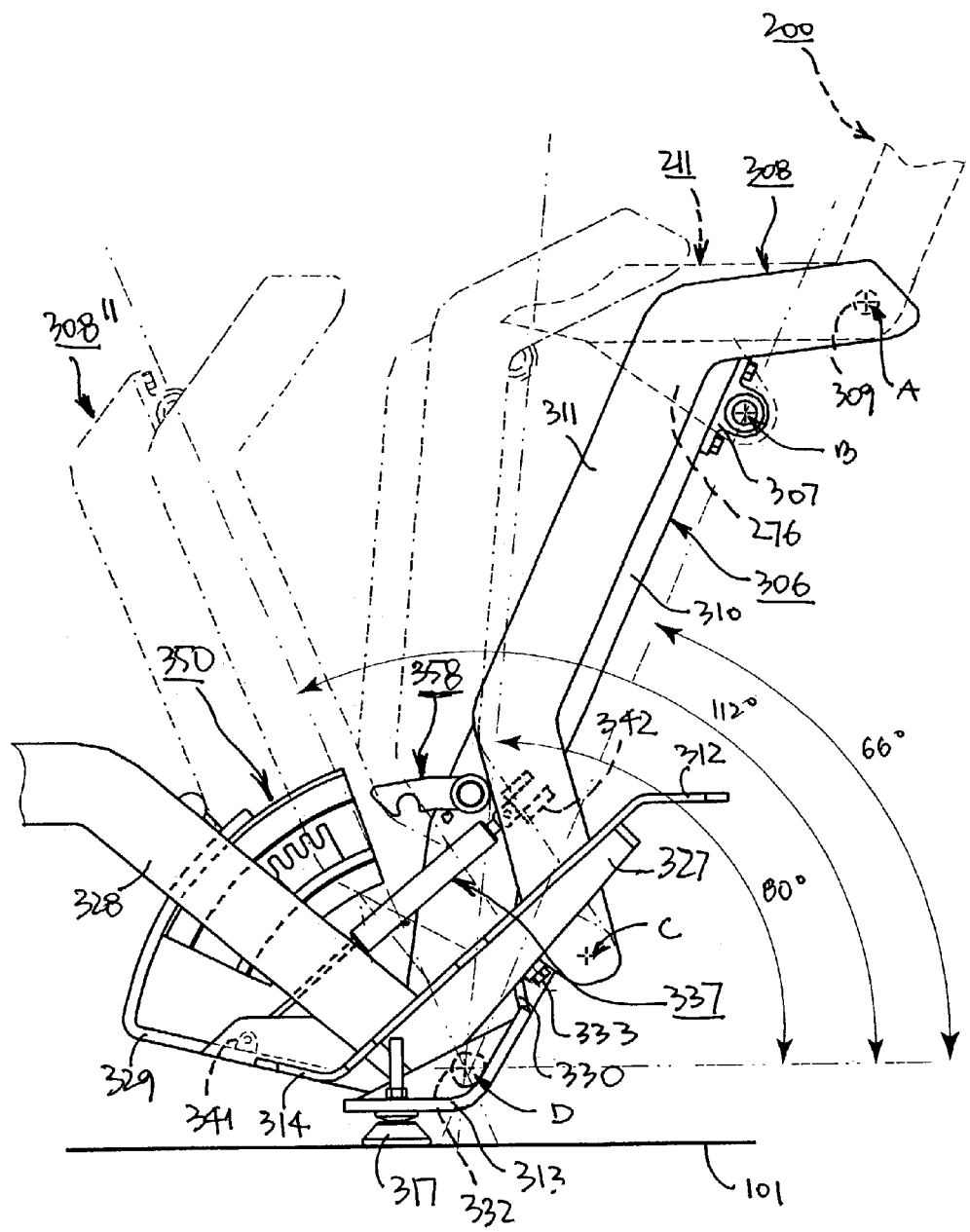
FIG. 9 is a partial right side view of the front of the chassis with the front pivoting members shown in their open and maximum-minimum closed positions
Figure 10:
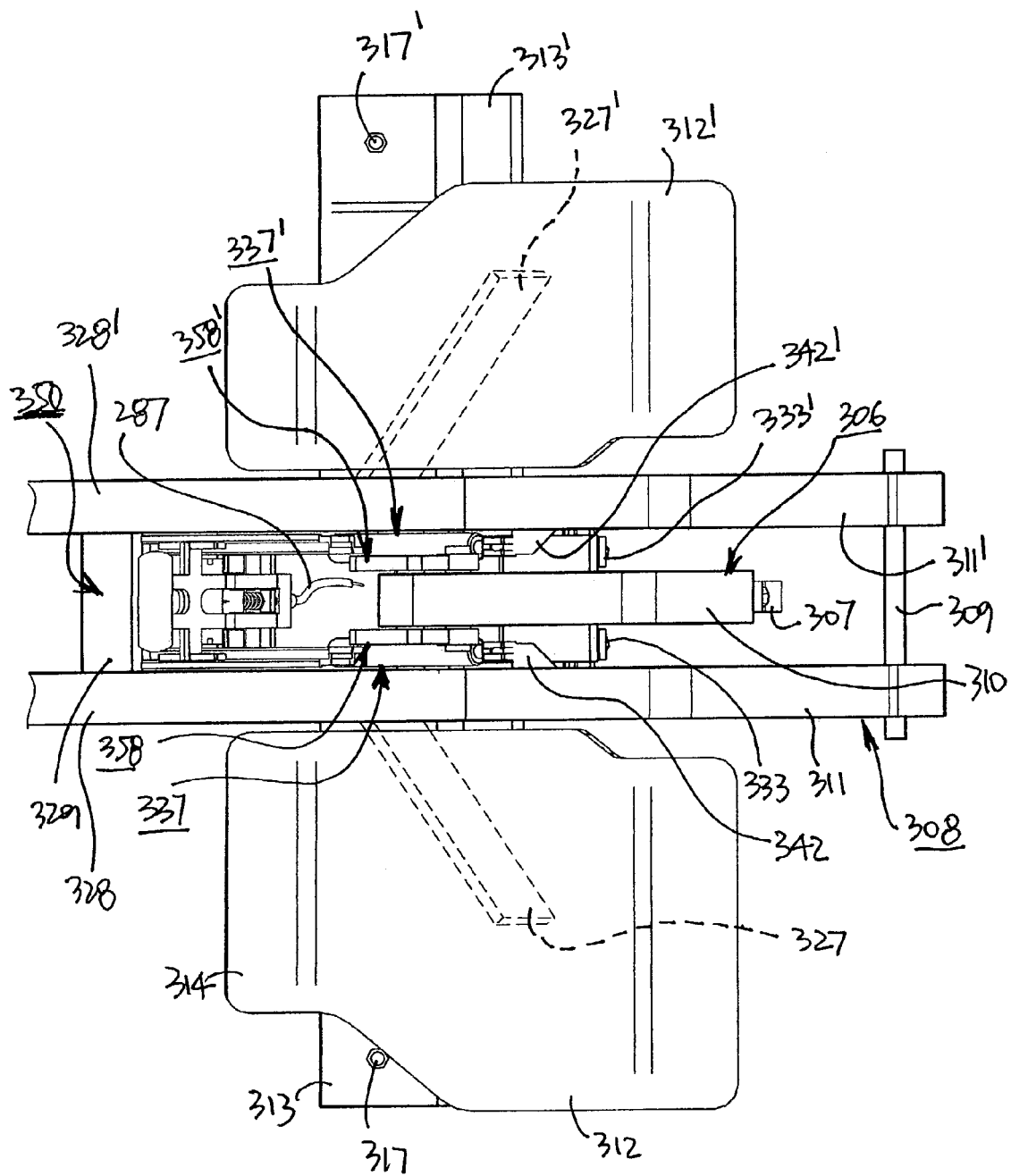
FIG. 10 is a top view of the front of the chassis with the front pivoting members shown in their open position

Attached to chassis 302 and observed in both FIG. 9 and FIG. 10, two elongated members 327 and 327' each have one end welded to the lower end portion of members 328, while the other is oriented generally forward and upwardly. Together with cross members 313 and 313' they serve as support for a pair of flat footrests 312 and 312'. In a preferred embodiment of the invention, the right footrest 312 has a lower portion 314 that is substantially horizontal and thus creating a ledge holding an optional foot pedal accessory 614 from sliding down. For the purpose of accommodating a wide variety of pedal accessories, such as foot-operated switches or other controls, the right footrest 312 is preferably wider than the left one 312', since the majority of users are right-handed and right-footed.

Support Assembly

Figure 11:
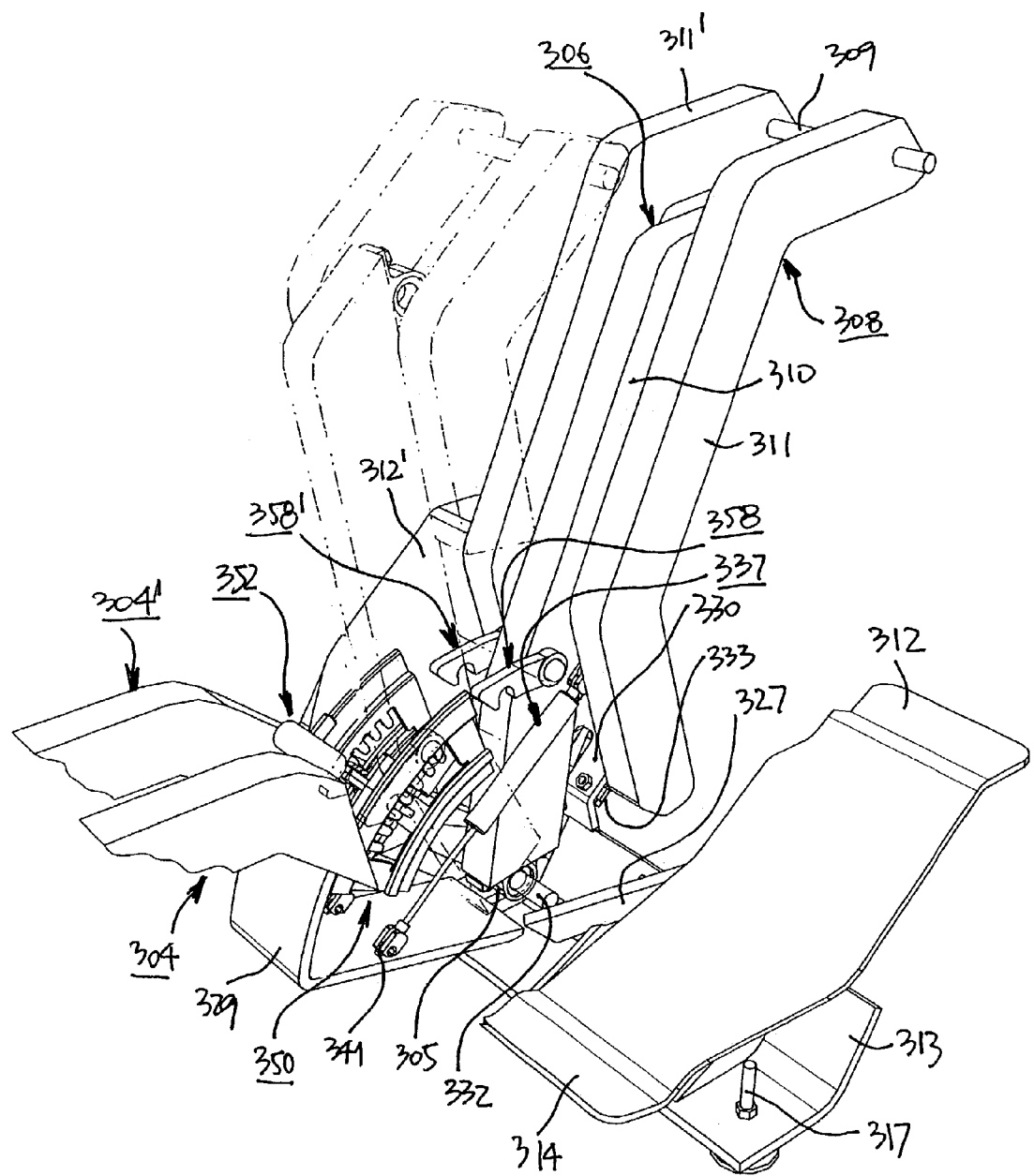
FIG. 11 is a rear right fragmentary perspective view of the front end of the chassis with the front pivoting members shown in their open position and one possible closed position

Included in the base frame 300 is a support assembly 308, located in this embodiment ahead of the chair, and acting as a supporting leg assembly and comprising a pair of members 311 and 311' (see FIGS. 10 and 11), which are preferably square tubes, respectively bent in a generally crescent shape, with the concave portion towards the front of the workstation 100. Also part of the frame 308 is a lower shaft 334 (FIG. 12) fixedly attached to the inside faces of members 311 and 311' respectively and an upper shaft 309 (FIG. 11) that connects upper ends of members 311 and 311'. Both ends of shaft 309 protrude through the outer faces of members 311 and 311' with equal distances at left and right.

Figure 12:
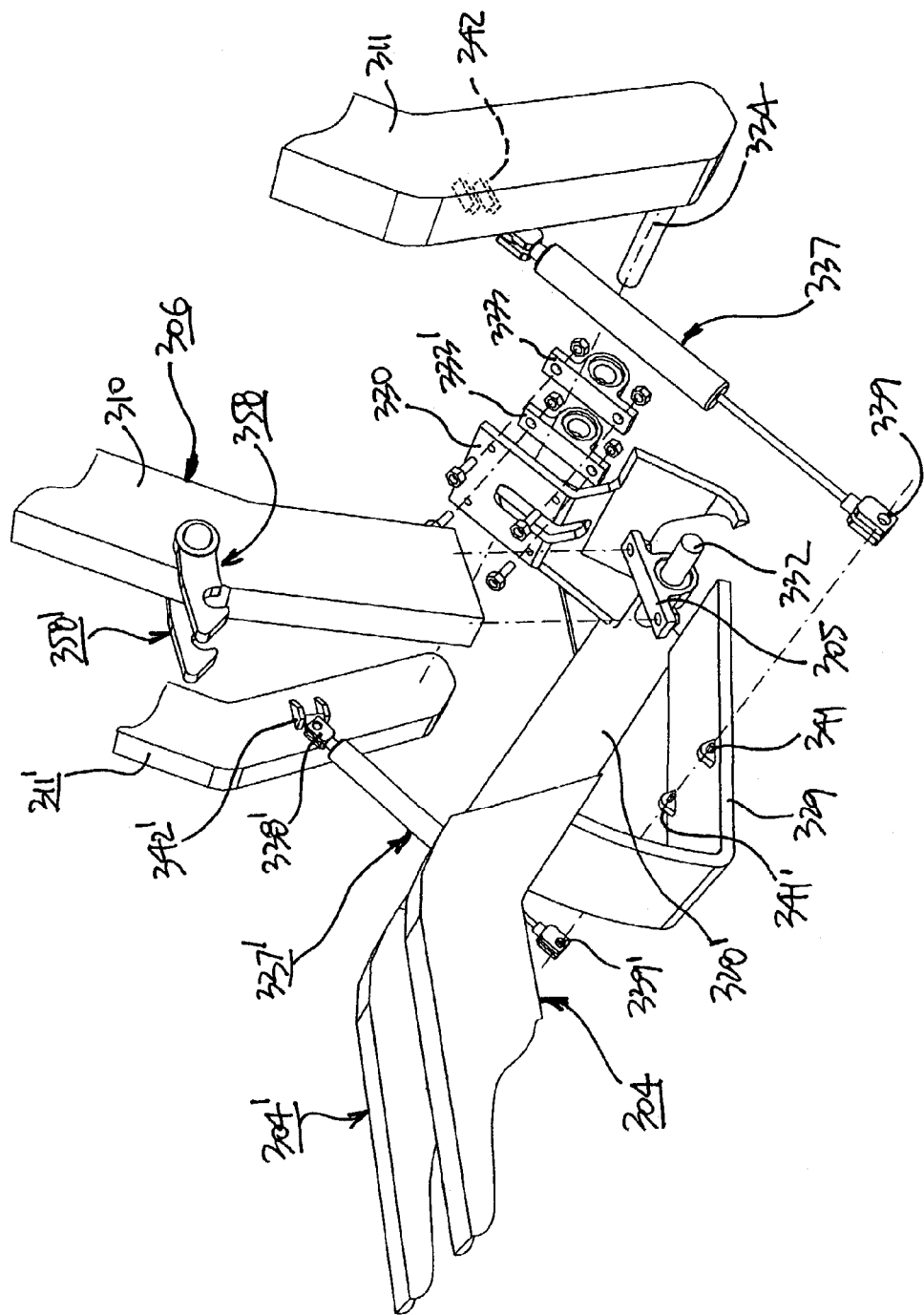
FIG. 12 is a fragmentary exploded view of the front end of the chassis with the front pivoting members shown in their open position.

With reference to FIG. 12, two base-mounted bearings 333 and 333' are fixedly bolted or otherwise attached to the Z-shaped plate 330 of chassis 302, and are pivotally supporting the shaft 334 of leg 308 so that the leg 308 pivots around a horizontal axis that is normal to a front-rear imaginary median line of the workstation 100. Included in the leg 308 is a pair of mounting brackets 342 and 342' which are fixedly attached to the lower portion of members 311 and 311' respectively and to the inside faces thereof.

FIG. 12 best describes a pair of extension-force gas spring devices 337 and 337' which have a lower eyelet 339 and 339' respectively, hingedly attached to mounting brackets 341 and 341' respectively. Gas spring devices 337 and 337' also comprise upper eyelets 338 and 338' respectively which are hingedly attached to mounting brackets 342 and 342' respectively. It should be noted that while gas spring devices are preferred for the dampened linear motion they provide, any device that provides an elastic extension force between two points can be used instead. The purpose of this described configuration is apparent in FIG. 9 where the particular placement of brackets 341 and 342, (overlapping brackets 341' and 342' respectively) together with a correct choice of stroke length for the gas spring devices results in a preferred angular travel of leg 308 of maximum 112 degrees and minimum of 66 degrees around a pivoting point C concurrent with the axis of shaft 332, in reference to plane of floor 101 and measured counterclockwise in a right side view.

Further included in base frame 300 is a center leg 306, preferably constructed of rectangular section steel tube. The leg 306 is comprised of a generally vertical member 310, a base-mounted bearing 305 attached to the lower end of member 310 and a second base-mounted bearing 307 (FIG. 21) attached to the upper end of member 310. The bearing 305 is mounted on a shaft 332, which in turn is fixedly attached to the inward facing sides of members 328, and 328' respectively, substantially close to the front ends thereof.

The entire assembly thus allows the supporting column 306 to pivot freely around a horizontal axis that is normal to a front-rear imaginary median line of the workstation 100, concurrently with the axis of the shaft 332.

Locking Mechanism

FIG. 9 shows also included in base frame 300 a locking and adjusting assembly 350 fixedly attached to the inward facing sides of members 328 and 328' respectively. Locking mechanism 350 interacts with a pair of hooks 358 and 358' which are pivotally attached to the lower portion of leg 306 and constrains the pivotal movement of column 306 along a radial path with the center at the pivoting point D of column 306, concurrent with axis of shaft 332 and provides a plurality of locations where hooks 358 and 358' can be positioned.

As described in FIGS. 13-20, the locking assembly 350 is identically configured in relation to a vertical symmetry plane that is oriented along the main longitudinal axis of the workstation 100. It is comprised of two profiled, notched side plates 356 and 356', a handle assembly 352 and a cylindrical pin member 377, which moves slidably in relation to the handle assembly 352. Each of the side plates 356 and 356' include two arcuate guide members 357, 355 and 357', 355' respectively, which follow a radial path with the center in pivot point D of FIG. 9. Plates 356 and 356' also include a cutout 354 and 354' whose lower edge is constituted by guide members 375 and 357'. The upper edge of each cutout 354, 354' has a plurality of notches 354 and 354' disposed radially along a path with a center in pivot point D, each notch having two opposite sides that are parallel. Each notch shall only be as deep as the pin 377 and there should be enough open space left the radially disposed notches and each of the guide members 357 and 357' so that the ends of pin 377 can move freely along a radial path with a center in point D.

The handle 352 comprises a cross member 360, two symmetrically configured parts 361 and 361', a coil spring 380, a grip 353 and an actuating cable 288 with a flexible, non-compressible sleeve 287 which has a stopper tube piece 381.

Figure 13:
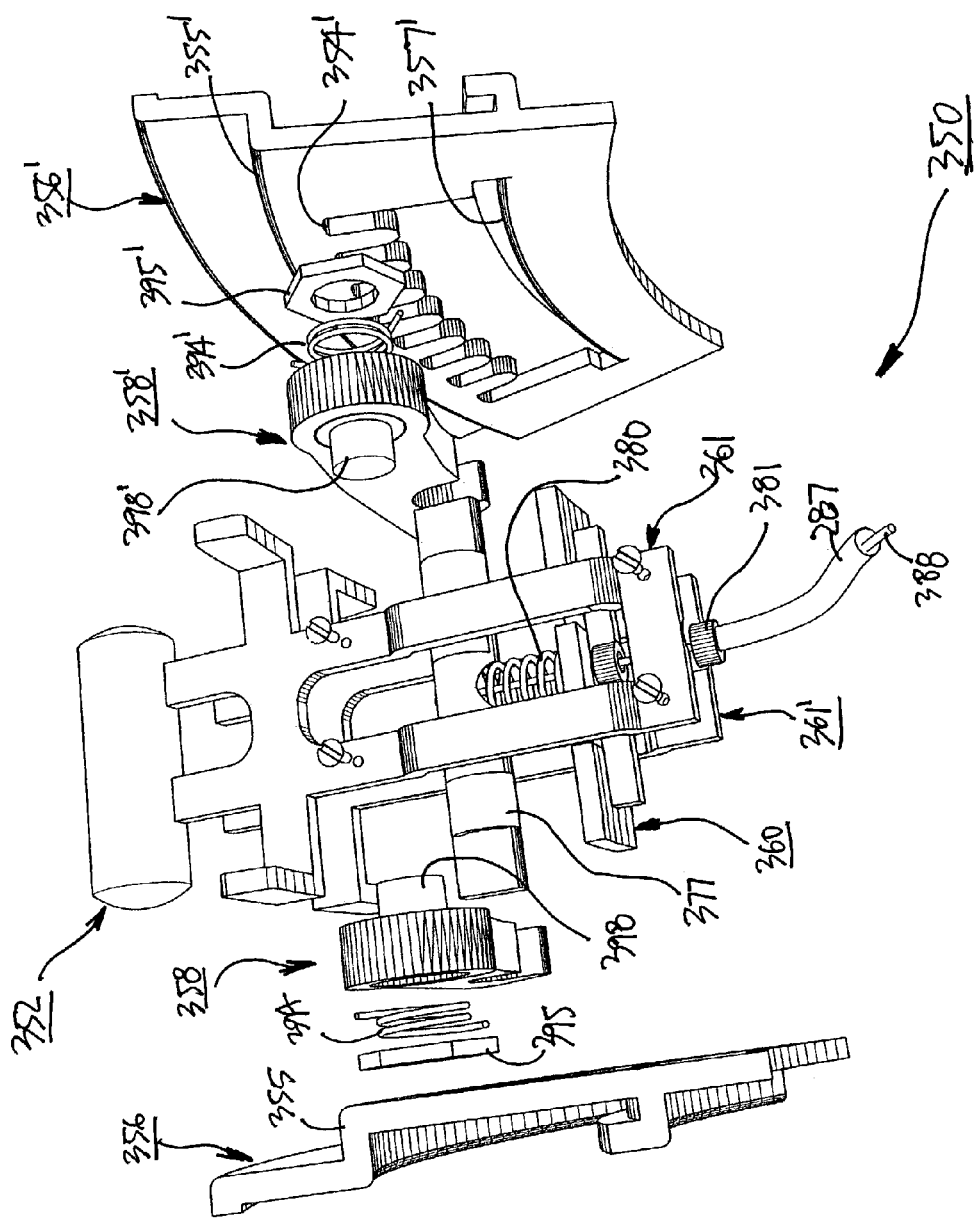
FIG. 13 is an exploded view of the locking and adjusting mechanism that can lock the front pivoting legs in a variety of positions.
Figure 17:
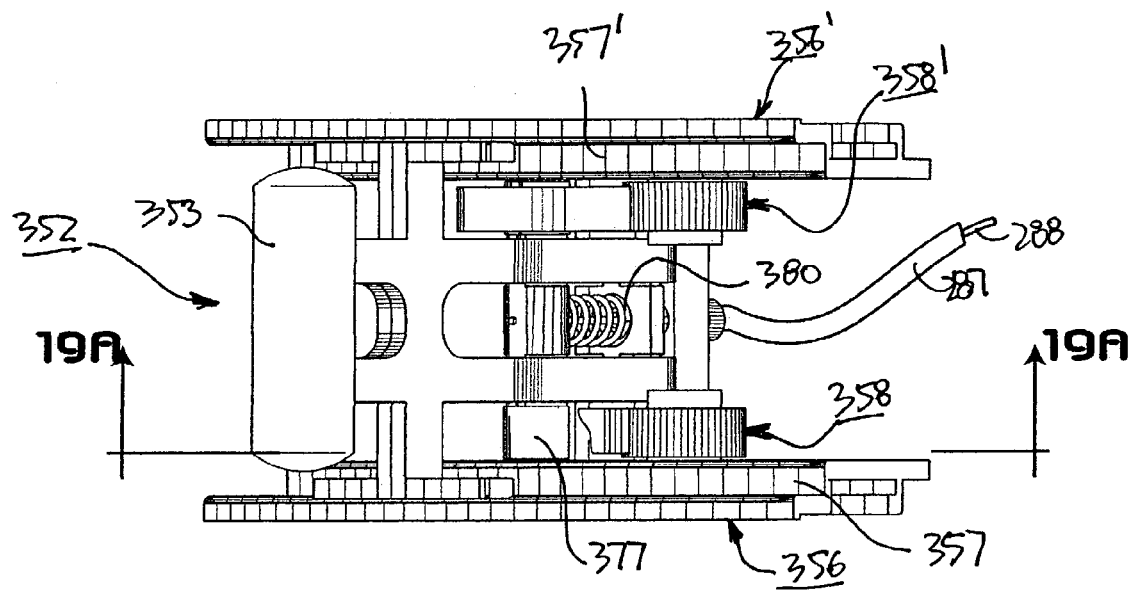
FIG. 17 shows a top view of the locking mechanism
Figure 18:
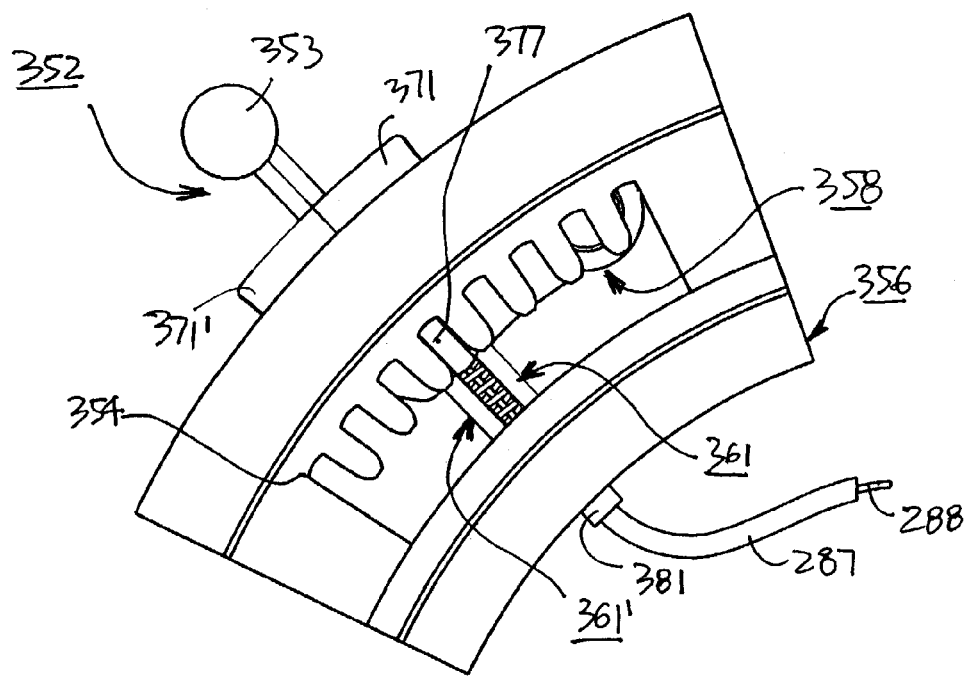
FIG. 18 is a right side view of the locking mechanism

FIGS. 13 and 14 shows how the cross member 360 is a T-shaped extrusion with two overhangs 363 and 363' at each ends of the extrusion. Overhangs 363 and 363' slide along guide members 357 and 357' respectively, while the cross member 360 has two notches 364 and 364' placed symmetrically with respect to the center of cross member 360. Also a tube 359 is placed in the center of cross member 360, thus creating a penetration that allows cable 288 to move freely through cross-member 360. The pin 377 has a series of flattened portions 374, 375 and 375', 374' respectively, which alternate with cylindrical portions such that the flattened portions and 374 and 374' are placed at both ends of pin 377. All flattened portions have their two parallel faces distanced so that the ends of pin 377 fit snugly inside any of the series of notches 354 and 354'. A cylindrical depression 378 is placed in the middle of the pin 377 receiving the upper end of spring 380. The center of depression 378 is arranged to fixedly receive one ending of cable 288.

Figure 19A:
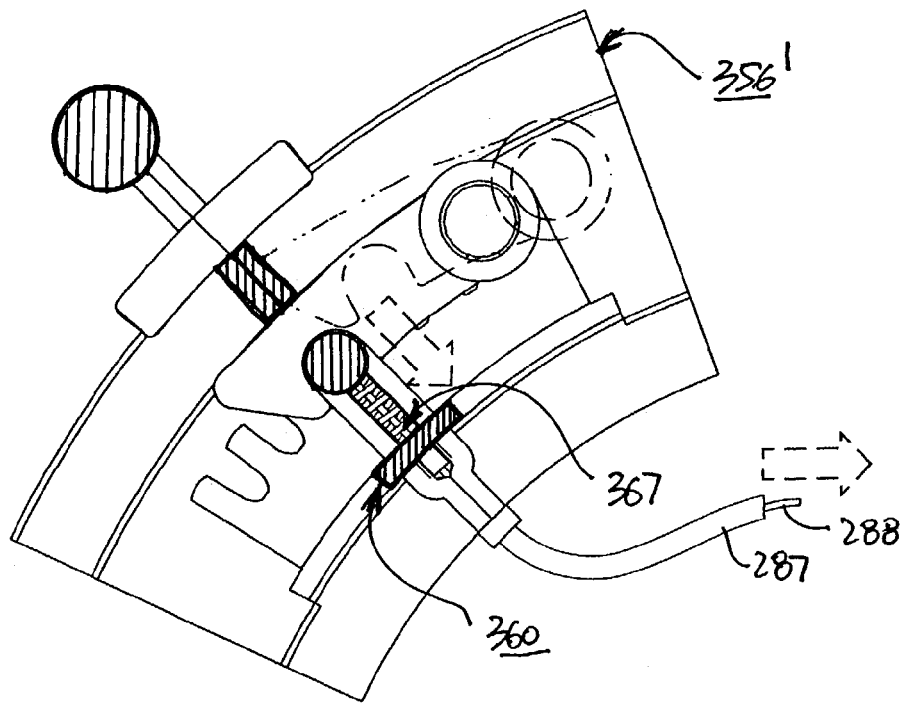
FIG. 19A is a cross-sectional view of the locking mechanism shown in its locked position, taken along the line 19A-19A' in FIG. 17

Looking now at FIG. 15, it can be seen that part 361 comprises two flat parallel members 363 and 362 spaced apart so that spring 380 can fit freely between them. A cross member 369 joins together the parallel members 363 and 362 at significantly their upper ends, while a cross member 368 joins the lower ends of members 363 and 362. Also comprised in part 361 are two arcuate members 371 and 370 perpendicularly placed at each end of cross member 369, and protruding outwardly from the plane of part 361. The curvature of the lower edge of members 371 and 370 is such that they can slide along the upper guide members 355 and 355', thus providing radial stability for the handle 352 in relation to side plates 356 and 356' while sliding along guides 355 and 355' along a radial path which has a center in point D. Also described in FIG. 15 are portions 366 and 364 of members 363 and 362 respectively, protruding outwardly from the plane of part 361 so that when coupled with its mirrored counterpart they create two parallel guides 367 and 367'. Thus, flattened notches 375 and 375' of pin 377, and notches 364 and 364' for cross member 360 are constrained to but a direction of movement along the main axis of handle 352. Being pushed away from each other by the spring 380 placed between them, the pin 377 and cross member 360 will always rest at the top and lower ends, respectively, of the parallel guides 367 and 367' (FIG. 19A).

Figure 20A:
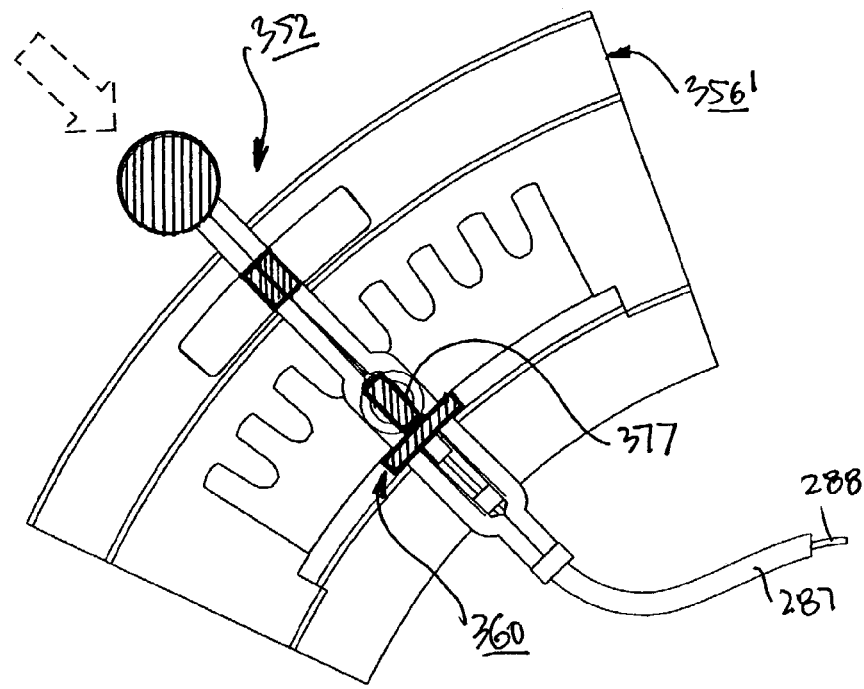
FIG. 20A is a cross-sectional view of the adjusting mechanism shown during its repositioning process, taken along the line 19A-19A' in FIG. 17
Figure 20B:
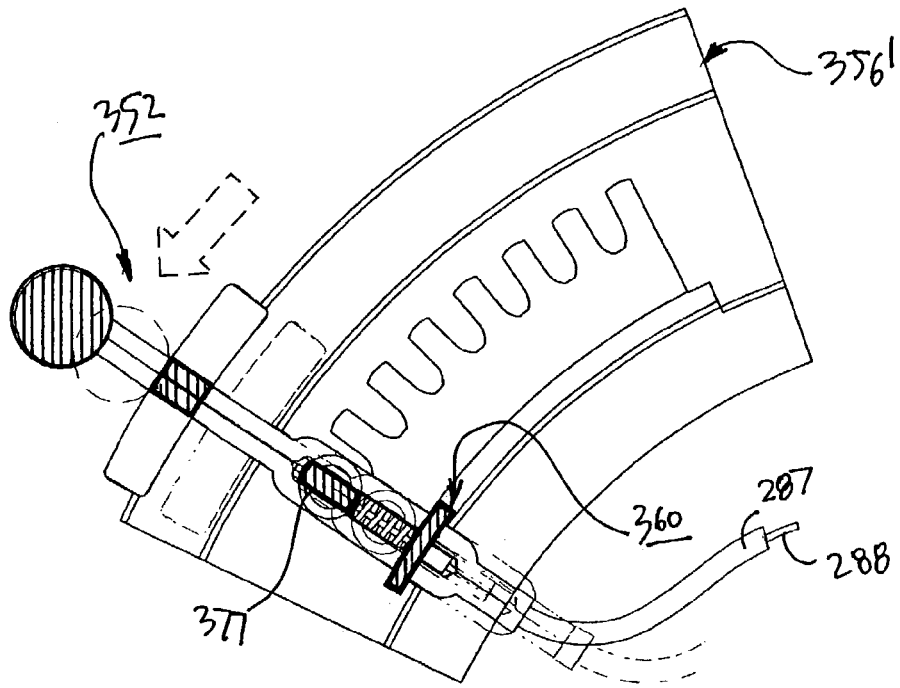
FIG. 20B is a cross-sectional view of the adjusting mechanism shown in a new position, taken along the line 19A-19A' in FIG. 17

The length of guides 367 and 367' is such that when cross member 360 rests at the lower end thereof with its extensions 363 and 363' resting in contact with guide members 357 and 357' and pin 377 is resting at its top end of travel, the ends 374 and 374' of said pin are fully positioned inside one of the notches 354, 354' bordering the cutouts of side plates 356 and 356'. The configuration such described allows on one hand for the pin ends 374 and 374' to be pulled downwardly by the cable 288 while resisting spring 380 until it clears the notches 354', 354' (FIG. 19A, B), and on the other hand it allows for the whole handle 352 to be pushed downwardly by a user, resisting spring 380 until the pin ends 374 and 374' have completely cleared the notches 354 and 354'. Now, arcuate members 371 and 370 have come in contact with guiding surfaces 355 and 355' respectively and the handle 352 can be repositioned as desired. (FIGS. 20A, 20B)

Locking Hooks

Interacting with the locking mechanism 350 is a pair of symmetrically mirrored hooks 358 and 358', which are rotatably attached to the lower portion of center leg 310. For simplification we shall only describe one hook, 358 as per FIGS. 16A-C, keeping in mind that the following description is mirrored entirely for hook 358' which is not shown.

The hook 358 is comprised of a slightly curved flat latching member 390 and a tube or sleeve 392. The tube 392 is fixedly attached to one end of latching member 390 and has an inner recessed portion 393 which shelters a torsion spring 394. The end 396 of latching member 390, pointing rearwardly and angled downwardly has a concavity or cutout 391, placed on the bottom edge of latch 390. The cutout 391 is half oval-shaped such that it fits snugly around the cylindrical portions of pin 377 and allows latch 390 to become easily engaged with pin 377. A rod 398 is fixedly attached perpendicularly to the outward right face of leg 310. Its remaining end is threaded so that a nut 395 can be threaded onto the rod 398. Taken together, the hook 358 such described will pivot freely around rod 398 while the torsion spring 394 should be mounted inside sleeve 392 so that it constantly pushes the hook 358 downwardly against a pin 397 placed under the hook 358, which limits the downward motion of latch 390. When center leg 306 is pivoted rearwardly, the rear inclined face 396 of latch 390 hits one of the cylindrical portions of pin 377 such that the latch 390 is pushed upwardly, allowing the concavity 391 to become engaged with the said cylindrical portion. (FIG. 19B) and thus locking in places the leg 306.

Console

As mentioned earlier, the videogaming and computer workstation 100 includes a front console unit 200 that is configured to carry a number of computer peripherals and is attached to the base frame 300. The front console 200 preferably comprises a rigid, tubular steel skeleton or cage 201 (FIG. 21) which includes two symmetrically constructed frames 211 and 211', connected to each other by two horizontal parallel trusses 263 and 267. Each frame 211 and 211' is constructed of a series of straight tubular steel segments connected to each other.

Figure 21:
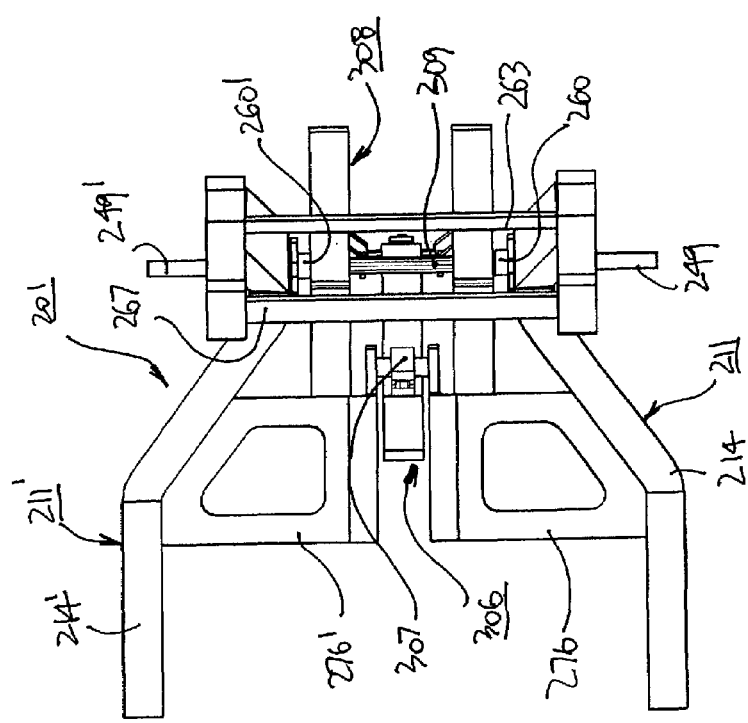
FIG. 21 is a top view of the front console showing only its main console frame connected to the front arms of the chassis

For simplicity only the right frame 211 best visible in FIGS. 21-23 will be described in detail keeping in mind that its counterpart 211' has a symmetrical configuration. Starting from the top, frame 211 includes a vertical member 222 slightly inclined rearwardly. Substantially at the middle of member 222 a shaft 249 is fixedly attached to the outward facing side of member 222 so that its disengaged end projects outwardly and its main axis is parallel to the floor and perpendicular to a plane that runs through the main longitudinal axis of workstation 100 (FIG. 21). The free end of shaft 249 is threaded. The lower end of member 222 is connected to another vertical member 220 that slopes downwardly. Another vertical segment 218 sloping rearwardly and inwardly has its top end connected to the lower end of segment 220 and supports an outward projecting bracket 267. A horizontal member 214 has two bends so that its end segments are parallel and the front end is placed closer to a median axis of videogame workstation 100. The front end of member 214 is attached to the lower end of vertical member 220.

Figure 22:
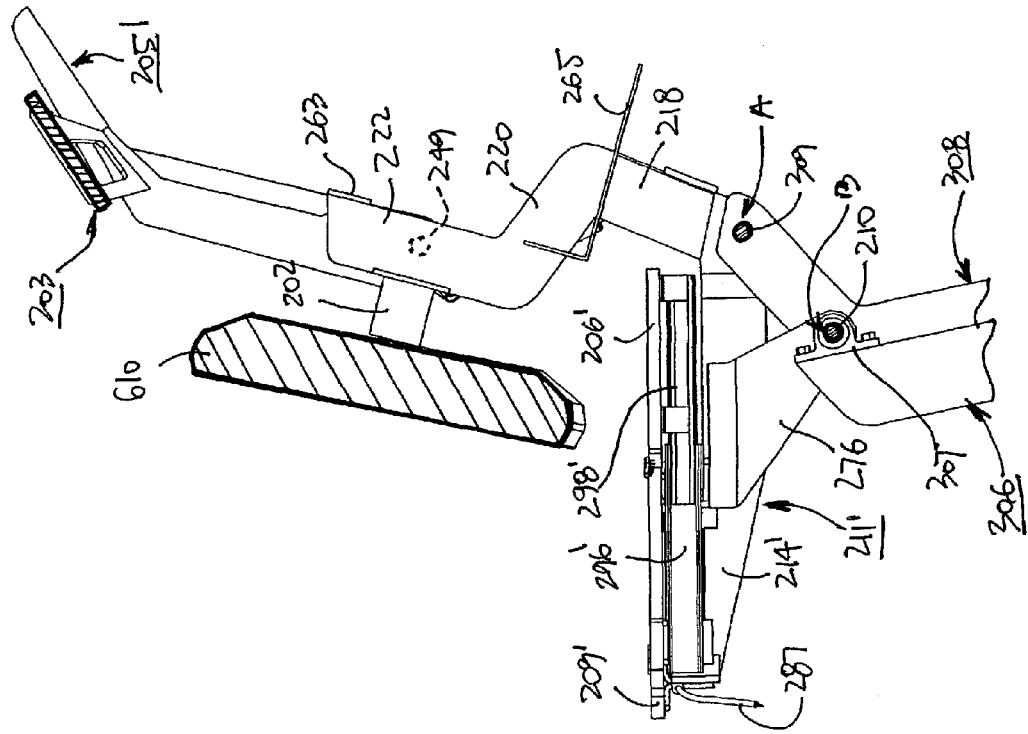
FIG. 22 is a sectional side view of the front console, taken along section lines 22-22' in FIG. 25
Figure 23:
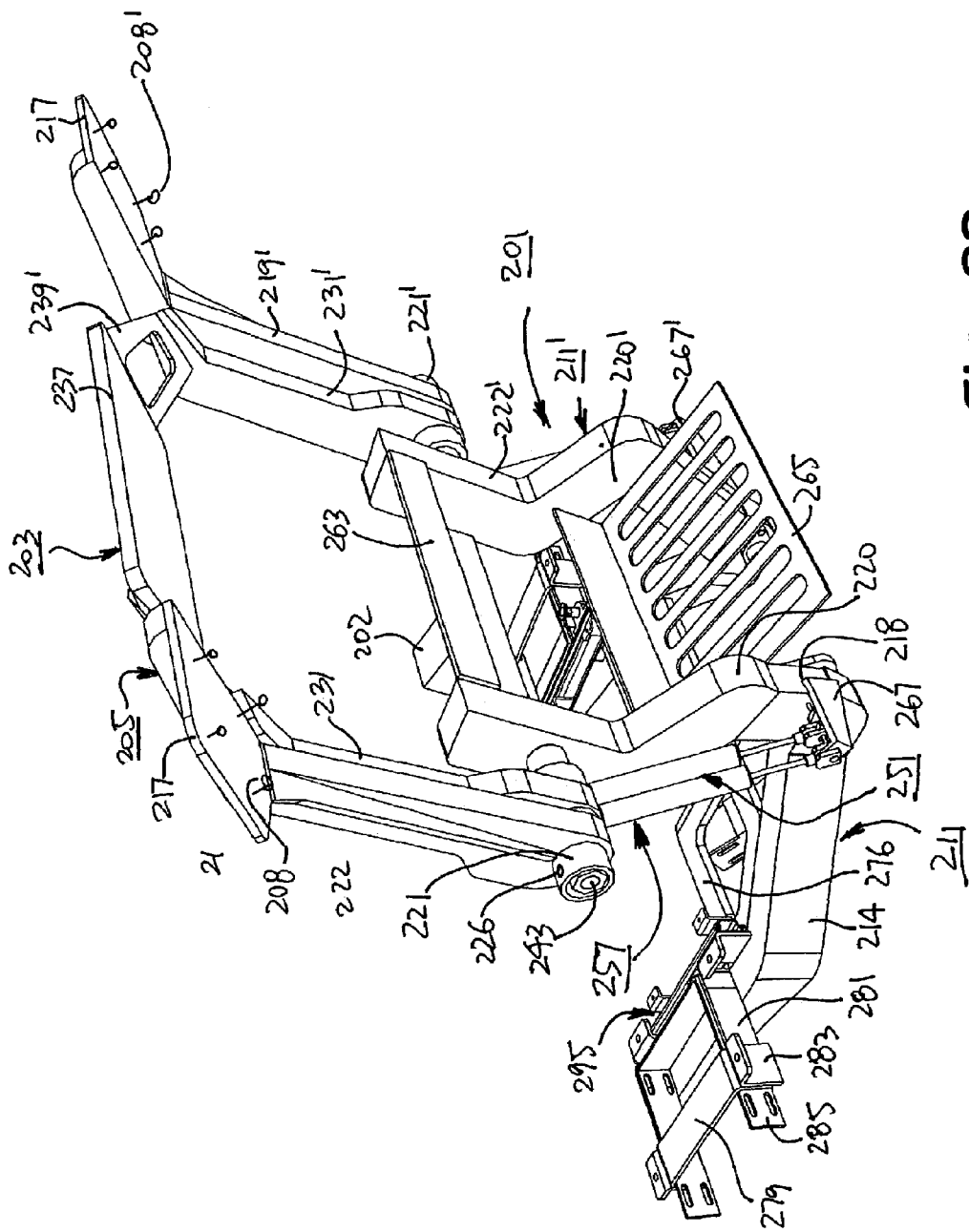
FIG. 23 is a perspective view of the front console, taken from the front right with parts removed for clarity

FIGS. 21-23 show that also included in the frame 201 is a pair of symmetrically constructed, L-shaped flat parts 276 and 276' that are fixedly attached to the inward faces of horizontal members 214 and 214'. The vertical portions of 217 and 217 are parallel to each other and distanced so that the center leg 306 of base frame 300 can be placed between parts 276 and 276' without interference. The lower ends of the vertical portions of parts 276 and 276' are connected by a shaft 210, which is arranged to be pivotally supported by the base-mounted bearing 307, thus creating a pivoting point B. Also included in frame 201 is a pair of flange-mounted bearings 260 and 260' that are bolted to the inward facing sides of members 214, 214', substantially close to the front ends thereof. The flange-mounted bearings 260 and 260' are arranged to pivotally support the ends of the shaft 309 included in the frame 308 and create a pivoting point A.

Linkage Between Front Console and Chassis

Returning now to FIGS. 22 and 9, it becomes apparent that the frame 201 effectively closes a linkage comprising the leg 306, the rectangular frame 308, and the front end of chassis 302, where segments A-C and B-D are parallel to each other and of equal length. The four-bar linkage thus created with its four pivot points A, B, C and D serves the purpose of moving the frame 201 closer or farther away from the rear of chassis 302 while keeping it parallel to the ground at all times. Coupled with the already described adjustable locking mechanism 350 it becomes possible for the frame 201 to be locked in a plurality of positions, each in direct relation to the location of the pin 377 inserted in one of the notches 354, 354' and corresponding to a unique angle of inclination of both the frame 308 leg 306 in reference to the ground. Since the already described gas springs 337 and 337' are performing a constant extension force upon the leg 306 and frame 308, the console 200, is being kept at the farthest location possible in relation to the chair 400, corresponding to an open position of the workstation 100. This way, sufficient egress or ingress room is provided for a user, without having to slide uncomfortably in or out of the chair around the armrests of the chair.

Console Details

Figure 24:
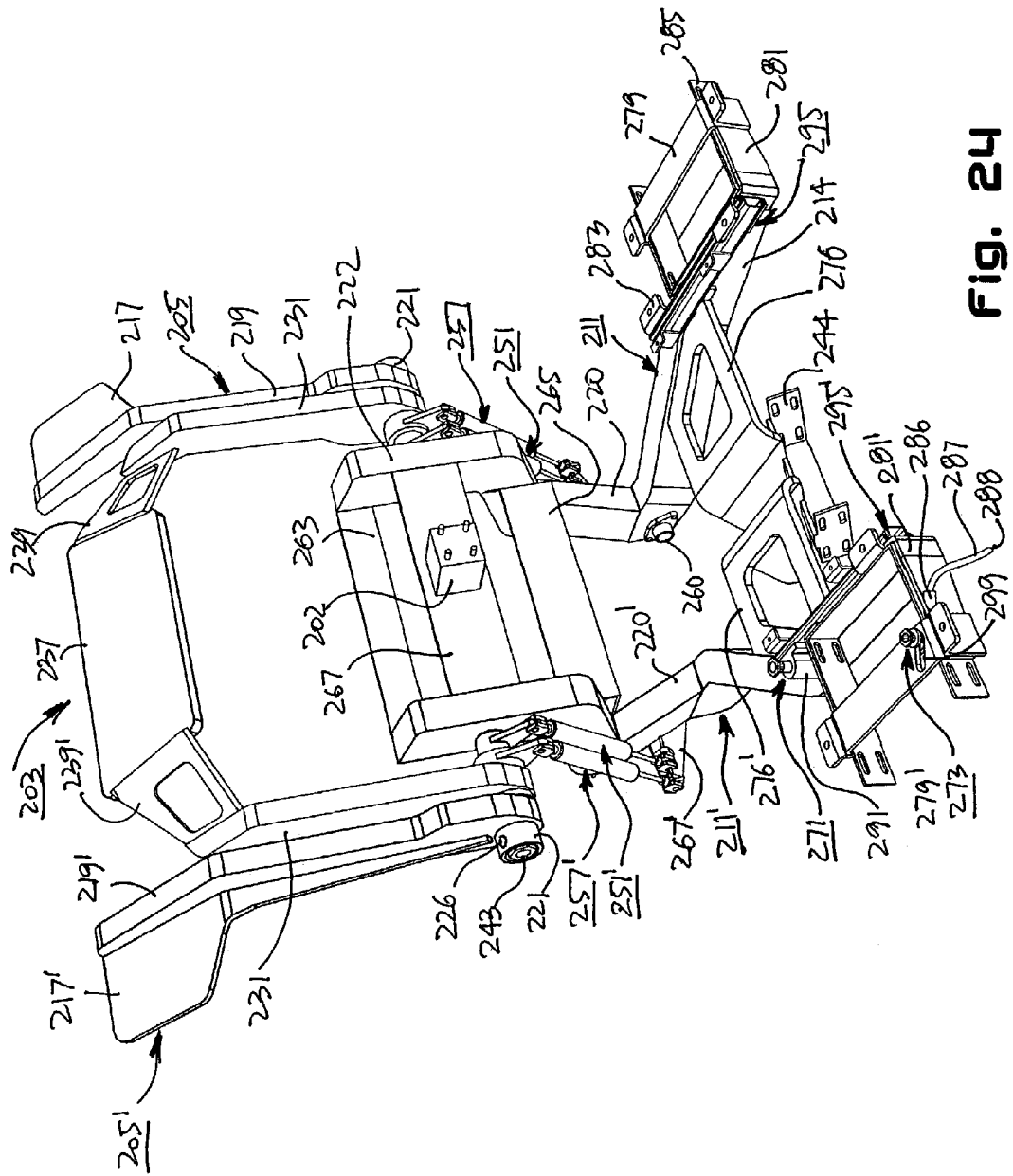
FIG. 24 is a perspective view of the front console, taken from the rear right with parts removed for clarity
Figure 25:
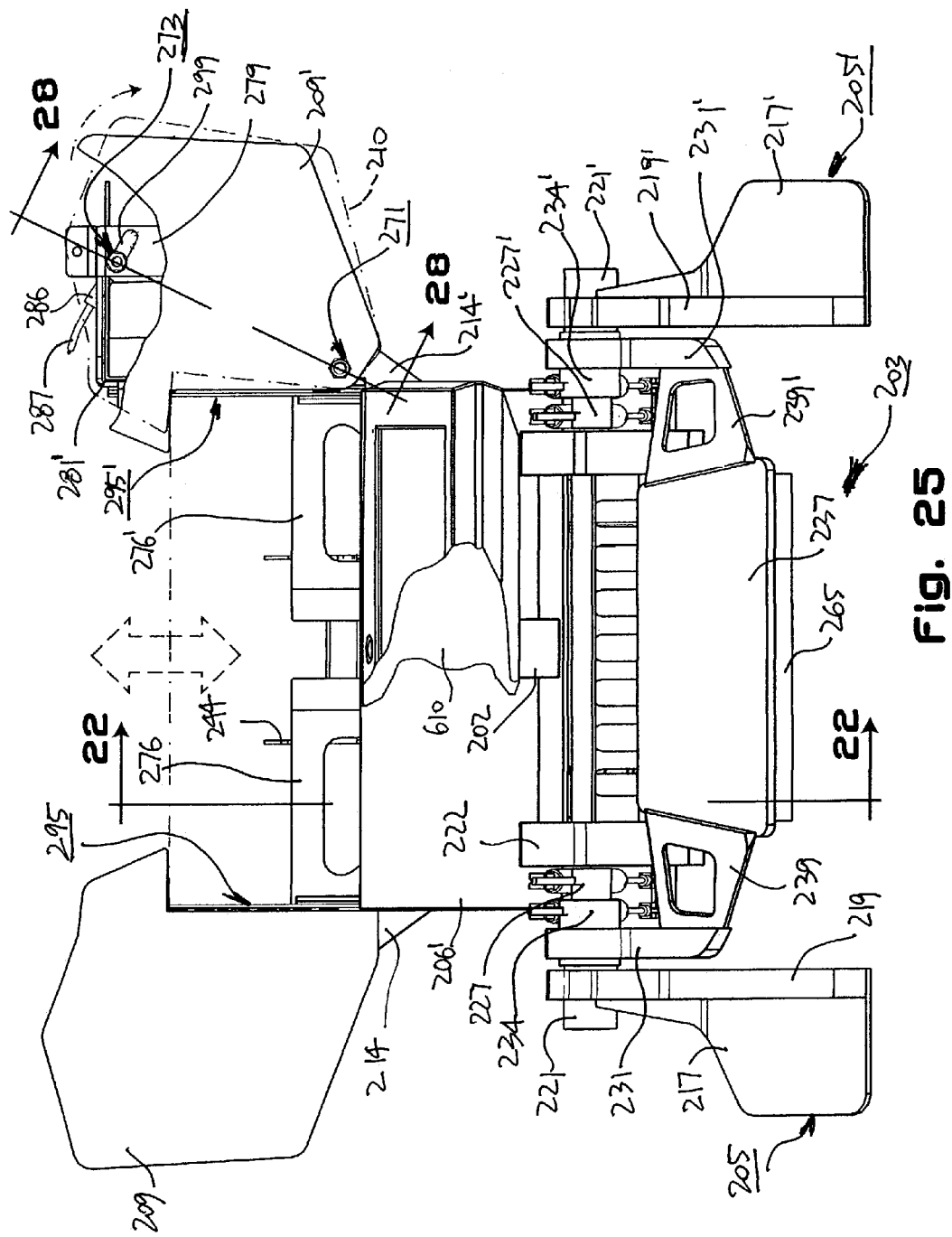
FIG. 25 is a top view with parts removed for clarity of the front console shown with all its arms in the elevated position, with a keyboard table pushed forwardly to make room for lowering a steering wheel arm

FIGS. 23-25 show the preferred embodiment of console unit 200; it includes the already described frame 201 onto which symmetrically identical arms 205, 205' and a generally U-shaped arm assembly 203 are pivotally attached. Also included are a pair of U-shaped brackets 281 and 281' and a video display terminal mounting bracket 202 placed in the middle of the horizontal connector 267. Further comprising the front console are two U-shaped brackets 281 and 281', which are fixedly attached to the free, ends of bent horizontal members 214 and 214' respectively. Their ends are stiffened by a horizontal cross-member 279 and 279' respectively. The left cross-member 279 has an oval-shaped cutout 299. The placement of the brackets 281, 281' is such that their free ends are facing outwardly, thus allowing each of them to nest inside a 5.25" computer drive cage adapter 285 and 285' respectively. These constitute a standardized bracket for a multitude of commercially available computer accessories and allow for supporting two computer drives 613 and 613' (FIG. 1). A third similar bracket 244 is attached to members 276 and 276' so that a device attached therein faces the rear of workstation 100.

Sliding Keyboard Table

FIG. 24 describes best two pairs of sliding hardware 295 and 295' having components 298 and 298' respectively fixedly attached to the inward facing sides of brackets 281 and 281' respectively. They are arranged so that the sliding components 296 and 296' respectively are moving along an axis parallel to the main longitudinal axis of the workstation 100. A flat rectangular table surface 206 made of particle board is attached to the sliding components 296 and 296', so that the table 206 can be pushed forwardly to a new location 206' (FIG. 25) for a distance that creates sufficient space for a shelf 237 of an arm assembly 203 to rest horizontally leveled in a lowered position, according to the scope of the invention.

Rotating Table

FIGS. 27 and 28 describe a nut-bolt assembly 273 placed inside the oval-shaped cutout 299 of cross-member 279. It comprises a rod 293 which has a cylindrical collar 294, placed generally at the middle thereof and larger in diameter than the width of cutout 299, a threaded top end and with its lower portion arranged to fixedly secure one end of the cable 288. A flat particle board surface 209' has a bore drilled substantially close to the rear edge thereof, which is engaged with the rod 293 so that the collar 294 acts as a spacer between the cross-member 279 and the surface table 209'. A nut 298 is threaded onto rod 293 fixedly securing it to the table 209'. The rearward vertical wall of bracket 281' has a bore drilled that accommodates a short tube 286. The tube 286 has an inner diameter sufficiently large to allow the cable 288 to move freely inside thereof and an exterior diameter large enough to fixedly receive the top end of the flexible cable sleeve 287. Furthermore, a barrel-shaped part 291 is attached to the frame member 214', substantially close to both the bracket 281' and sliding hardware 295. The barrel 291 has a bore arranged to receive a short collared rod 289 with a threaded. The bore diameter of barrel 291 and the diameter of the rod 289 are such that the rod 289 can pivot freely inside the barrel 291, but constrained to pivot only around its own axis. The top part of rod 289 is engaged with a second distinct bore drilled into table 209' substantially close to the forward edge thereof. A nut 290 is threaded onto rod 289 fixedly securing it to the table 209'.

Operation of Rotating Table

As visible in FIGS. 25 and 27, taken together the assembly described allows the table 209' to move rotatably in a horizontal plane around a vertical axis that coincides with the vertical axis of rod 289. The tabletop 209' is arranged so that its top surface is flush with the top surface of rectangular table 206 and shaped so it doesn't interfere with table 206 at any time during its rotation. The table surface 209' should be large enough and with a shape that provides a comfortable surface to use various computer peripherals.

Figure 19B:
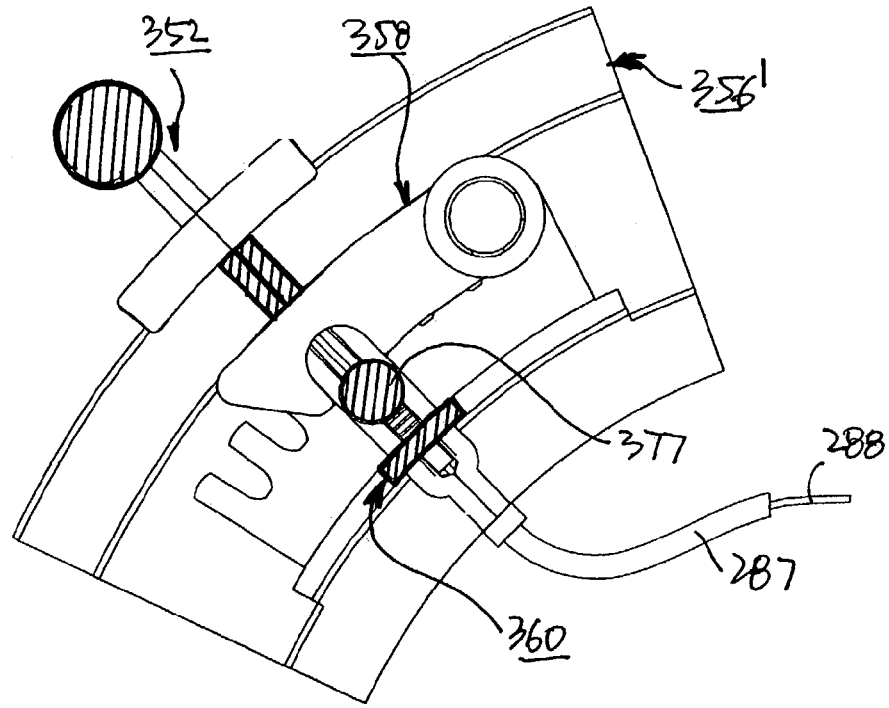
FIG. 19B is a cross-sectional view of the locking mechanism shown in its unlocked position, taken along the line 19A-19A' in FIG. 17

The radial motion of table 209' is constrained by the rod 293 that can only move inside the oval-shaped cutout 299. This way, when a user pushes forward the table 209', the ensuing rotation movement of the table 209' engages cable the 288 as it rotates around its pivot point, thus pulling downwardly the pin 377 of handle 352 (FIGS. 19A, 19B).

Opening and Closing Operations

According to the previous descriptions of the base frame 300 and locking mechanism 350, a user can now sit in the chair 400 and pull the console 200 closer to the chair 400 by grabbing the forward edges of both tables 209 and 209'. It exerts sufficient force to overcome the combined extension force of both gas springs 337 and 337' this way engaging the hooks 358, 358' with the pin 377 and locking leg 306 and frame 308 in a particular inclination, in accordance with the specific radial position of the handle 352. This way, the closed position of the workstation 100 is achieved, where the console 200 is close to the chair, allowing for a user seated in the chair 400 to be within ergonomic reach of all peripherals included in console 200, in accordance with the scope of the invention. As just explained, when a user pushes the side table to a new position 210 (FIG. 25) this determines the release of the hooks 358 and 358', allowing the extension force of gas springs 337 and 337' to bring the leg 306 and frame 308 back to their neutral position as shown in either FIG. 9 or FIG. 2. The room created by the new position of the console 200 allows a user to leave the chair 400 in a comfortable manner.

Figure 29:
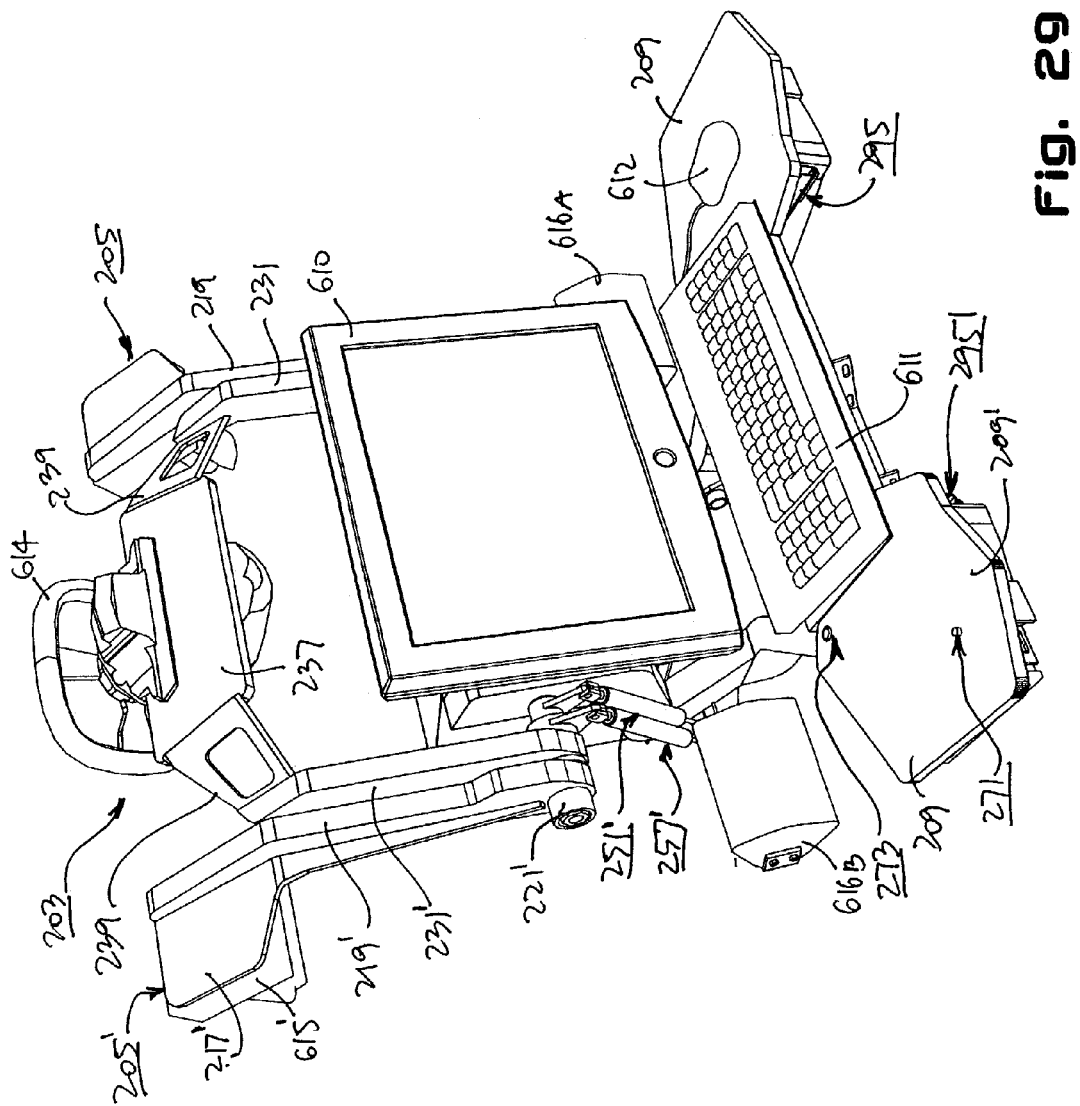
FIG. 29 is a rear left perspective view of the front console only shown with all its arms in an elevated position.

Returning to the description of console 200 as shown in (FIG. 29), fixedly attached to the outside perimeter of the bracket 281 is a plurality of L-shaped supports 283 arranged to secure a second flat surface 209 constructed of particleboard. The top face of the table surface 275 is arranged to be flush with the keyboard support table 206 so that together with table 209' they can create a surface appropriate for placing and using computer accessories such as a keyboard 611 and a mouse 612. Further included in console unit 200 is an audio system that can may comprise a pair of speakers 616 and 616' secured to frame members 211 and 211' and a subwoofer 617 placed on a L-shaped steel shelf 265 fixedly attached to the inward faces of frames 211 and 211' of frame 201 (FIG. 29).

Arms for Peripheral Devices

Further included in console 200 are symmetrical arms 205 and 205' which pivotally attach to the frame 201 and comprise tubular steel members 219 and 219', each having their free end segments angled forwardly in relation to the rest of the member. It is important to note that this angle must be such that when the arms 205 are in a lowered position (as shown in FIG. 30A), the end-angled segment will be in a parallel position to the floor. Attached to the outward facing sides of the angled segment of members 219, 219' are two flat members 217 and 217' respectively that sit in a plane perpendicular to a vertical plane placed along the main longitudinal axis of the workstation 100.

Referring to arms 205 and 205' as they are shown in FIG. 23 or 24, it can be appreciated that the flat surfaces 217 and 217' constitute appropriate support for two joystick computer accessories 615 and 615'. Also part of each arm 205, 205' is a pair of sets of bolts 208, 208' projecting upwardly from the flat surfaces 217 and 217'. Since virtually all commercially available variations of computer accessory joysticks that are intended to be used as accessories for this invention have keyholes provided to their underside surface, the mushroom shaped bolts 208, 208' can be used to secure said joysticks to arms 205 and 205'. (See also FIGS. 32, 33)

In the following description as it is shown in FIG. 26, I will only refer to arms 205 and the right half of arm 203 since left arm 205' is symmetrical to 205 and the left half of 203 is symmetrical to the right half of 203. Member 219 has a bored lower end arranged to receive a tubular sleeve 221 fixedly attached thereof and projecting outwardly. A bore 223 is drilled in a radial direction only once through the wall of the sleeve, without penetrating it twice. Also included in arm 205 is another sleeve 225 sized so that it fits snugly inside the first sleeve 221. The inner diameter of sleeve 225 is sized so that it can pivot freely only around its main longitudinal axis when being engaged with the shaft 249. The left end of sleeve 225 has a cylindrical collar 227 fixedly attached thereto and a cam 229 is secured to collar 227 in a plane perpendicular to the longitudinal axis of sleeve. The free end of sleeve 225 has a threaded lumen 233 where a bolt 226 can be threaded therein. Sleeve 225, collar 227 and cam 229 comprise a hub 224. It is important to note that lumen 233 and bore 223 of sleeve 221 must be able to overlap so that in a situation where sleeve 225 is placed inside sleeve 221, the bolt 226 can be threaded into sleeve 225 through bore 223.

FIGS. 24, 25 show how the rotatable frame 203 includes two straight arms 231 and 231' that have each of their top ends attached to inward angled plates 239 and 239' respectively. Connecting the two free ends of plates 239 and 239' is a flat shelf 237 made of particleboard that can support a commercially available steering wheel computer accessory 614. Returning to FIG. 26 and discussing only the lower right half of arm 203 it is visible that the lower end of arm 231 has a bore arranged to fixedly receive a sleeve 234 such that a large portion of it is placed inside the bore in arm 231 and only short edges project outwardly. The left end of sleeve 234 has a cam 235 fixedly attached thereto.

FIG. 26 shows best how to assemble the pivoting points of arm 205 and the right half of arm 203: first, a thin ring-shaped spacer 245 is positioned concentrically along the shaft 249. The cylindrical hub 224 is engaged with shaft 249 pressing against ring 245. Next, the sleeve 234 of arm 231 is concentrically engaged with the sleeve 225 pressing against collar 227. Anther ring-shaped spacer 247 is similarly engaged unto sleeve 225 and pressed against the exposed end of sleeve 234. Following the spacer 247 is sleeve 221 of arm 219 that is tightly fitted onto sleeve 225 so that the bolt 226 can be threaded into lumen 233 passing snugly through the bore 223. Further tightening the bolt 223 will secure arm 219 to hub 224. Lastly, a washer 241 and a hex nut 243 threaded onto the free end of shaft 249 is keeping all described parts pressed against each other. Taken together, the assembly described allows the arm 219 and hub 224 to pivot freely as a single unit around the main longitudinal axis of shaft 249 while arm 231 can pivot independently from arm 219 around the same axis. An extension force gas spring device 251 has its upper eyelet 255 hingedly connected to cam 229 and its lower eyelet hingedly connected to the bracket 267 (FIG. 23). Similarly, an identical gas spring device 257 has its upper eyelet 261 hingedly connected to cam 235 and its lower eyelet hingedly attached to the same bracket 267.

In accordance with the scope of the invention and best described in FIG. 31, they should be arranged so that the imaginary axes that connect the lower eyelets of gas springs 251 and 257 and the upper eyelets, respectively, are parallel to the main longitudinal axis of shaft 249. The angular disposition of gas springs 251 and 257, cams 235 and 229 in relation to arms 231 and 219 and their pivoting point F concurrent with axis of shaft 249 will be discussed only for arm 203 as shown in FIG. 31. The elevated position of arm 203 where it is inclined sufficiently to rest generally in front and above of the VDT 610 will be taken as a reference and considered the start of the travel path. The cam 229, gas spring 257 and bracket 267 should be arranged so that the arm 203 is maintained in an elevated position by the extension force exerted by the gas spring 257.

Operation of Arms

Furthermore, the arrangement of the aforementioned points should allow the gas spring to be compressed fully once a user has pulled down the arm 203 halfway through its lowest position where the shelf 237 is horizontal. The user continuing to pull down the arm 203, the gas spring now passes its tipping point where pivot point F and both ends of gas spring 257 are perfectly aligned and the gas spring is fully compressed. Past this point it pushes the cam 235 upwardly determining cam 235 and arm 231 to move in a see-saw motion in relation to pivot point F. According to the description, the arm 203 and similarly arms 205 and 205' will be capable of describing a rocking motion where a user has to manually rotate any of the arms for an initial section x or y of the movement, overcoming the force opposed by the gas spring attached to said arms until the user brings it past the maximum compression point. Thus, if the arm starts in either a lowered or lifted position the last portion of the swing will be executed by the extension force of the gas spring, which will also effectively keep the arm in its final desired position. The entire pivotal motion z described by arms 205, 205' and 203 is limited at its top end by the maximum stroke that the gas spring devices 251 and 257 allow. It is important to remember that the flat portions 217, 217' of arms 205, 205' and table 237 of arm 203 must be in a horizontal position at their maximum low end of the course. The maximum angle z of the rotation described by arms 205, 205' and 203 should be chosen to be at least 90 degrees, allowing the peripherals supported by these arms to be stowed away and not interfere with the current activity a user performs.

Chair

Figure 34:
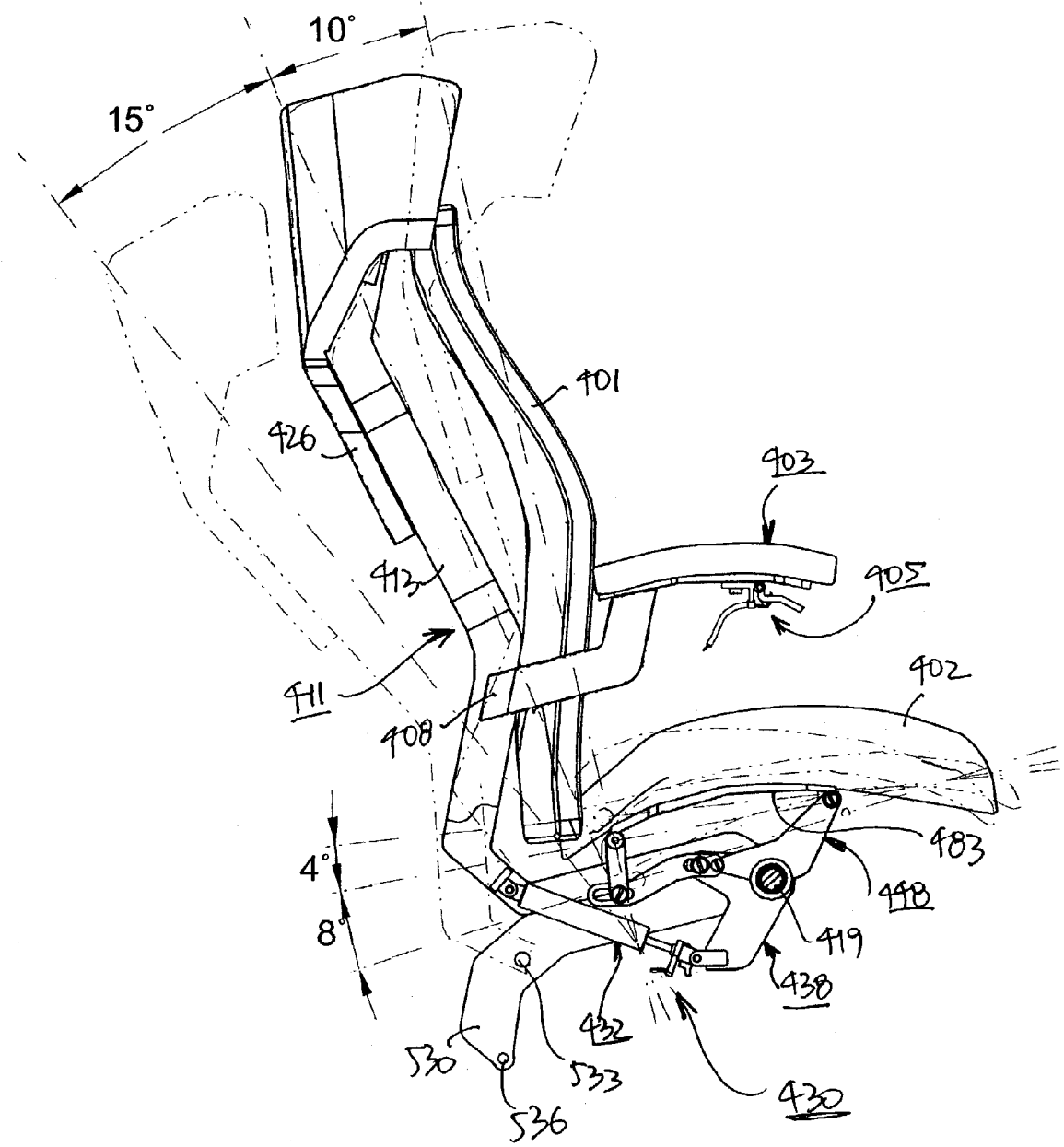
FIG. 34 is a right side view showing only the chair of the workstation, with its seat and backrest in a preferred forward, middle and reclined tilt positions
Figure 35:
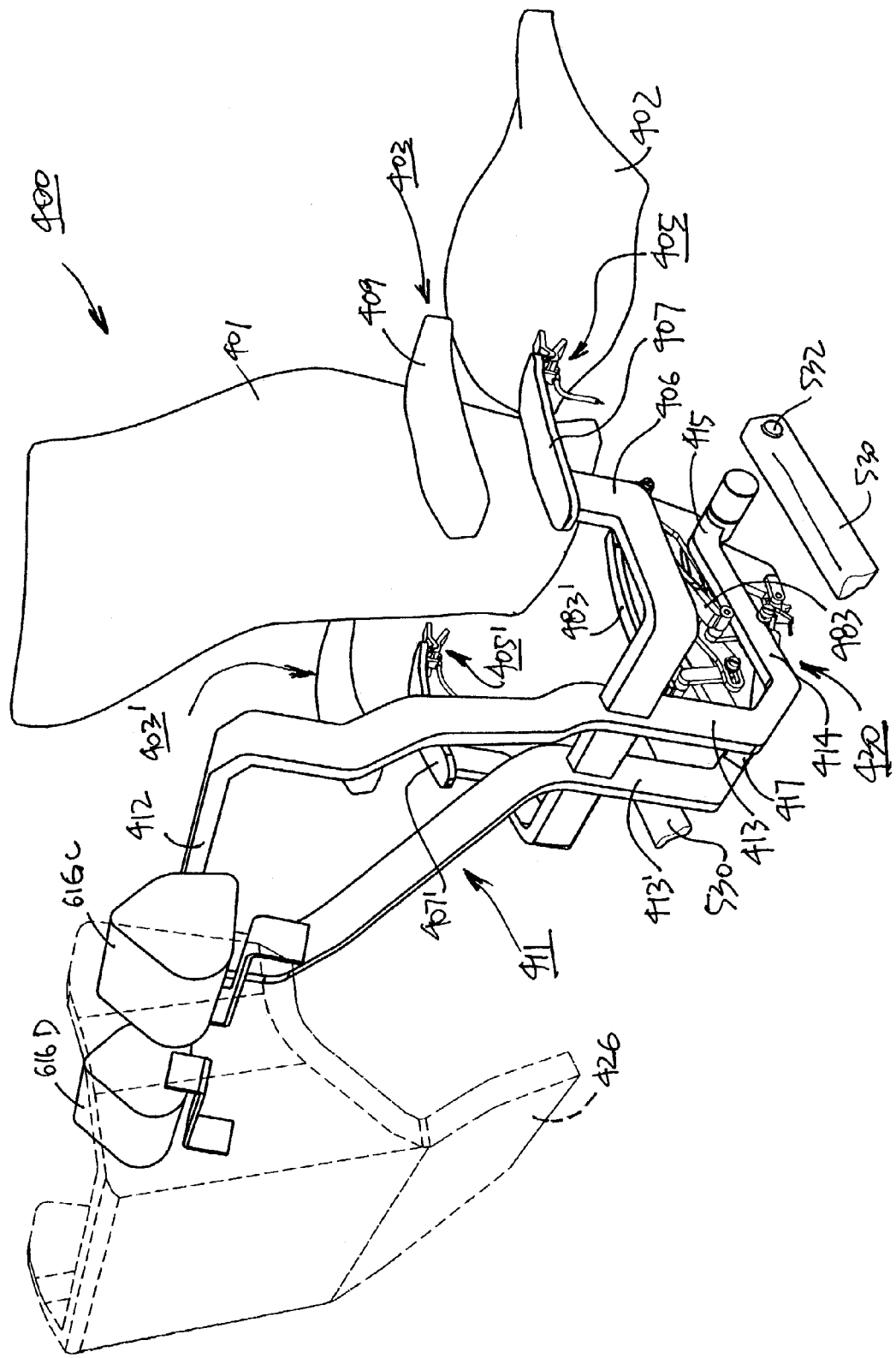
FIG. 35 is a rear right exploded perspective view showing only the tiltable chair of the workstation

FIGS. 34 and 35 show that a reclining chair 400 as a part of the workstation 100 includes a back support surface 401 fixedly attached to a rigid chair frame 411, a seat support surface 402 fixedly attached to a pair of ledgers 483 and 483', a pair of arms 403 and 403' attached to the back frame 413 and a reclining mechanism 430. The seat 402 and backrest 401 are connected through a reclining mechanism 430 to a pair of supporting arms 530 and 530'. The arms 530 and 530' are vertically movable and are part of the undercarriage 500 introduced at the beginning of this description that is attached to the rear end of the chassis 300. A horizontal shaft 419 included in the tilt mechanism 430 is fixedly secured to the arms 530 and 530' of undercarriage 500 and bears the back chair frame 411 and the comprising parts of the reclining mechanism 430 which in turn supports the seat 402 and links it to the back chair frame 411. A detailed description of securing the chair 400 to the undercarriage 500 is provided in a following description.

In a preferred embodiment a pair of speakers 616c and 616d are attached to the chair frame 411 and a cover shell 426 is attached to the rigid frame of the back 411, acting as a sound barrier for the speakers 616c and 616d, so that as little noise as possible is propagated around the workstation 100.

Chair Frame

Figure 36:
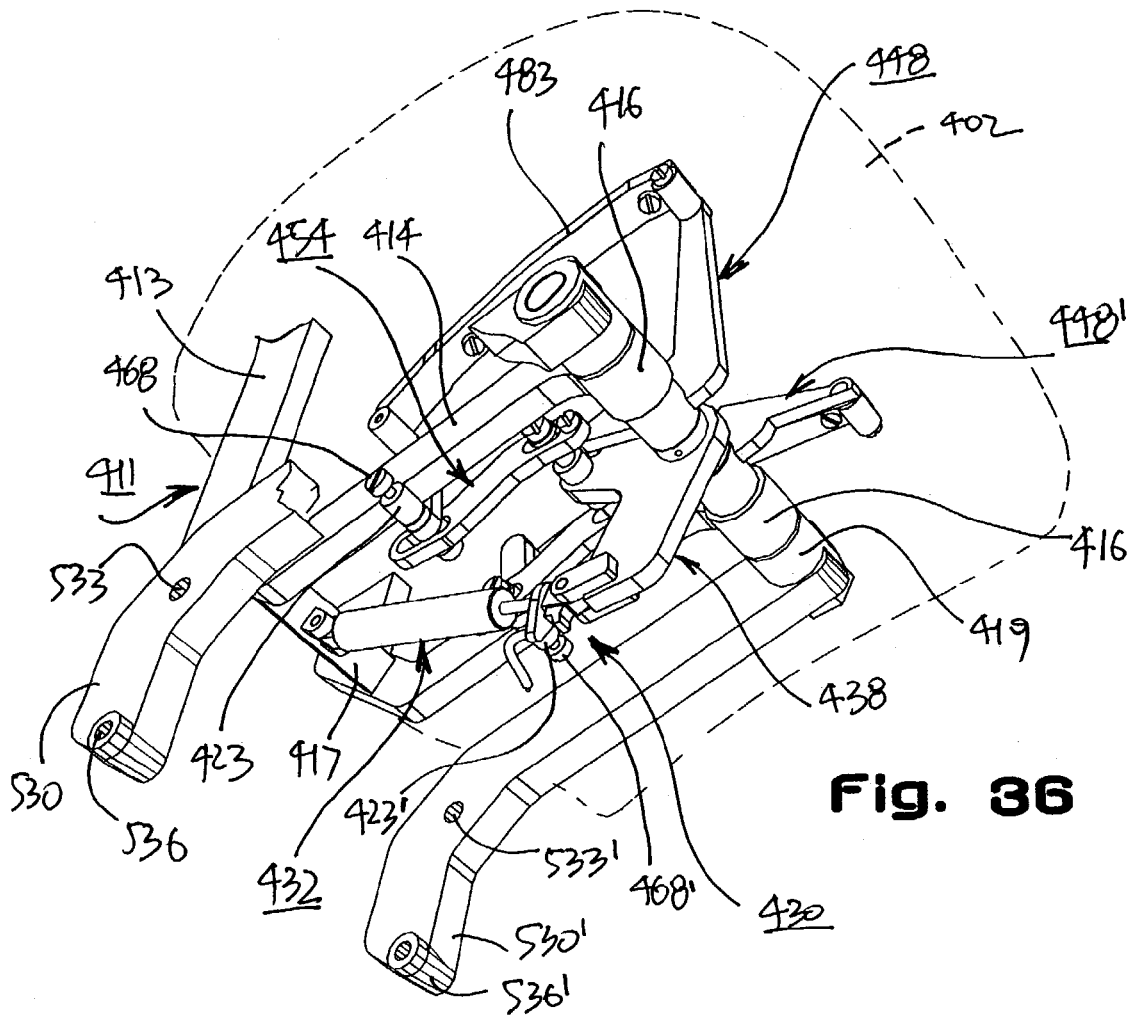
FIG. 36 shows a front right view looking at the underside of the tilting mechanism for the back of the chair

Further looking at FIG. 35 is visible that the chair frame 411 has a symmetrical shape in relation to an imaginary vertical plane placed along the main longitudinal center axis of the workstation 100. Starting from the top, the chair frame 411 comprises two vertical S-shaped members 413 and 413' respectively, which have their top ends placed substantially outward in relation to their bottom ends. A substantially horizontal cross-member 412 fixedly bolts together the top ends of side members 413 and 413'. A pair of generally horizontal members 414 and 414' have their rear ends bent upwardly and connected to the bottom ends of vertical members 413 and 413' respectively. Two cylindrical tubes 423 and 423' are fixedly attached to the underside of each member 414 and 414' respectively, and placed generally at the middle thereof (FIG. 36). Two sloped segments 415 and 415' connect the front ends of members 414 and 414' to a pair of sleeves 416 and 416' respectively that are engaged with shaft 419 so that they can pivot freely around the longitudinal axis thereof. Another horizontal member 417 is perpendicularly bolted to the inward facing sides of members 414 and 414', substantially at their top ends. It is important to note that the chair frame 411 is such configured that it can be assembled and disassembled repeatedly into two halves that allow the placing of the tilting mechanism 430 between them.

Reclining Mechanism and Actuating Lever

Figure 37:
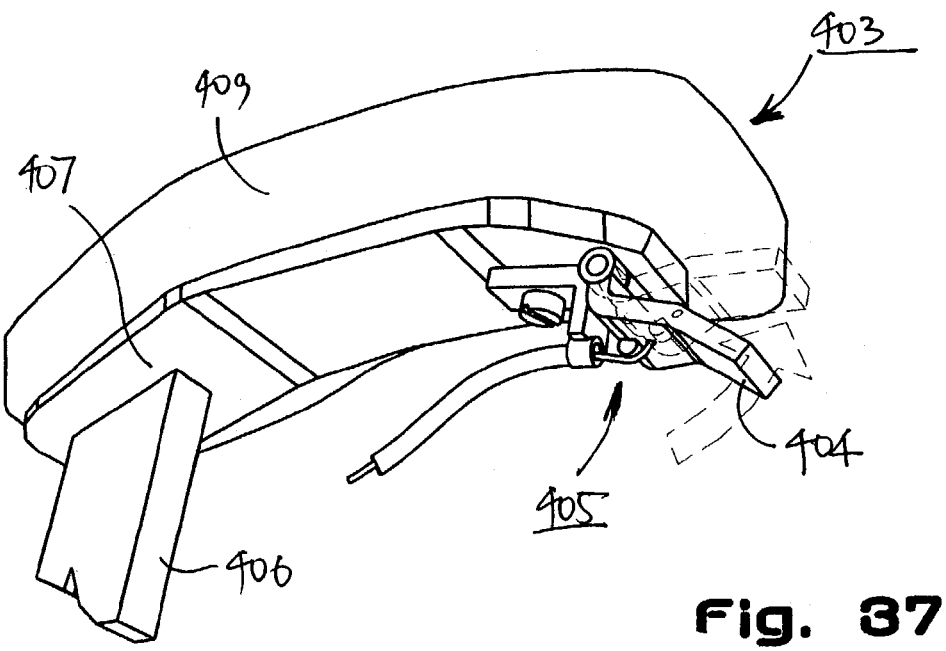
FIG. 37 shows a front right view looking at the underside of the lever mechanism attached to the right armrest of the chair

As per FIG. 37, the tilting mechanism 430 includes a cable-actuating lever assembly 405 attached to the underside of armrest 403. The lever assembly 405 has a pivoting lever 404, which fixedly receives one end of a steel cable 435. By pushing up the free end of lever 404 a rotation movement will occur which in turn pulls the cable 435 inside a flexible, uncompressible sleeve 435 which is not movable in relation to the cable 435 or lever 404. The components described function according to the known prior art of cable-actuated assemblies.

Figure 38:
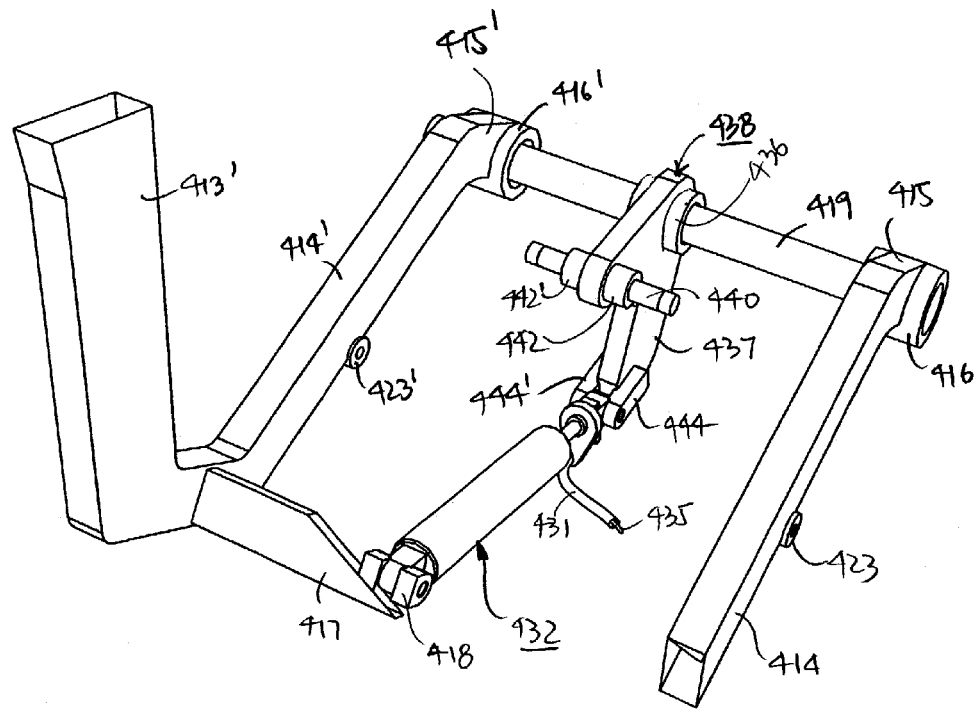
FIG. 38 shows a fragmentary rear right perspective view of the backrest tilting mechanism

As visible in FIG. 38 a cable-actuated, extension-force locking gas spring 432 is further included in reclining mechanism 430. The prior art of cable-actuated, lockable gas springs is known, so no detailed description of the gas spring 432 is provided. It is only important for our description to say that the gas spring has inside its main cylinder a piston and valve arrangement which can block the piston in any point along the stroke thereof, and a cable-actuated assembly must activate said valve to unlock the piston and exercise the extension force of the spring included. The release of the cable-actuated assembly locks the piston in a new position along its stroke. In our particular case, the lever assembly 405 activates the valve inside the gas spring 432 by moving the cable 435 inside the flexible, uncompressible sleeve 431.

Bracket 438

Figure 42:
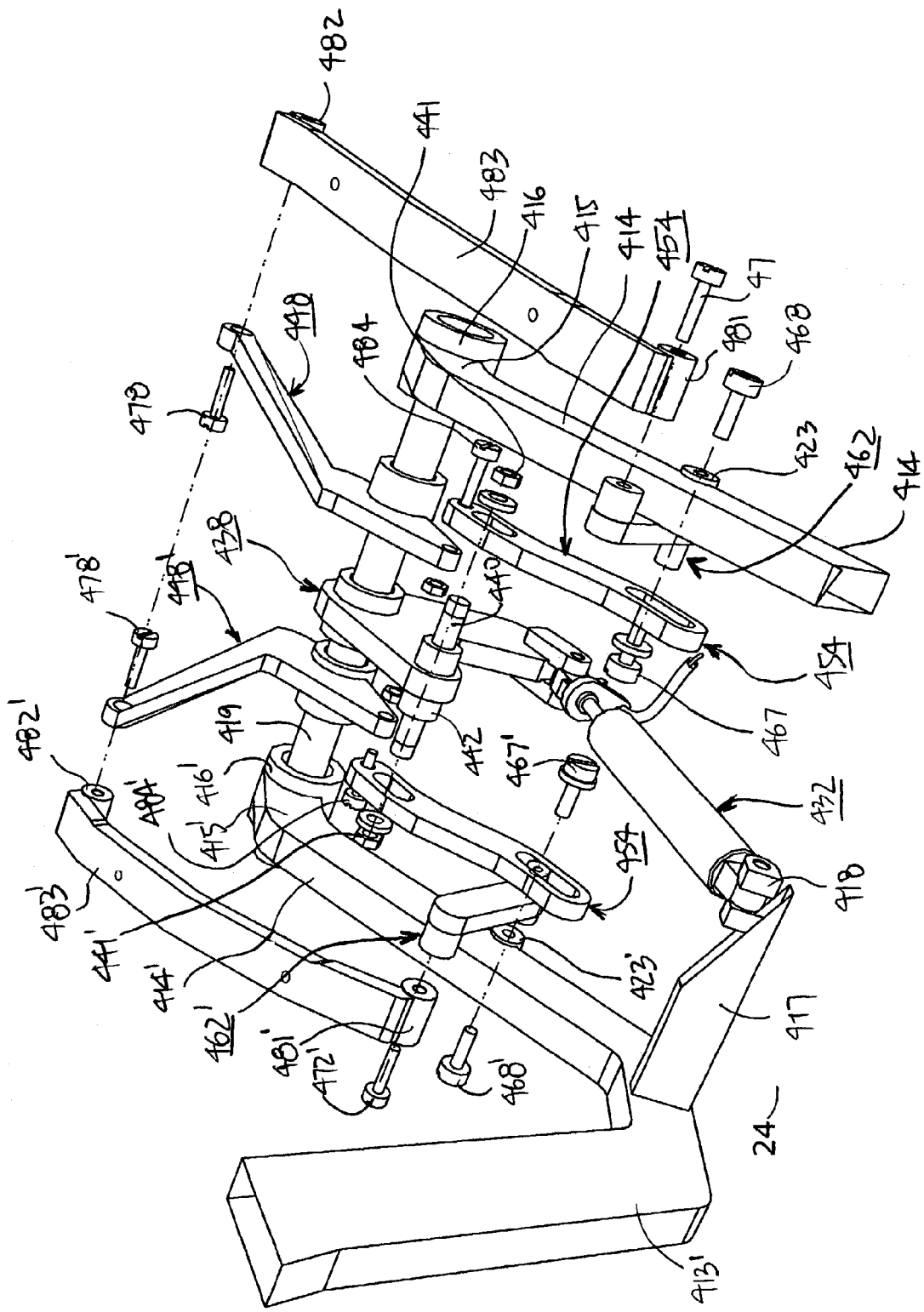
FIG. 42 shows a rear right exploded perspective view of the tilting mechanism for the backrest and seat of the chair

As seen in FIGS. 36 and 42, the reclining mechanism 430 also includes a member 438 welded to the shaft 419 and placed at the center thereof. The part 438 comprises a flat crescent-shaped bracket member 437 with a sleeve 436 welded with its longitudinal axis perpendicular to the plane of member 437. The sleeve 436 is placed closer to the convex side of the L-shaped member 437 and it protrudes with equal amounts on each side thereof. The sleeve 436 is welded onto shaft 419 and placed so that its ends are equally spaced from the ends of shaft 419. The orientation of the member 437 is so that it sits in a substantially vertical plane and its ends are generally above each other with the concave portion oriented rearwardly. A rod 440 with right-hand threaded ends is welded to a bore drilled substantially at the top end of member 437, so that both its ends are equally spaced away from the vertical faces thereof. On each side of member 437 are two ring-shaped spacers 442, 442' tightly fit around the rod and pressed against the sides of member 437. Two eyelets 444 and 444' are fixedly attached to each side of L-shaped member 437, substantially at the bottom end thereof.

The gas spring 432 has its top end pivotally attached to a pair of eyelets 418 and 418' which are in turn fixedly attached to the horizontal cross-member 417 and its bottom end hingedly attached to the eyelets 444 and 444' of part 438. Taken together, the parts of locking mechanism 430 described so far allow the back chair frame 411 to pivot around the longitudinal axis of horizontal shaft 419, with its inclination angle relative to the floor 10.1 controlled by the gas spring 432.

Back Tilting Operation

As per FIG. 37, the pivot point of the back chair frame 411 and the hinged ends of the gas spring 432 should be arranged so that the total length of the stroke of gas spring 432 allows the back chair frame 411 to tilt pivotally at 25 degrees or more in relation the floor 101, distributed such that there are three preferred tilt positions: Maximum rear tilt corresponds to a relaxed posture, neutral tilt is rotated forward 15 degrees in relation to the maximum rear tilt, and maximum forward tilt corresponding to an alert posture is a full 25 degrees in relation to the maximum rear tilt.

Components 462

Figure 41:
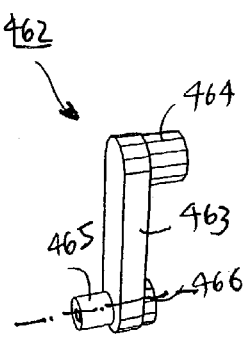

Also included in reclining mechanism 430 are two generally upright members 462 and 462', best visible in FIG. 42. Since they are symmetrically configured in relation to a vertical plane placed along the main center longitudinal axis of workstation 100, a description is provided only for the right side member 462. As visible in FIG. 41, upright member 462 is comprised of a elongated member 463 and two rounded nuts 464 and 466 with internal threads, fixedly attached to the right face of member 463 at the top and bottom ends thereof respectively, and a third rounded nut 465 with internal thread which is fixedly attached to the left face of member 463, coaxially placed with nut 466.

See-Saw Links 448

Figure 40:
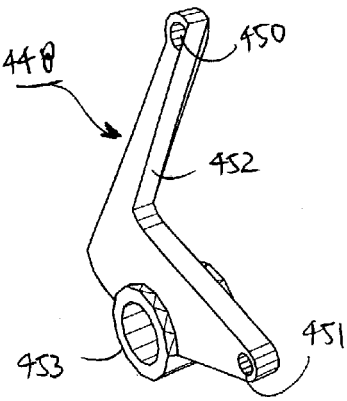

Further included in reclining mechanism 430 are two symmetrically configured see-saw links or rocker cams 448 and 448' respectively (FIG. 40, part 448' not shown). Each includes a crescent-shaped member 452 and 452' respectively, positioned so that its concavity faces upwardly. Furthermore, members 452 and 452' have each of their front ends projecting outwardly relative to their rear ends. Two pairs of bores 450, 450' and 451, 451 are placed substantially at the front and rear ends, respectively, of each member 452 and 452'. Two sleeves 453 and 453' are fixedly attached generally at the middle section of each crescent shape 452 and 452' respectively. The rocker cams 448 and 448' are engaged with the shaft 419 so that they are located to the right and left of part 438, respectively and pivoting freely around the longitudinal axis of shaft 419.

See-Saw Links 454

Figure 39:
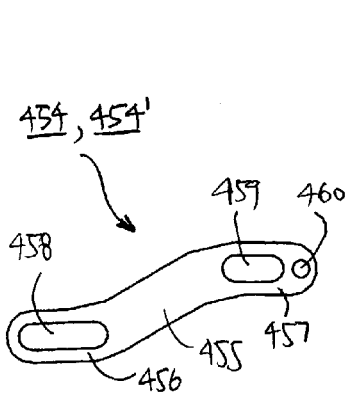
FIGS. 39, 40, 41 are showing various components of the tilting mechanism for the backrest and seat of the chair

Also included in the reclining mechanism 430 and best described in FIG. 39 is a pair of linking see-saw members 454 and 454'. Members 454 and 454' are identical to each other, so a detailed description is provided only for linking member 454. The link 454 is comprised of two parallel end sections 456 and 456, connected by a middle section 455 such that the front section 457 is placed forwardly and above section 456, while being placed in the same vertical plane. Each end 456 and 457 has an oval-shaped cutout 458 and 459, respectively. Also a bore 460 is placed substantially at the front end of section 457.

Linking of All Components

All described members 462, 462', 454, 454' 448 and 448' can be linked to the previously described group of elements that tilts the back chair frame 411. This way, a seat reclining mechanism is assembled, so that the reclining of the back 401 by the user determines a tilt of the seat 402 in accordance with the scope of the invention.

As best seen in FIG. 42, the pair of connecting ledgers 480 and 480' have each a rounded nut 482 and 482' welded at each of their front ends, respectively. A pair of bolts 478 and 478' threaded into the nuts 482, 482' are pivotally connecting the front bores 451, 450' of rocker cams 448, 448' to the front ends of ledgers 480, 480' respectively. Two cylindrical sleeves 481 and 481' welded to each of the rear ends of ledgers 480 and 480' respectively, are pivotally connected to members 462 and 462' by a pair of bolts 472 and 472' threaded into the rounded nuts 464, 464' of members 462, 462' respectively. Furthermore, another pair of bolts 472, 472' passing through the tubes 423, 423' of chair frame 411 and threaded into the rounded nuts 466, 466' of members 462 and 462' respectively, pivotally connect these members 462, 462' to the chair frame 411.

Figure 43:
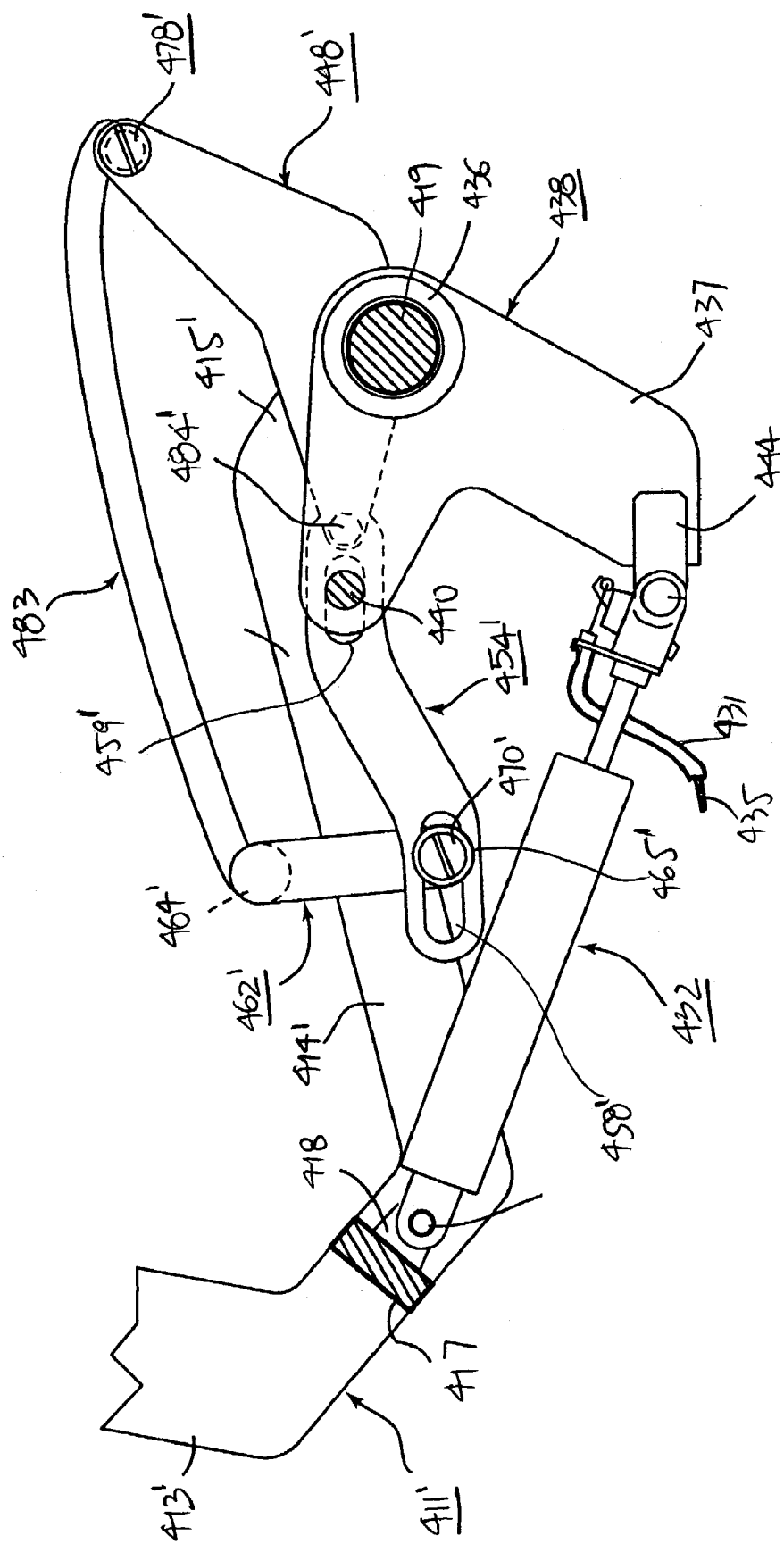
FIG. 43 is a cross-sectional view of the tilting mechanism, taken along the lines 43 and 43' in FIG. 44
Figure 44:
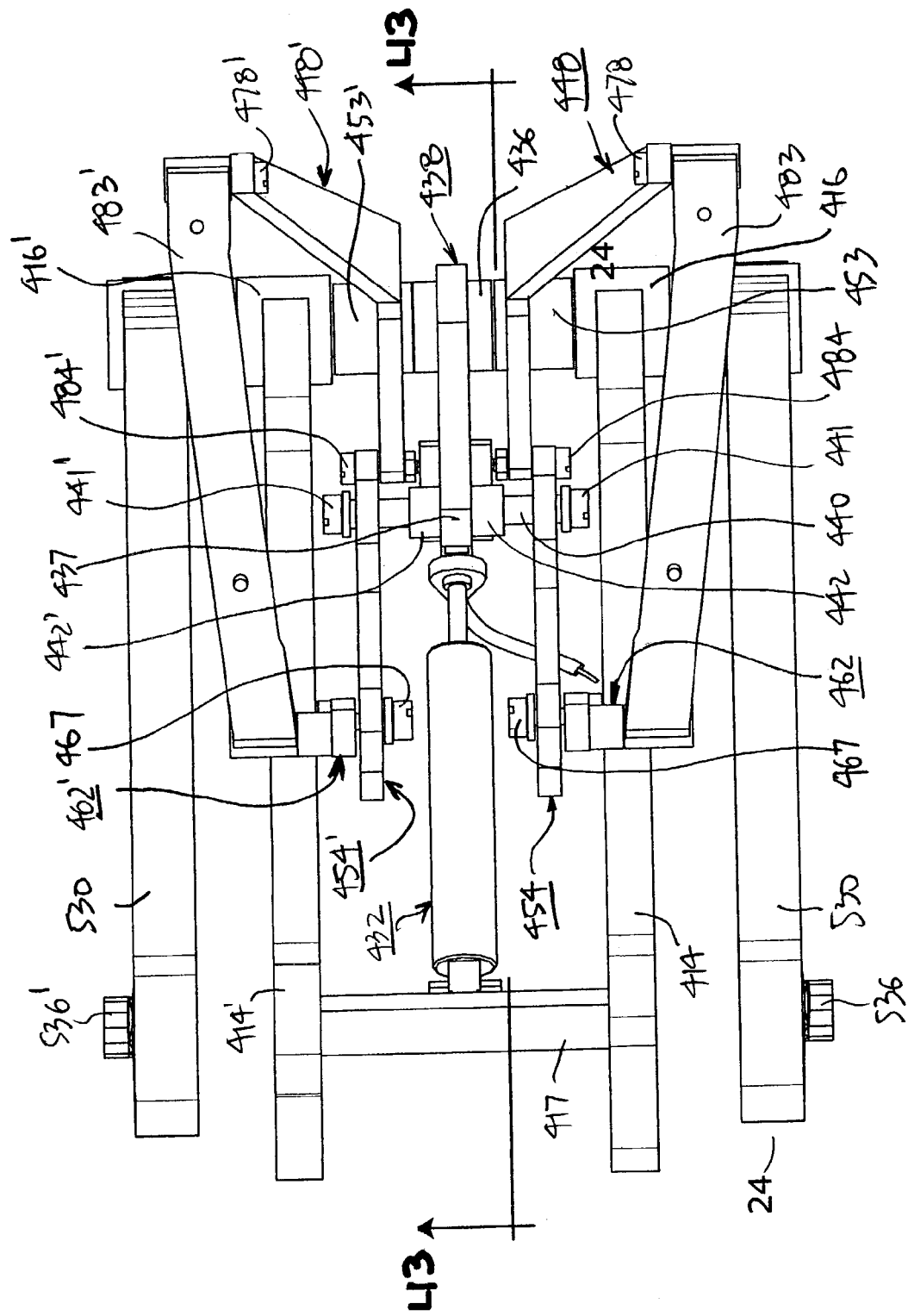
FIG. 44 is a partial fragmentary top view of the tilting mechanism of the seat and backrest

As best observed in FIGS. 42 and 43, the last pieces in place necessary to complete the tilting mechanism are the already described links 454 and 454'. These links are acting like a see-saw, transmitting the rotation movement of the back chair frame 411 around the shaft 419 directly to the rear ends of rocker cams 448 and 448'. This is achieved on one end by engaging the oval cutouts 458, 458' of links 454, 454' around the rounded nuts 465, 465' of upright members 462, 462'. On the other end, the front bores 460, 460' of links 454, 454' respectively, are pivotally connected to the rear bores 451 and 451' of rocker cams 448, 448' respectively by a pair of bolt and nut assemblies 484 and 484'. Furthermore, to achieve the desired linkage each of the front oval cutouts 459 and 459' of links 454, 454' are also constrained by two pairs of bolts and washers 441, 443 and 441', 443' (FIG. 42). to a sliding and pivoting movement around the non-threaded portion of each end of the rod 440 comprising part 438, so that the rod 440 acts as pivoting point for the see-saw movement of links 454 and 454'.

Chair Seat Tilting Operation

Figure 45:
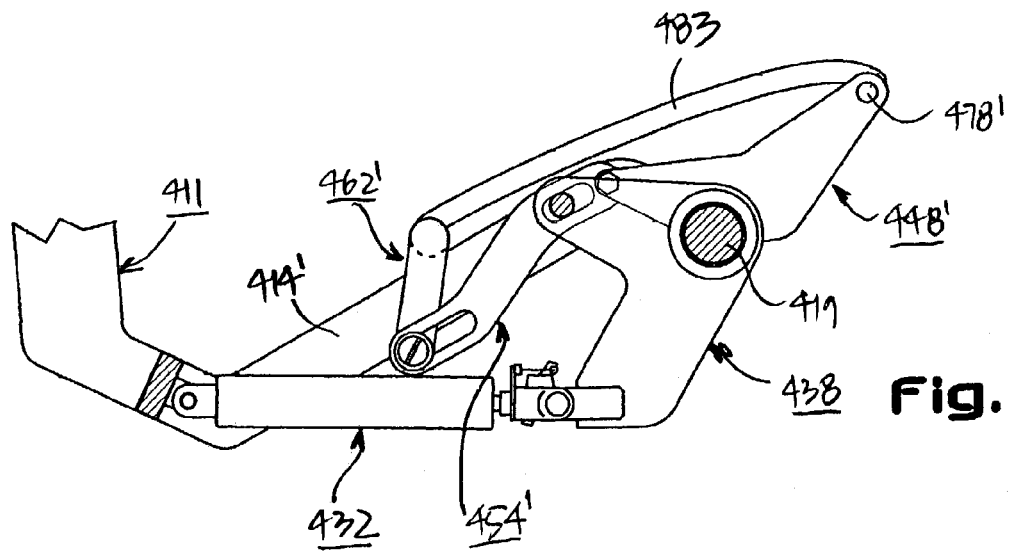
FIGS. 45, 46 and 47 show three cross-sectional views (taken along the lines 43-43' in FIG. 44) of the tilting mechanism in a reclined, middle and forward tilt position respectively
Figure 46:
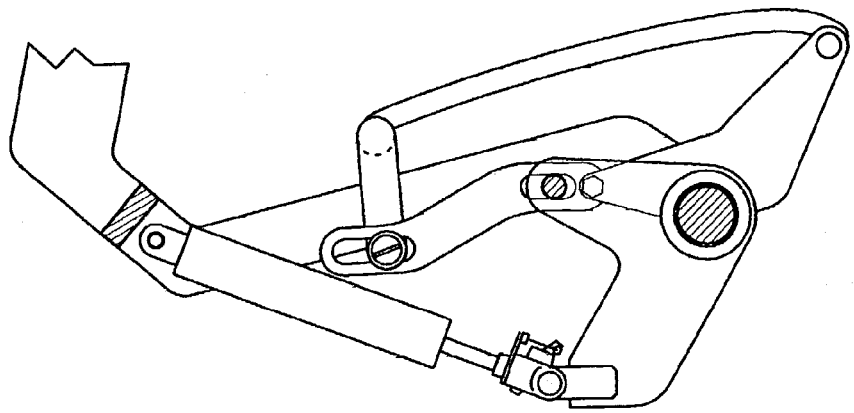
Figure 47:
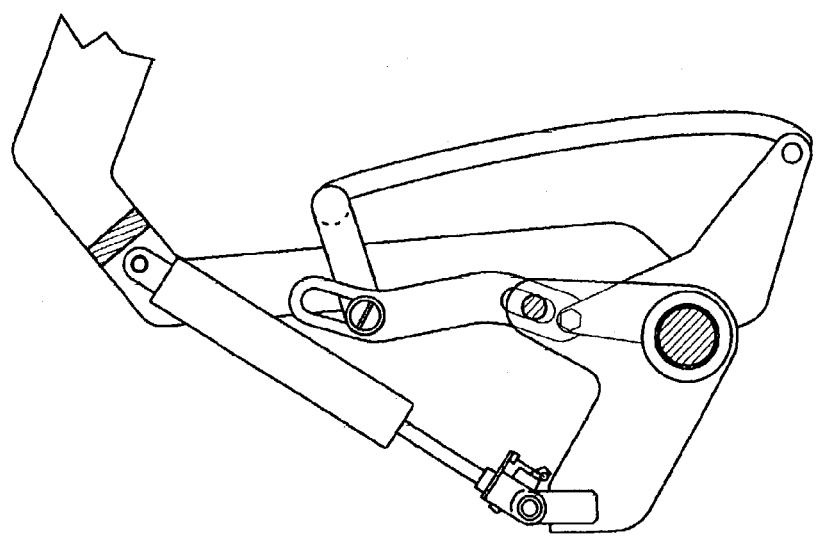

As best visible in FIGS. 45, 46, 47, the assemblage described so far determines the pivoting of rocker cams 448, 448' in relation to the movement and angle of the back chair frame 411. In explaining the working of the linkage it should be considered that the starting point of the movement shown in FIG. 45 is when the back is at its maximum backward tilt, positioned so by a user that pushes the seat backwardly against the force performed by the gas spring, while simultaneously pushing up the actuating lever 404 to unlock the gas spring 432 (FIG. 37). In this position the links 454, 454' have their upper ends at their maximum elevation, and that in turn determines the farthest and lowest position for the pivot point 450 of ledger 483, as rocker cam 448 is at its maximum forward rotation. Together with the connecting member 462 that is at its lowest position in relation to floor 101 being linked to the chair frame 411, they establish the lowest elevation and a sloped position for the ledger 483, which supports the seat 402. The angle between the seat and backrest is at its maximum, allowing for a relaxed posture of a user sitting in the chair 400.

The opposite end of the entire course is shown in FIG. 47, when a user positions the back frame at its maximum upper limit of the tilt by releasing an actuating lever 404, part of a lever assembly 405, and allowing the gas spring to push up the back chair frame 411. The link 454 thus determines a counterclockwise rotation of rocker cam 448 around shaft 419, positioning its pivot point 450 and front end of ledger 483 at their highest possible points while being pushed toward the rear. Because connecting member 462 is now at the highest elevation in relation to floor 101, the ledger 483 thus achieves a maximum height and a new tilt closer to a horizontal position that corresponds to a more alert posture of a user sitting in the chair 400. In a preferred embodiment of the invention, the seat is arranged such that it leans slightly forward when ledgers 483, 483' are at their maximum forward tilt. Also, by locking the gas spring at any point along its stroke length through the actuating of the lever assembly 405 it is possible to achieve a plurality of inclinations of the back-seat assembly, according to the particular needs of a user, in accordance with the scope of the invention. One such possible inclination is shown in FIG. 46 that corresponds to a normal posture.

The arrangement and dimensions of the parts of tilting mechanism 430 is such that it allows the seat 402 to tilt at roughly half the tilt angle of the back 401, referred to the floor 101. At the same time, the seat moves slightly back and forth when the back frame tilts up and down, respectively, compensating the shear affect that appears in the clothing of a user. A preferred relation is shown in FIG. 37, where the seat tilts 12 degrees in relation to the floor 101 and the total tilt of the seat is arranged so that 8 degrees of rear tilt correspond to the 15 degrees of tilt of the back frame, referred to the neutral position of the back. The remaining 4 degrees of seat tilt are corresponding to the remaining 10 degrees of forward tilt of the back frame, referred to the neutral position.

Chair Lifting Undercarriage

The chair 400 can also be placed at different height positions relative to the floor 101 depending on the particular human dimension of a user. In a preferred embodiment of the invention, the adjustable chair 400 is attached to the undercarriage 500 that allows said chair to be cantilevered from the rear portion of the base frame 300.

Figure 48:
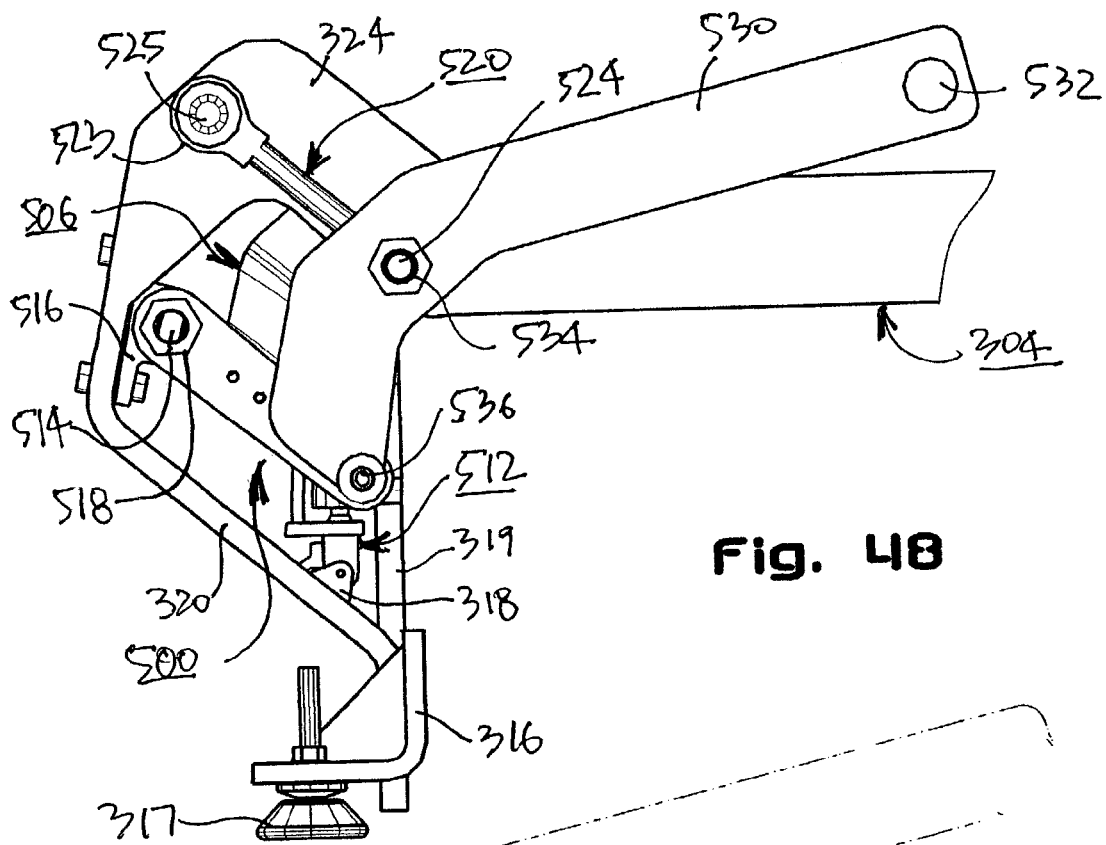
FIG. 48 shows a right side view of the lifting mechanism attached to the rear portion of the chassis

As shown in FIG. 48, the undercarriage 500 includes the pair of supporting arms 530 and 530' that in turn fixedly support the shaft 419 of chair 400. The symmetrically constructed arms 530, 530' are generally boomerang shaped, with the convex portion oriented upwardly. Two rounded nuts 536 and 536', are attached to the outward face of each of the arms 530, 530' and arranged coaxially with a bore placed at substantially the lower rear ends of arms 530, 530'. Also a pair of bores 533, 533' is drilled generally at the middle of arms 530, 530', and another pair of bores 532, 532' placed substantially at the front ends of arms 530, 530' is arranged to fixedly receive the shaft 419 of chair 400.

Further included in the undercarriage 500 is a pair of cams 504 and 504' that have their rear ends fixedly connected to a shaft 514 at each ends thereof. A pair of base-mount ball-bearings 516 and 516' are attached to the stiffening plate 322 of the chassis 302 so that when the shaft 514 is engaged with the ball-bearings 516, 516' they allow each of the cams 504, 504' to pivot freely in a vertical plane. FIG. 48 shows that also included in the undercarriage 500 is a pair of symmetrically constructed ball-joint linkages 520 and 520'. Describing only the linkage 520 it can be seen that it is comprised by a rod 526 that has two identical ball-joint rod ends 522 and 523 attached thereto. Each rod end has a male threaded shank 524 and 525 respectively, which can pivot freely inside housing ends 522, 523. The threaded shanks 525 and 525'are bolted to the angled braces 324 and 324' respectively of chassis 300, having their rear pivoting ends 523 and 523' respectively, placed substantially above the shaft 514. FIG. 48 further shows that each of the shanks 524, 524' are engaged with the bores 533, 533', of arms 530, 530' and secured thereto by a pair of hex nuts 534 and 534', respectively. Also, the remaining ends of the cams 504, 504' each have a pair of bores 505 and 505' respectively, which are pivotally attached to the rear ends of supporting arms 530, 530' by a pair of bolts 503, 503' threaded onto the rounded nuts 536 and 536', respectively. A pair of ring-shaped spacers 502 and 502' are placed between each of the linkages 530, 504' and 530', 504', respectively, in order to create enough room for all of the moving parts and not interfere with each other. Thus, two symmetrically constructed four-bar linkages are created, where the first links 504 and 504' are rigidly connected to each other. The second pair of restraining links 520 and 520' must have the same distance between their pivot points as the cams 504 and 504' have, allowing the supporting arms 530 and 530' to move following an arcuate path, but at the same time keeping the arms 530, 530' at parallel instances along the movement path.

Figure 49:
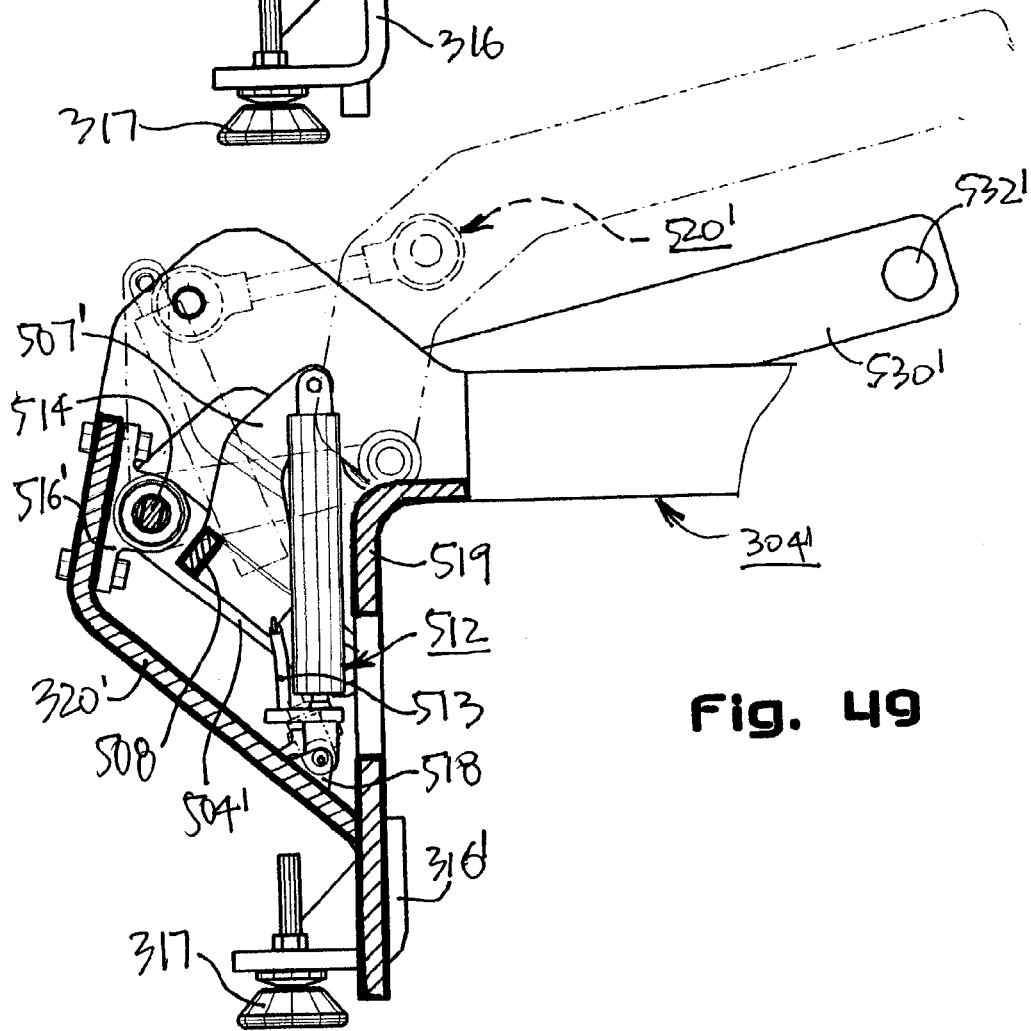
FIG. 49 shows a cross-sectional view of the lifting mechanism with its preferred lowest and highest elevated positions
Figure 50:
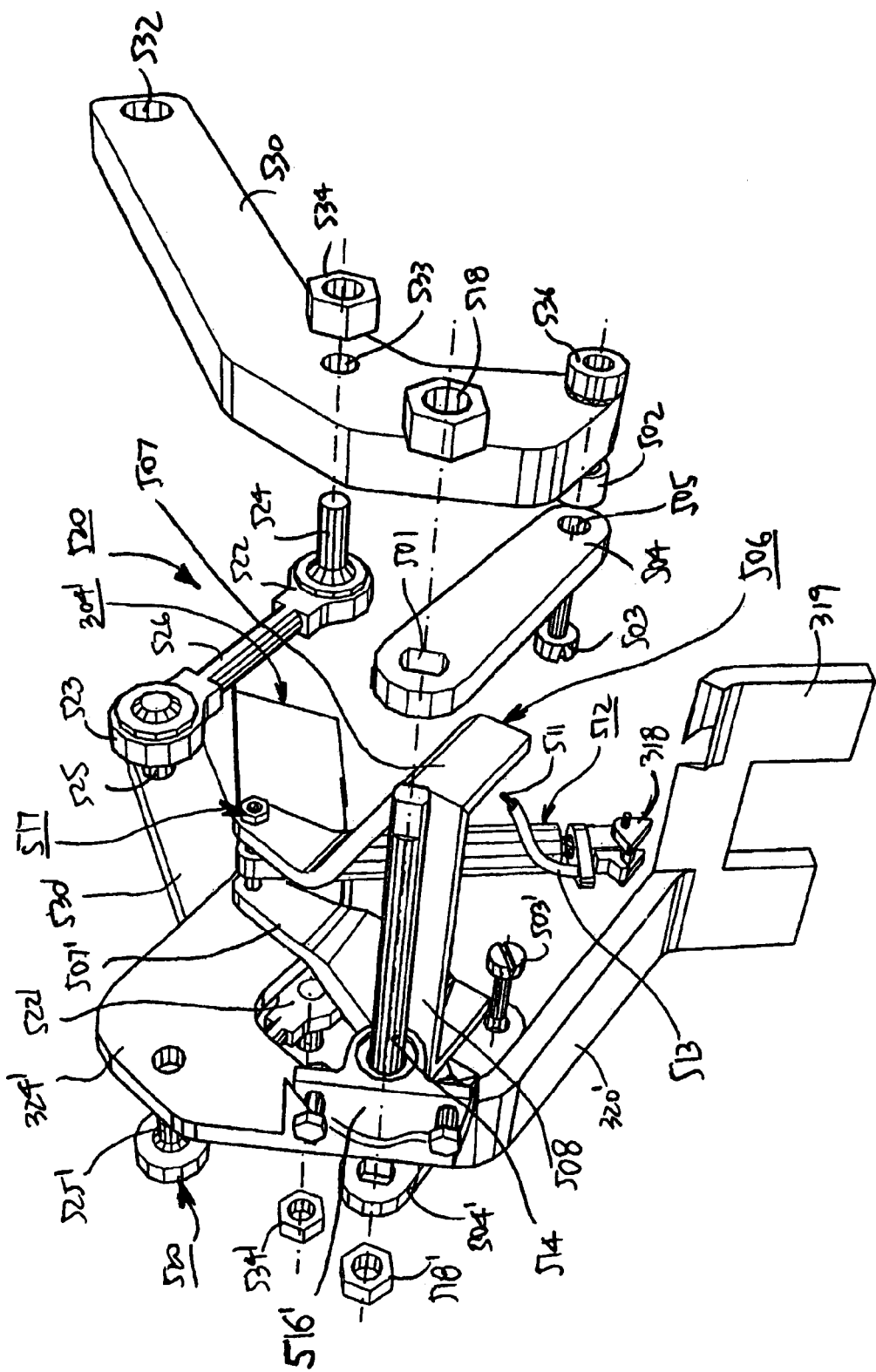
FIG. 50 is a rear right exploded the fragmentary view of the lifting mechanism attached to the rear end of the chassis.
Figure 51:
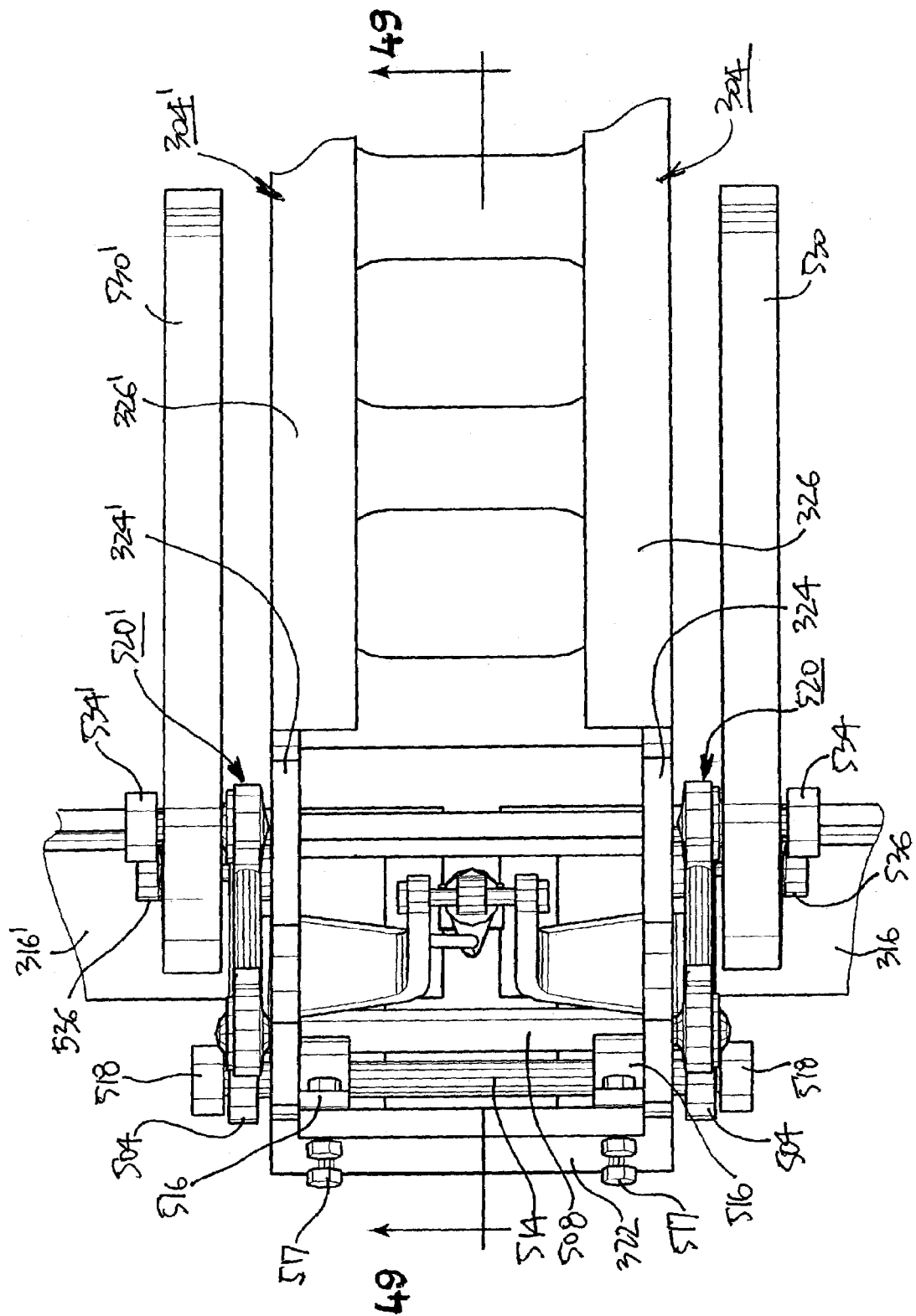
FIG. 51 shows a top view of a chair lifting mechanism attached to the chassis of the workstation

Also included in the undercarriage 500 and best visible in FIGS. 49 and 50 is a connector 506, comprised of a pair of symmetrical arms 507, 507' fixedly attached to the inside faces of arms 504, 604' respectively. Further included in connector 506 is a cross-member 508 also rigidly attached to the inside of arms 504, 504'. The arms 507 and 507' are shaped so that their upper ends are closer together, and a bore is drilled at the upper ends thereof, constituting an eyelet which pivotally secures the upper end of an extension-force lockable gas spring 512 by means of a nut and bolt assembly 517. The functioning of the gas spring 512 is identical to the previously described spring 432, part of the chair tilting mechanism 430. The gas spring 512 has its remaining lower end pivotally attached to a pair of eyelets 318 which in turn are secured to the oblong members 320, 320' of chassis 302 and is actuated by a lever assembly 405' which moves a cable 511 inside a cable sleeve 513. The lever assembly 405' is attached to the underside of the chair armrest 403' (FIG. 2). In accordance with the scope of the invention, when a user activates the lever assembly 405', the gas spring pushes upwardly the connector 506, determining a rotational movement of cams 504 and 504' around the axis of shaft 514. Because cams 504, 504' and ball-joint linkages 520, 520' restrain the movement of the arms 530, 530' as already explained, the resulting motion can only be a vertical elevation of the arms 530, 530', albeit along a radial path. The pivot points of the four-bar linkages described are establishing the center of the radial path of arms 530, 530' generally above the rear pivot points of both the links 520, 520' and cams 504, 504'. The advantage of this configuration is that as a user releases the spring 512 to elevate the chair 400, the motion described will also bring the chair forward. This is useful since a person with short members will also want to be closer to the front console 200. This combined movement can eliminate the need for repositioning the console 200 closer to the chair 400 by adjusting the angle of the legs 308 and 306 or provide extra finely-tuned adjustability in concurrence with the positioning of legs 306, 308.

Electrical System

Figure 55:
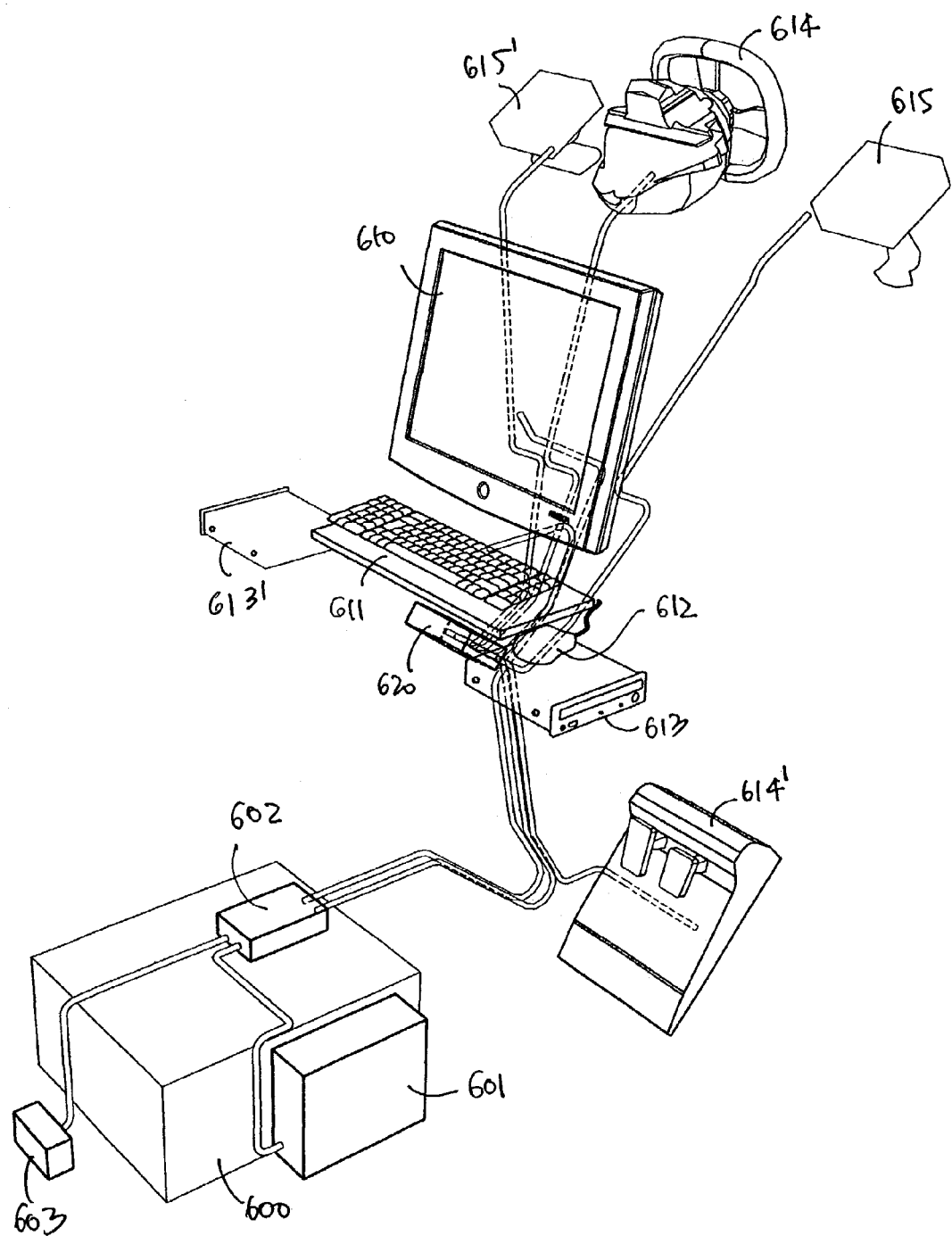
FIG. 55 is a diagram showing one embodiment of the invention showing electrical ports and wiring connections for use with a computer and peripherals.

In a preferred embodiment of the invention, an electrical system is also included in the workstation 100, as per FIG. 55, allowing the workstation 100 to function similarly to an appliance. A housing or mount for a computer or CPU 600 is preferably provided attached to or adjacent to the chassis under the chair. A box 603 placed at the rear of the chassis 302 can be connected to an external power source, such as a household wall plug. Also, a network connection routed to the CPU 600 is included in the box 603 allowing the workstation 100 to connect to a computer network, an Internet connection or similar workstations. Another electrical interfacing box 602 serves as a connection between the computer 600, the box 603, the screen, the keyboard, the peripheral device and the rest of electrical components attached to the workstation 100. The computer 600 has a cover plate 601, which protects all the wiring associated with a CPU unit, and funnels the physical cablings into the interface box 602. The interface box 602 powers and connects to the CPU 600 a switch box 620 which in turn connects the keyboard 611, mouse 612 and peripheral components 614, 615, 615' to the CPU. Also, the VDT 610 and disk drives 613 and 613' are connected directly to the interface box 602, which in turn routes them to the CPU 600. A sound system 616, which includes a subwoofer 617, is also connected electrically to the CPU 600 via the interface box 602. As described, the wiring of all the peripherals and input devices can be conveniently connected to either one of the interfaces 602 or 620, and only one single interface connects to the CPU. This eliminates long wiring paths and reduces redundancy for the power supplies needed by the various components by acting as an extension cord incorporated with the workstation 100. Ports or jacks are also provided so as to permit interchangeability of one or more of the peripheral devices. In an alternative embodiment, data connections to one or more of the peripheral devices may be provided wirelessly.

Alternative Embodiment with Overhead Chassis

Figure 52:
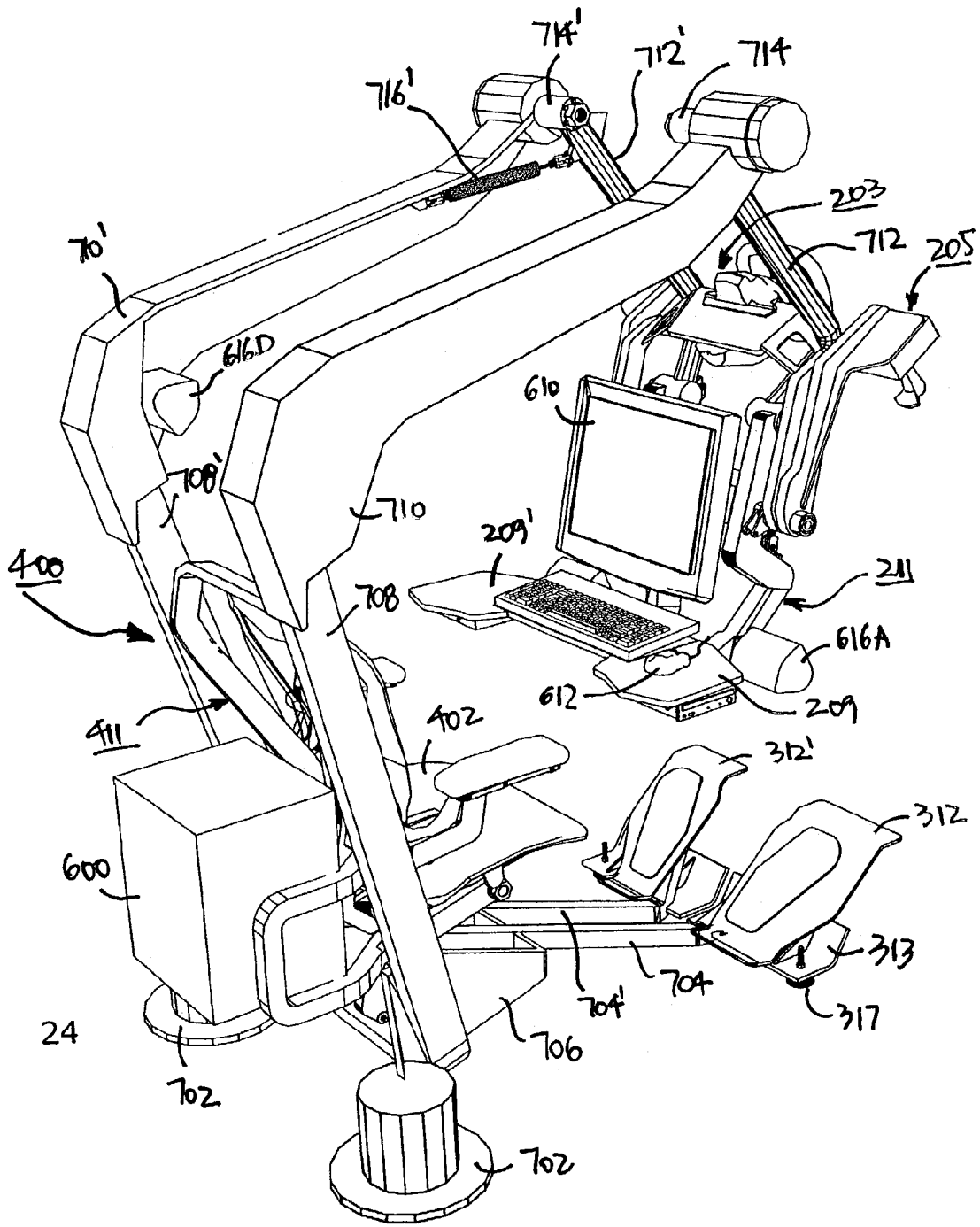
FIG. 52 is a perspective view of an alternative embodiment of the invention showing an overhead configuration for the chassis.

FIG. 52 describes an alternative embodiment of the invention, wherein the means for supporting the console is positioned overhead rather than in front of the chair.

In this embodiment, an overhead chassis 701 is provided, which comprises generally longitudinal overhead support members 710 and 710' extending approximately horizontally over and beyond the front of an adjustable chair 400, the support members being attached to support legs 708 and 708', the legs being attached to a base member 706 under the chair.

Pivotally attached to the support members is a console 200 pivotally attached to the support arms by console arms 712 and 712' at pivot points 714 and 714'. A biasing means such as a gas spring 716' may be attached between at least one overhead support member and at least one console arm to provide a motion limiting and damping function for the console as the user pivots the console toward and away. The structure and function of the console is the same as in the previous embodiments described above, except that it is being hung in front of the user from above rather than being supported from below.

Alternative Embodiment with Peripheral Device Attached to Supporting Members

Figure 54:
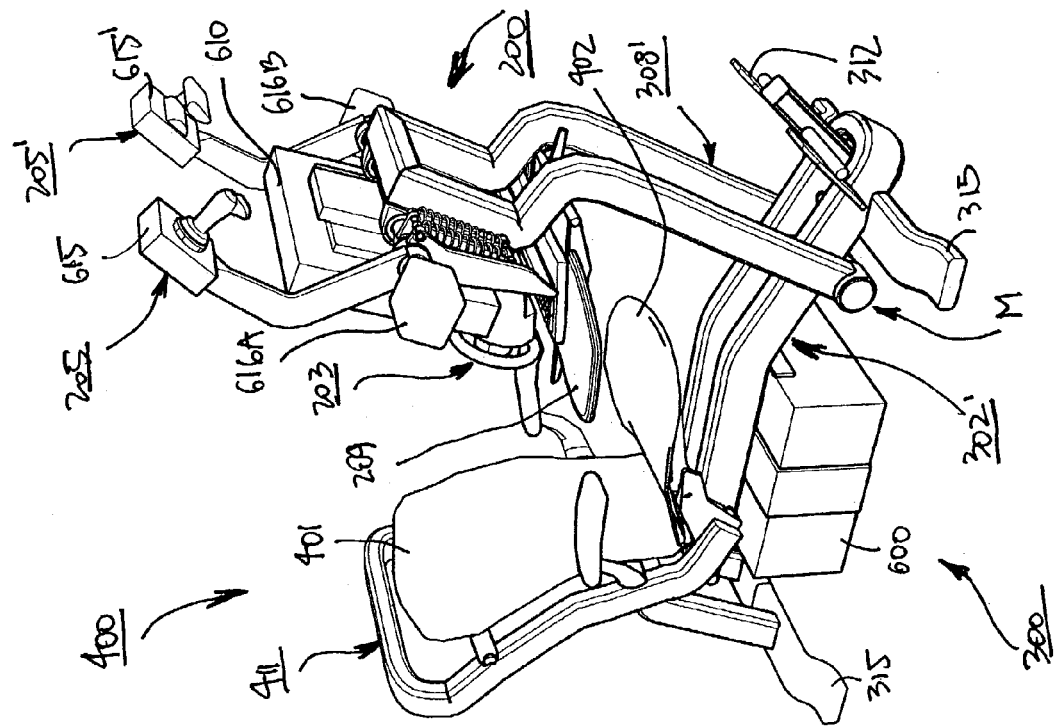
FIG. 54 is a perspective view of the alternative embodiment shown in FIG. 53
Figure 53:
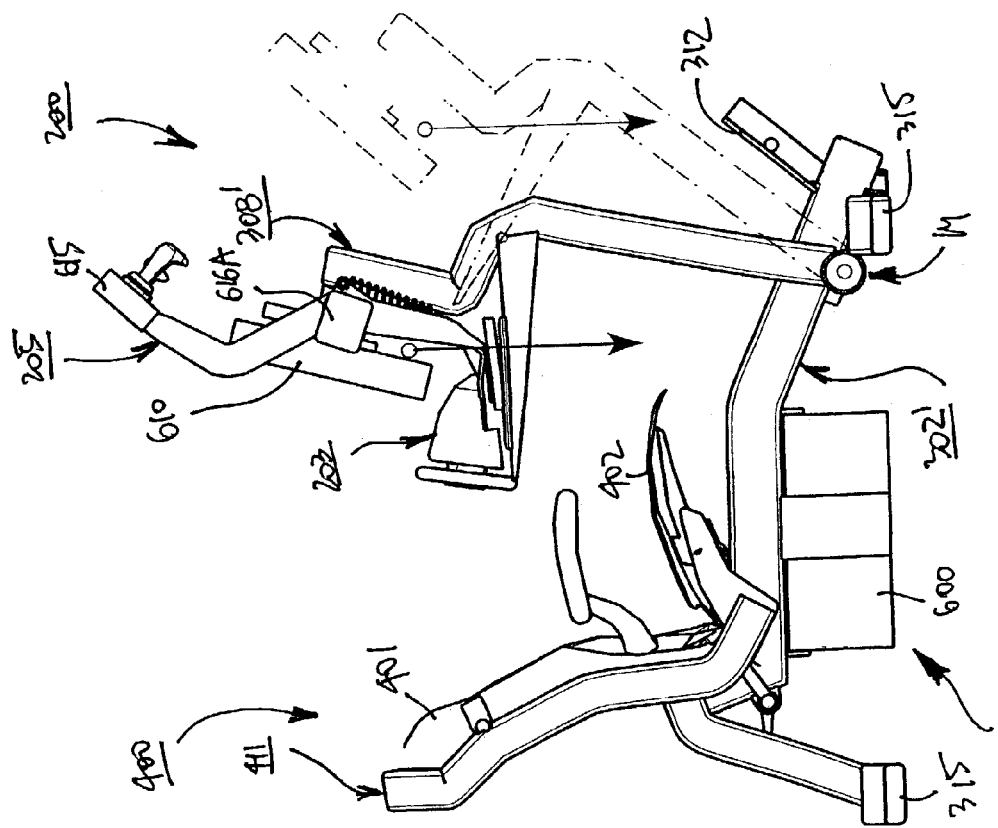
FIG. 53 is a side view of an alternative embodiment of the invention showing a support assembly that is pivotable into two resting positions, and held in place in each resting position by gravity.

FIGS. 53 and 54 describe an alternative embodiment of the invention, wherein the console 200 is pivotally attached to the base frame 300 at a pivoting point M.

In this embodiment, the supporting members 308' of base frame 300 are pivotally attached to the chassis 302 at a pivoting point M and are configured to support the peripheral pivoting arms 203, 205 and 205', screen 610, side tables 209 and 209' (not visible), the keyboard 611 and sound system components 616A and 616B. The positioning of the pivoting point M in relation to the mass center of console 200 is such that it allows the console 200 to pivot between two extreme positions, biased in either of the two by a downward gravitational force. Means of limiting the pivoting range of support members 308 are provided so that when console 200 is at the closest position to the chair 400, all peripherals mounted hereupon are within comfortable reach of a user seated in the chair 400 and when at its farthest position it allows comfortable exit of a user from the chair 400.

While the invention has been described herein with reference to certain preferred embodiments, these embodiments have been presented by way of example only, and not to limit the scope of the invention.

What is claimed is:

1. A chair suitable for use with a videogaming and computer workstation, comprising:

a vertically adjustable undercarriage;

a tiltable seat attached to the undercarriage; and a tiltable backrest attached to the undercarriage and movable independently of the seat;

whereby the seat is adapted to be raised and lowered by a user seated in the chair, and whereby the undercarriage is adapted to cause the seat to be tilted backward and forward in association with the backrest as the backrest is tilted backward and forward;

the undercarriage further including a tilting mechanism for tilting a chair frame and the seat, whereby when the backrest is tilted backward, the seat is moved forward, a back end of the seat is tilted downward over a first distance and a front end of the seat is tilted downward over a second distance, and when the backrest is tilted forward, the seat is moved backward, the back end of the seat is tilted upward over the first distance and the front end of the seat is tilted upward over the second distance; and in which the tilting mechanism comprises:

a shaft fixedly attached to the undercarriage;

the chair frame pivotally attached to the shaft, the chair frame adapted to mount the backrest;

a bracket fixedly attached to the shaft, the bracket supporting first and second pivot points;

biasing means attached between the first pivot point of the bracket and the chair frame;

a first see-saw link pivotally attached to the shaft and having first and second pivot points at opposite ends thereof;

a second see-saw link pivotally attached to the second pivot point of the bracket and having first and second pivot points at opposite ends thereof, the first pivot point being pivotally attached to the first pivot point of the first see-saw link;

an upright link having first and second pivot points at opposite ends thereof, the first pivot point of the upright link being pivotally attached to the chair frame and slidably attached to the second pivot point of the second see-saw link; and a seat support having front and back pivot points, the back pivot point pivotally attached to the second pivot point of the upright link, and the front pivot point being pivotally attached to the second pivot point of the first see-saw link.

* * * * *